US012786848B2

(12) United States Patent
Kim et al.

(10) Patent No.: US 12,786,848 B2
(45) Date of Patent: Nov. 3, 2026

(54) COMMUNICATION RELATED TO NETWORK SLICE

(71) Applicant: LG ELECTRONICS INC., Seoul (KR)

(72) Inventors: Seokjung Kim, Seoul (KR); Laeyoung Kim, Seoul (KR); Myungjune Youn, Seoul (KR); Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 564 days.

(21) Appl. No.: 18/021,146

(22) PCT Filed: Aug. 11, 2021

(86) PCT No.: PCT/KR2021/010617
§ 371 (c)(1),
(2) Date: Feb. 13, 2023

(87) PCT Pub. No.: WO2022/035205
PCT Pub. Date: Feb. 17, 2022

(65) Prior Publication Data
US 2023/0319687 A1 Oct. 5, 2023

(30) Foreign Application Priority Data
Aug. 13, 2020 (KR) ........................ 10-2020-0101748

(51) Int. Cl.

| | |
|---|---|
| *H04W 36/08* | (2009.01) |
| *H04W 36/14* | (2009.01) |
| *H04W 48/08* | (2009.01) |
| *H04W 76/10* | (2018.01) |
| *H04W 76/20* | (2018.01) |

(52) U.S. Cl.
CPC ........... *H04W 48/08* (2013.01); *H04W 36/08* (2013.01); *H04W 36/142* (2023.05); *H04W 76/10* (2018.02); *H04W 76/20* (2018.02)

(58) Field of Classification Search
None
See application file for complete search history.

(56) References Cited

U.S. PATENT DOCUMENTS

2017/0303259 A1 10/2017 Lee et al.
2020/0314701 A1* 10/2020 Talebi Fard .......... H04W 36/08
(Continued)

FOREIGN PATENT DOCUMENTS

WO WO-2019098745 A1 * 5/2019 ............ H04W 36/12
WO 2020091449 5/2020

OTHER PUBLICATIONS

European Patent Office Application Serial No. 21856211.4, Search Report dated Jun. 26, 2024, 10 pages.
(Continued)

*Primary Examiner* — Benjamin Lamont
(74) *Attorney, Agent, or Firm* — LEE, HONG, DEGERMAN, KANG & WAIMEY

(57) ABSTRACT

A disclosure of the present specification provides a method for performing, by a first RAN node, communication related to a network slice. The method may comprise the steps of: receiving, from an AMF, a PDU session resource establishment request message including information regarding a second PDU session; on the basis of the first RAN node not supporting a second network slice, determining to move UE to a second RAN node that supports the second network slice; and on the basis of being determined to move the UE to the second node, transmitting a PDU session resource establishment response message to the AMF.

12 Claims, 34 Drawing Sheets

(56) References Cited

U.S. PATENT DOCUMENTS

| | | | | |
|---|---|---|---|---|
| 2020/0322857 | A1* | 10/2020 | Park | H04W 76/22 |
| 2021/0014765 | A1* | 1/2021 | Shan | H04W 8/02 |
| 2021/0037426 | A1* | 2/2021 | Zhu | H04W 76/12 |
| 2021/0037455 | A1* | 2/2021 | Zhu | H04W 76/27 |
| 2021/0392704 | A1* | 12/2021 | Xu | H04W 48/18 |
| 2023/0199570 | A1* | 6/2023 | Lee | H04W 76/18 370/331 |

OTHER PUBLICATIONS

ZTE, "KI#7, New Sol: Steering the UE towards the 5G-AN during PDU session Establishment," 3GPP TSG-SA WG2 Meeting #138-e, S2-2003741, Phase-1, May 2020, 7 pages.

3rd Generation Partnership Project (3GPP), "Technical Specification Group Radio Access Network; NG-RAN; NG Application Protocol (NGAP) (Release 16)," 3GPP TS 38.413 V16.2.0, see sections 8.2.1.2 and 8.2.3.2; and figures 8.2.1.2-1 and 8.4.3.2-1, Jul. 2020, 464 pages.

3rd Generation Partnership Project (3GPP), "Technical Specification Group Services and System Aspects; Procedures for the 5G System (5GS); Stage 2 (Release 16)," 3GPP TS 23.502 V16.5.0, see sections 4.2.6, 4.9.1.3.2, 4.9.1.3.3 and 5.2.8.3.2; and figures 4.2.6-1, 4.9.1.3.2-1 and 4.9.1.3.3-1, Jul. 2020, 596 pages.

NEC, "KI#7 New Sol#X: Steering the UE to a network slice in a different frequency band," 3GPP TSG-SA WG2 Meeting #139-e, S2-2003629, May 2020, 5 pages.

PCT International Application No. PCT/KR2021/010617, International Search Report dated Nov. 12, 2021, 4 pages.

* cited by examiner

COMMUNICATION RELATED TO NETWORK SLICE

CROSS-REFERENCE TO RELATED APPLICATIONS

This application is the National Stage filing under 35 U.S.C. 371 of International Application No. PCT/KR2021/010617, filed on Aug. 11, 2021, which claims the benefit of earlier filing date and right of priority to Korean Application No. 10-2020-0101748, filed on Aug. 13, 2020, the contents of which are all incorporated by reference herein in their entirety.

TECHNICAL FIELD

The present disclosure relates to mobile communication.

SUMMARY

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

A method for supporting 5GC assisted cell selection to access a network slice (e.g., "Support of 5GC assisted cell selection to access network slice") is required. A terminal receiving a service for a specific network slice (e.g. Single—Network Slice Selection Assistance Information (S-NSSAI)-1) through a specific frequency band, may try to get service for another network slice (e.g. S-NSSAI-2) through a different frequency band. In this case, it is necessary to discuss how to handle the PDU session being used in the existing S-NSSAI-1. For example, there is a need to discuss how to steer a UE to a 5G-Access Network (AN) (e.g., a specific frequency band) that a 5G System (5GS) can support a network slice (e.g., a network slice the UE can use) will be discussed. When 5GS makes decision to steer a UE to an appropriate 5G-AN, information needed for 5GS needs to be discussed. In order to select an appropriate 5G-AN, it is necessary to discuss what information 5GS should provide to the UE and how to transmit this information to the UE.

SUMMARY

Accordingly, a disclosure of the present specification has been made in an effort to solve the aforementioned problem.

In order to solve the above problems, one disclosure of the present specification provides a method for a first RAN node to perform communication related to a network slice. The method may include: receiving a PDU session resource setup request message including information on a second PDU session from the AMF; determining to move the UE to a second RAN node supporting the second network slice based on the first RAN node not supporting the second network slice; and based on the decision to move the UE to the second node, transmitting a PDU session resource setup response message to the AMF.

In order to solve the above problems, one disclosure of the present specification provides a first RAN node performing communication related to a network slice. The first RAN node includes at least one processor; and at least one memory that stores instructions and is operatively electrically connectable with the at least one processor, wherein operations performed based on execution of the instructions by the at least one processor may include: receiving a PDU session resource setup request message including information on a second PDU session from the AMF; determining to move the UE to a second RAN node supporting the second network slice based on the first RAN node not supporting the second network slice; and based on the decision to move the UE to the second node, transmitting a PDU session resource setup response message to the AMF.

In order to solve the above problems, one disclosure of the present specification provides a method for AMF to perform communication related to a network slice. The method may include transmitting a PDU session resource setup request message including information about a second PDU session to a first RAN node; receiving a PDU session resource setup response message from the first RAN node; and transmitting the rejection information and the reason information to a second Session Management Function (SMF) that manages the second PDU session.

In order to solve the above problems, one disclosure of the present specification provides an AMF performing communication related to a network slice. The AMF includes at least one processor; and at least one memory that stores instructions and is operatively electrically connectable with the at least one processor, wherein operations performed based on execution of the instructions by the at least one processor may include: transmitting a PDU session resource setup request message including information about a second PDU session to a first RAN node; receiving a PDU session resource setup response message from the first RAN node; and transmitting the rejection information and the reason information to a second Session Management Function (SMF) that manages the second PDU session.

According to the disclosure of the present specification, it is possible to solve the problems of the related art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

DETAILED DESCRIPTION

Figure 1:
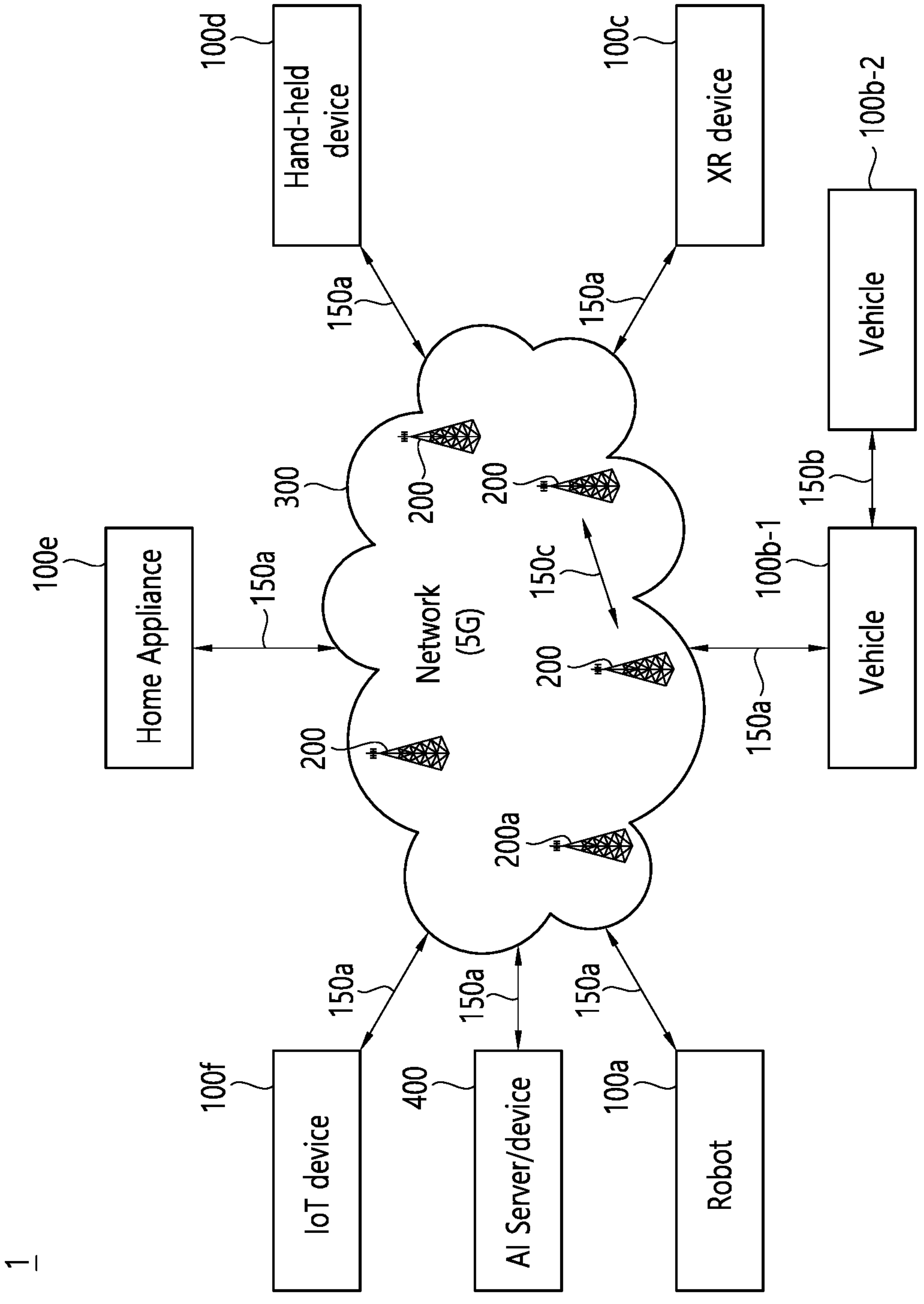
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, “A or B” may mean “only A”, “only B”, or “both A and B”. In other words, “A or B” in the present disclosure may be interpreted as “A and/or B”. For example, “A, B or C” in the present disclosure may mean “only A”, “only B”, “only C”, or “any combination of A, B and C”.

In the present disclosure, slash (/) or comma (,) may mean “and/or”. For example, “A/B” may mean “A and/or B”. Accordingly, “A/B” may mean “only A”, “only B”, or “both A and B”. For example, “A, B, C” may mean “A, B or C”.

In the present disclosure, “at least one of A and B” may mean “only A”, “only B” or “both A and B”. In addition, the expression “at least one of A or B” or “at least one of A and/or B” in the present disclosure may be interpreted as same as “at least one of A and B”.

In addition, in the present disclosure, “at least one of A, B and C” may mean “only A”, “only B”, “only C”, or “any combination of A, B and C”. In addition, “at least one of A, B or C” or “at least one of A, B and/or C” may mean “at least one of A, B and C”.

Also, parentheses used in the present disclosure may mean “for example”. In detail, when it is shown as “control information (PDCCH)”, “PDCCH” may be proposed as an example of “control information”. In other words, “control information” in the present disclosure is not limited to “PDCCH”, and “PDCCH” may be proposed as an example of “control information”. In addition, even when shown as “control information (i.e., PDCCH)”, “PDCCH” may be proposed as an example of “control information”.

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the attached drawings, user equipments (UEs) are shown for example. The UE may also be denoted a terminal or mobile equipment (ME). In addition, the UE may be a laptop computer, a mobile phone, a PDA, a smartphone, a multimedia device, or other portable device, or may be a stationary device such as a PC or a car mounted device.

Hereinafter, the UE is used as an example of a wireless communication device (or a wireless apparatus, or a wireless device) capable of wireless communication. An operation performed by the UE may be performed by a wireless communication device. A wireless communication device may also be referred to as a wireless apparatus, a wireless device, or the like. Hereinafter, AMF may mean an AMF node, SMF may mean an SMF node, and UPF may mean a UPF node.

The term "base station" used hereinafter generally refers to a fixed station that communicates with a wireless device and may be denoted by other terms such as evolved-NodeB (eNodeB), evolved-NodeB (eNB), Base Transceiver System (BTS), access point, or Next generation NodeB (gNB).

I. Techniques and Procedures Applicable to the Disclosure of the Present Specification FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100_a_ to 100_f_ may be connected to the network 300 via the BSs 200. An AI technology may be applied to the wireless devices 100_a_ to 100_f_ and the wireless devices 100_a_ to 100_f_ may be connected to the AI server 400 via the network 300. The network 300 may be configured using a 3G network, a 4G (e.g., LTE) network, a 5G (e.g., NR) network, and a beyond-5G network. Although the wireless devices 100_a_ to 100_f_ may communicate with each other through the BSs 200/network 300, the wireless devices 100_a_ to 100_f_ may perform direct communication (e.g., sidelink communication) with each other without passing through the BSs 200/network 300. For example, the vehicles 100_b_-1 and 100_b_-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100_a_ to 100_f_.

Wireless communication/connections 150_a_, 150_b_ and 150_c_ may be established between the wireless devices 100_a_ to 100_f_ and/or between wireless device 100_a_ to 100_f_ and BS 200 and/or between BSs 200. Herein, the wireless communication/connections may be established through various RATs (e.g., 5G NR) such as uplink/downlink communication 150_a_, sidelink communication (or device-to-device (D2D) communication) 150_b_, inter-base station communication 150_c_ (e.g., relay, integrated access and backhaul (IAB)), etc. The wireless devices 100_a_ to 100_f_ and the BSs 200/the wireless devices 100_a_ to 100_f_ may transmit/receive radio signals to/from each other through the wireless communication/connections 150_a_, 150_b_ and 150_c_. For example, the wireless communication/connections 150_a_, 150_b_ and 150_c_ may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHZ | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250MHz-52600MHZ | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally, and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally, and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
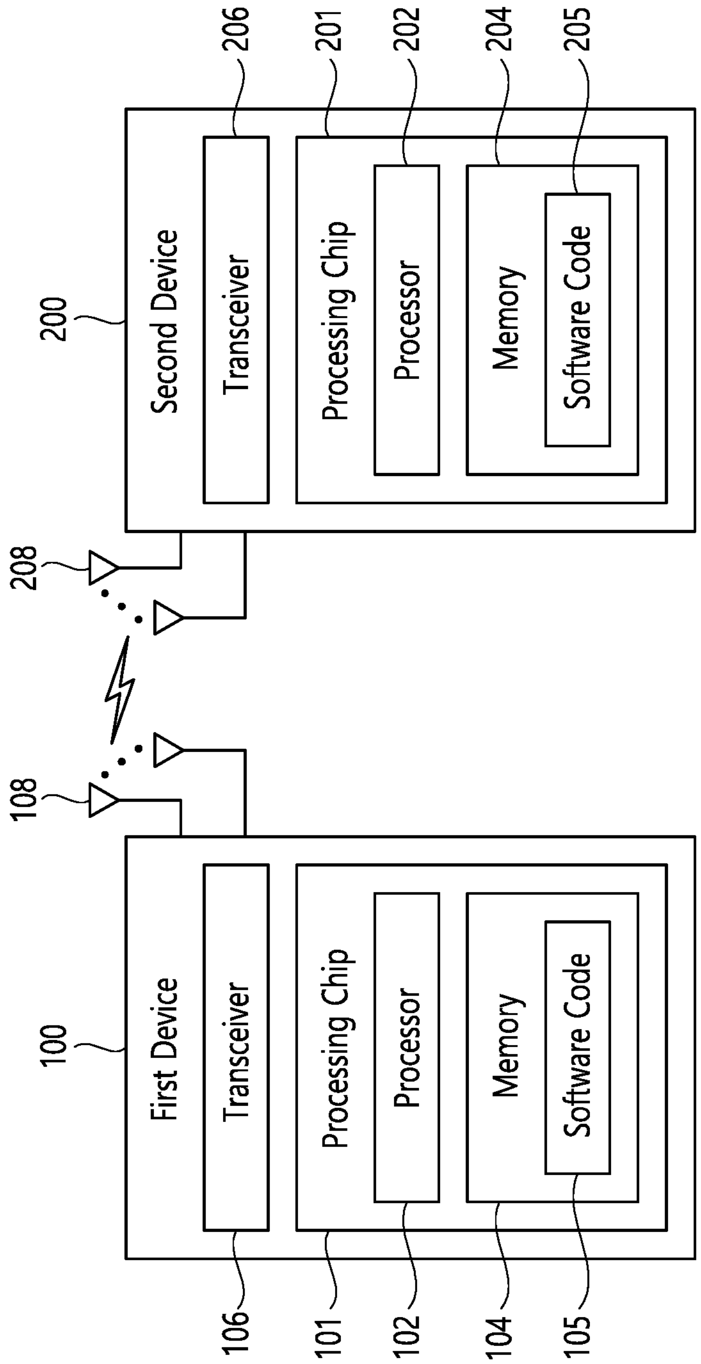
FIG. 2 shows an example of a wireless device to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
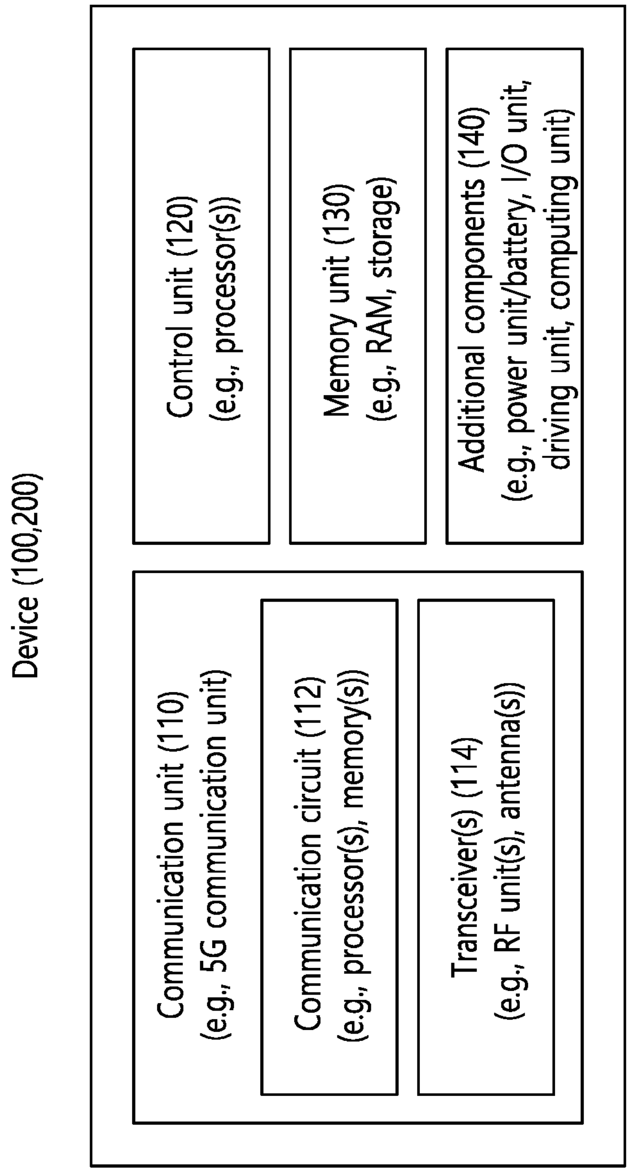
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
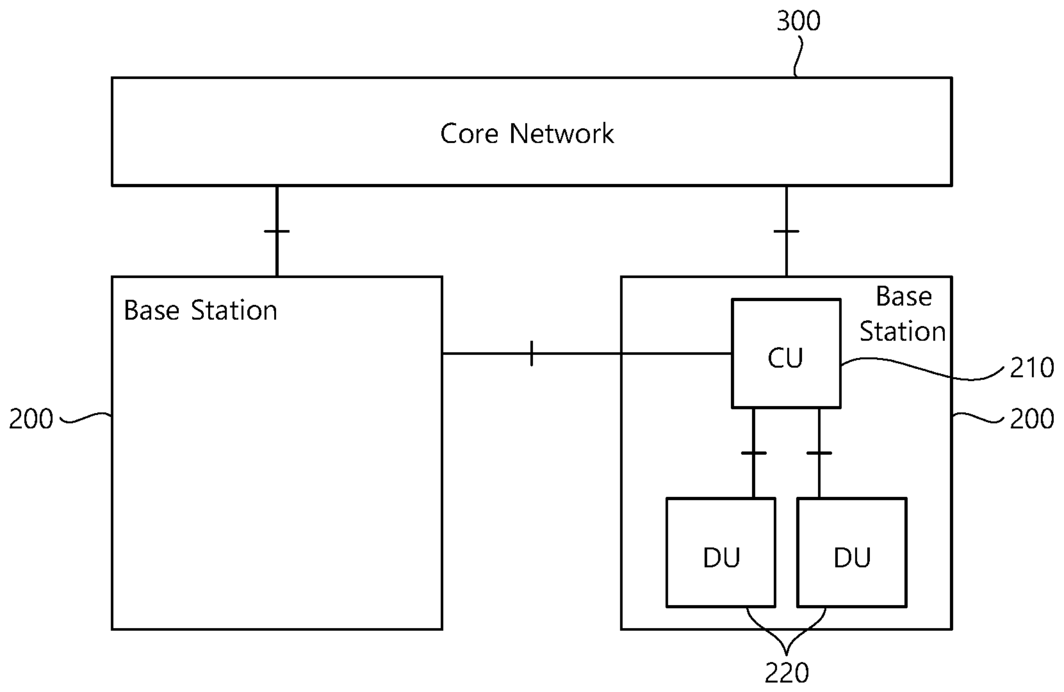
FIG. 4 shows an example of a network node to which implementations of the present disclosure is applied.

FIG. 4 shows an example of a network node to which implementations of the present disclosure is applied.

FIG. 4 is a diagram illustrating the second wireless device 200 of FIG. 2 or the wireless device 200 of FIG. 3 described above in more detail, when the base station is divided into a central unit (CU) and a distributed unit (DU).

Referring to FIG. 4, base station 200 may be connected to core network 300. Base stations 200 may be connected to each other. For example, an interface between the base station 200 and the core network 300 may be referred to as NG. For example, an interface between base stations 200 may be referred to as Xn.

Base station 200 may be divided into CU 210 and DU 220. That is, base station 200 may be hierarchically separated and operated. CU 210 may be connected to one or more DUs 220. For example, an interface between the CU 210 and the DU 220 may be referred to as F1. The CU 210 may perform a function of upper layers of the base station 200, and the DU 220 may perform a function of lower layers of the base station 200. For example, the CU 210 may be a logical node hosting RRC, SDAP, and PDCP layers of the base station 200 (e.g., gNB). Alternatively, the CU (W32) may be a logical node hosting the RRC and PDCP layers of the base station 200 (e.g., ng-eNB). For example, DU 220 may be a logical node hosting the RLC, MAC and PHY layers of the base station.

The operation of DU 220 may be partially controlled by CU 210. One DU 220 may support one or more cells. One cell may be supported by only one DU 220. One DU 220 may be connected to one CU 210, and one DU 220 may be connected to a plurality of CUs 210 according to appropriate implementation.

Figure 5:
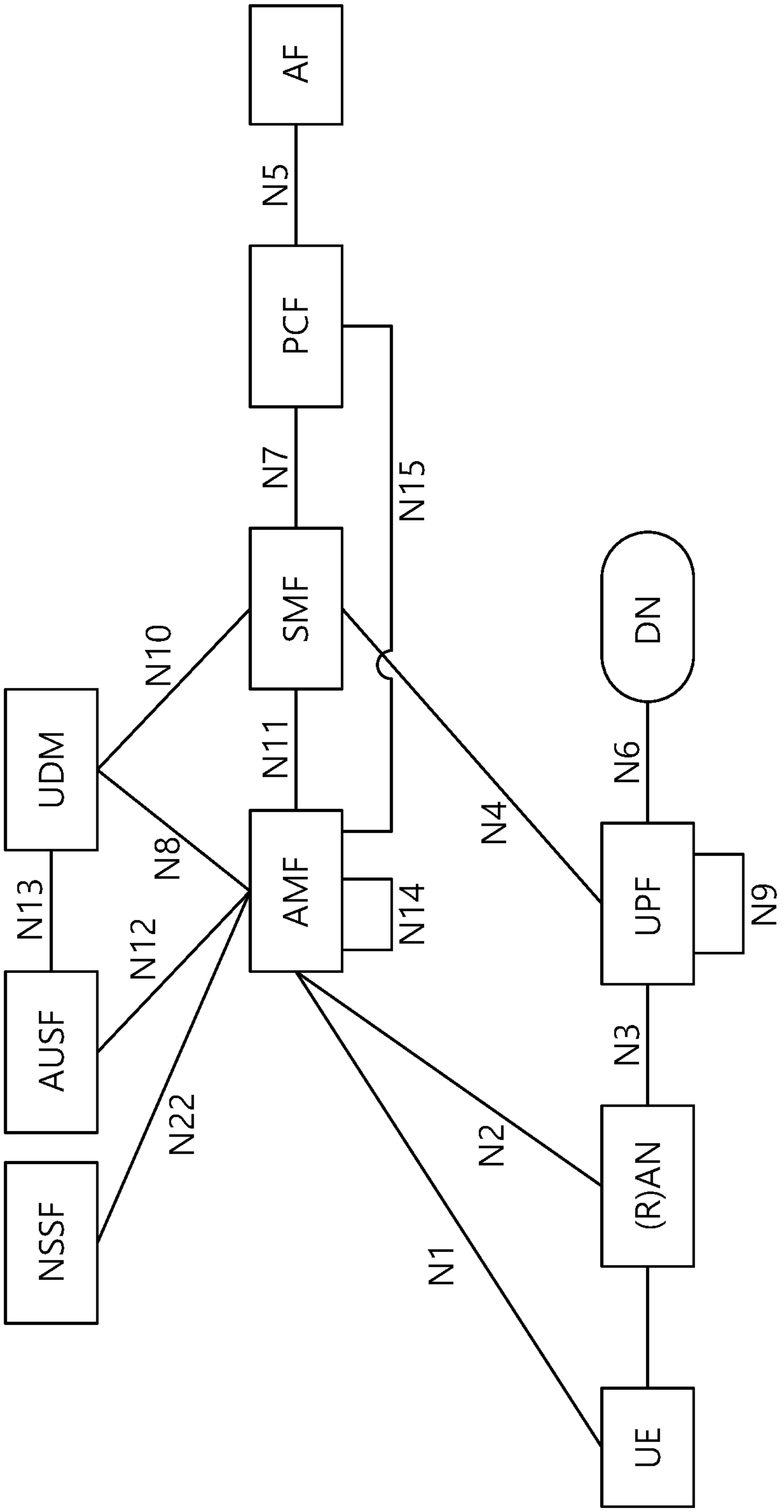
FIG. 5 shows an example of 5G system architecture to which implementations of the present disclosure is applied.

FIG. 5 shows an example of 5G system architecture to which implementations of the present disclosure is applied.

The 5G system (5GS) architecture consists of the following network functions (NF).

Authentication Server Function (AUSF)
Access and Mobility Management Function (AMF)
Data Network (DN), e.g., operator services, Internet access or 3rd party services
Unstructured Data Storage Function (UDSF)
Network Exposure Function (NEF)
Intermediate NEF (I-NEF)
Network Repository Function (NRF)
Network Slice Selection Function (NSSF)
Policy Control Function (PCF)
Session Management Function (SMF)
Unified Data Management (UDM)
Unified Data Repository (UDR)
User Plane Function (UPF)
UE radio Capability Management Function (UCMF)
Application Function (AF)
User Equipment (UE)
(Radio) Access Network ((R)AN)
5G-Equipment Identity Register (5G-EIR)

Network Data Analytics Function (NWDAF)

CHarging Function (CHF)

Furthermore, the following network functions may be considered.

Non-3GPP InterWorking Function (N3IWF)

Trusted Non-3GPP Gateway Function (TNGF)

Wireline Access Gateway Function (W-AGF)

FIG. 5 depicts the 5G system architecture in the non-roaming case, using the reference point representation showing how various network functions interact with each other.

In FIG. 5, for the sake of clarity of the point-to-point diagrams, the UDSF, NEF and NRF have not been depicted. However, all depicted Network Functions can interact with the UDSF, UDR, NEF and NRF as necessary.

For clarity, the UDR and its connections with other NFs, e.g., PCF, are not depicted in FIG. 5. For clarity, the NWDAF and its connections with other NFs, e.g., PCF, are not depicted in FIG. 5.

The 5G system architecture contains the following reference points:

N1: Reference point between the UE and the AMF.

N2: Reference point between the (R)AN and the AMF.

N3: Reference point between the (R)AN and the UPF.

N4: Reference point between the SMF and the UPF.

N6: Reference point between the UPF and a Data Network.

N9: Reference point between two UPFs.

The following reference points show the interactions that exist between the NF services in the NFs.

N5: Reference point between the PCF and an AF.

N7: Reference point between the SMF and the PCF.

N8: Reference point between the UDM and the AMF.

N10: Reference point between the UDM and the SMF.

N11: Reference point between the AMF and the SMF.

N12: Reference point between the AMF and the AUSF.

N13: Reference point between the UDM and the AUSF.

N14: Reference point between two AMFs.

N15: represents a reference point between PCF and AMF, and a reference point between AMF and PCF of a visited network in a roaming scenario.

N16: Reference point between two SMFs, (in roaming case between SMF in the visited network and the SMF in the home network).

N22: Reference point between the AMF and the NSSF.

N30: Reference point between PCF and NEF.

N33: Reference point between AF and NEF.

In some cases, a couple of NFs may need to be associated with each other to serve a UE.

For reference, in FIG. 5, an AF by a third party other than an operator may be connected to 5GC through NEF.

<Network Slice>

Hereinafter, network slicing to be introduced in next-generation mobile communication will be described.

Next-generation mobile communication introduces the concept of network slicing in order to provide various services through one network. Here, the network slicing is a combination of network nodes having functions necessary to provide a specific service. A network node constituting a slice instance may be a hardware independent node or a logically independent node.

Each slice instance may be composed of a combination of all nodes necessary to configure the entire network. In this case, one slice instance may independently provide a service to the UE.

Alternatively, the slice instance may be composed of a combination of some nodes among nodes constituting the network. In this case, the slice instance may not provide a service to the UE alone, but may provide a service to the UE in association with other existing network nodes. In addition, a plurality of slice instances may provide a service to the UE in association with each other.

A slice instance is different from a dedicated core network in that the entire network node including the Core Network (CN) node and the RAN can be separated. In addition, a slice instance is different from a dedicated core network in that network nodes can simply be logically separated.

For reference, for a network slice, quota may be used.

For example, a quota related to a network slice may include a quota for the maximum number of UEs. The quota for the maximum number of UEs may mean the maximum number of terminals that can use a network slice at the same time. As an example, each network slice information may include quota information for the maximum number of UEs (e.g., 10 pieces, 1000000 pieces, etc.).

For example, a quota related to a network slice may include a quota for the maximum number of PDU sessions. The quota for the maximum number of PDU sessions may mean the maximum number of concurrent PDU sessions supported in the network slice. For example, the maximum number of concurrent (concurrent) PDU sessions supported in a network slice may mean the maximum number of PDU sessions established at the same time in one network slice related to a DNN (Data Network Name) defined by S-NSSAI.

In 5G mobile communication, network slice quota event notification may be supported in the network slice. For example, event notification about a quota related to a network slice may be supported. For example, an AF may request an event notification about a quota related to a network slice in 5GS. Then, AF may be notified of quota for attributes related to network slices in 5GS. For example, 5GS may inform the AF whether the quota for a particular attribute has reached a specified threshold. AF may then influence the 5GS routing decision.

Figure 6:
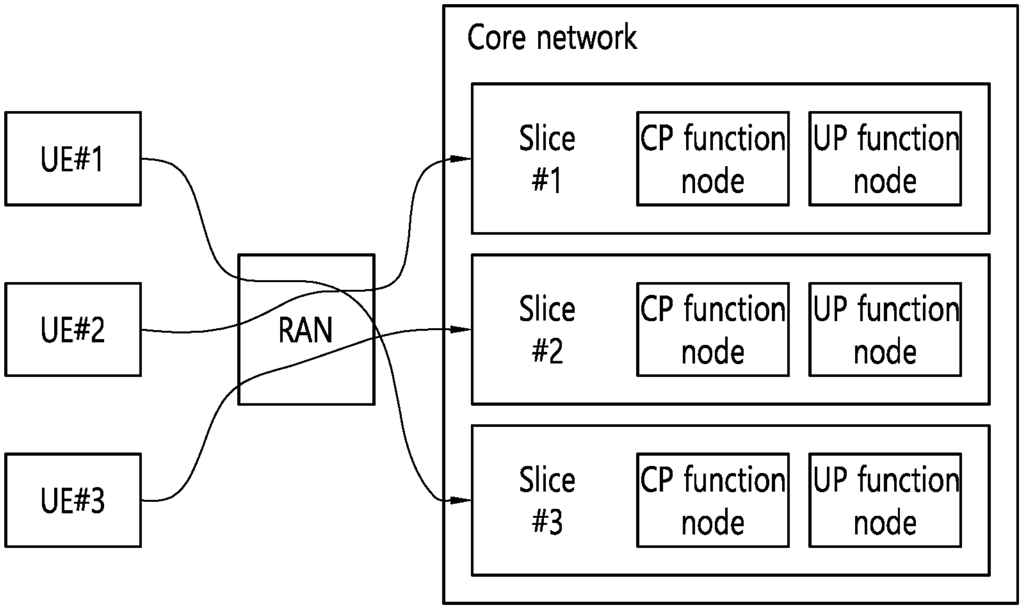
FIG. 6 is an exemplary diagram illustrating an example of an architecture for implementing the concept of network slicing.

FIG. 6 is an exemplary diagram illustrating an example of an architecture for implementing the concept of network slicing.

As can be seen with reference to FIG. 6, the Core Network (CN) may be divided into several slice instances. Each slice instance may include one or more of a CP function node and a UP function node.

Each UE may use a network slice instance suitable for its own service through the RAN.

Unlike shown in FIG. 6, each slice instance may share one or more of a CP function node and a UP function node with another slice instance. This will be described with reference to FIG. 7 as follows.

Figure 7:
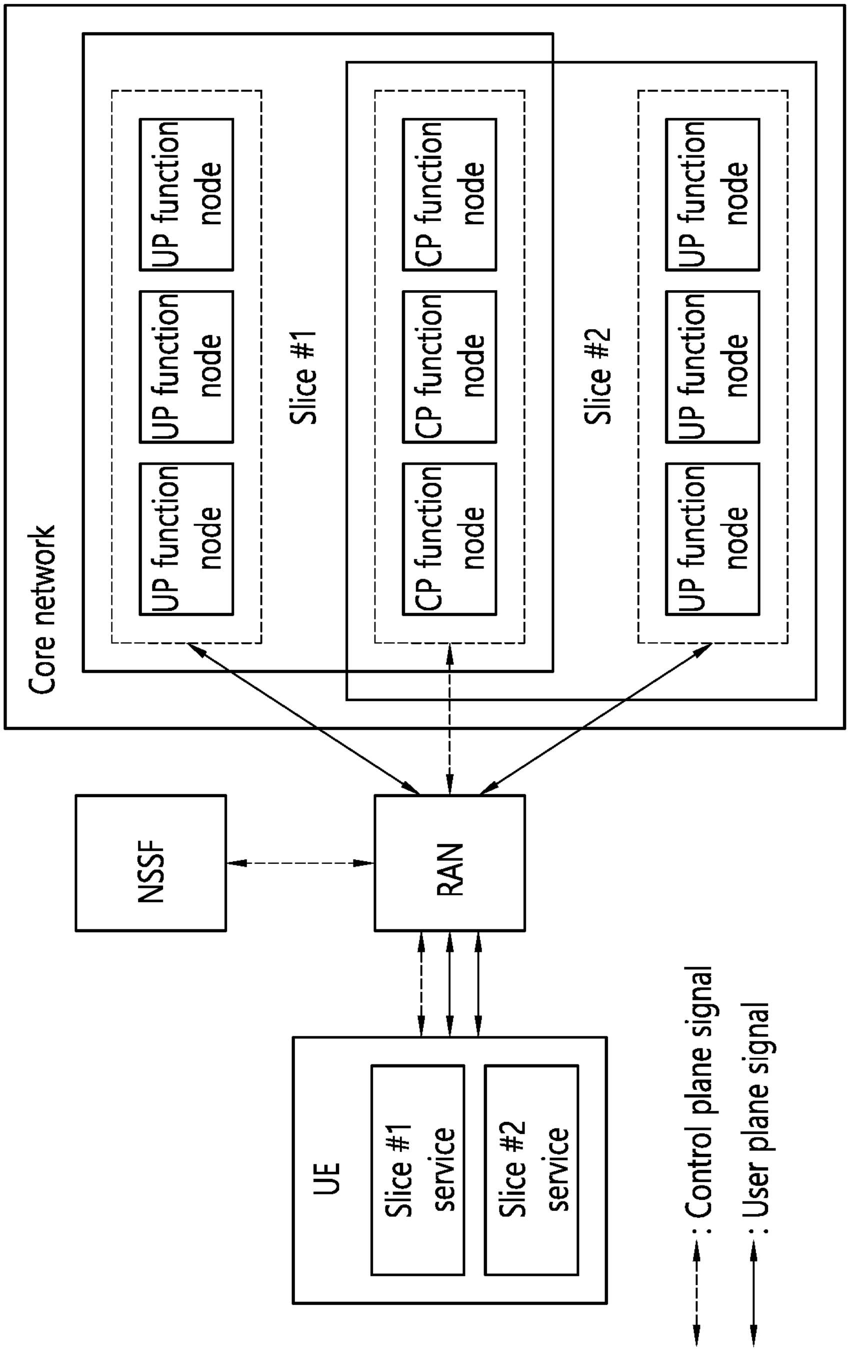
FIG. 7 is an exemplary diagram illustrating another example of an architecture for implementing the concept of network slicing.

FIG. 7 is an exemplary diagram illustrating another example of an architecture for implementing the concept of network slicing.

Referring to FIG. 7, a plurality of UP functional nodes is clustered, and similarly, a plurality of CP functional nodes is also clustered.

And, referring to FIG. 7, slice instance #1 (or referred to as instance #1) in the core network includes the first cluster of UP functional nodes. And, the slice instance #1 shares a cluster of CP functional nodes with slice #2 (or referred to as instance #2). The slice instance #2 includes a second cluster of UP functional nodes.

The illustrated NSSF selects a slice (or instance) that can accommodate the service of the UE.

The illustrated UE may use service #1 through the slice instance #1 selected by the NSSF, and may use service #2 through the slice instance #2 selected by the NSSF.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 8A:
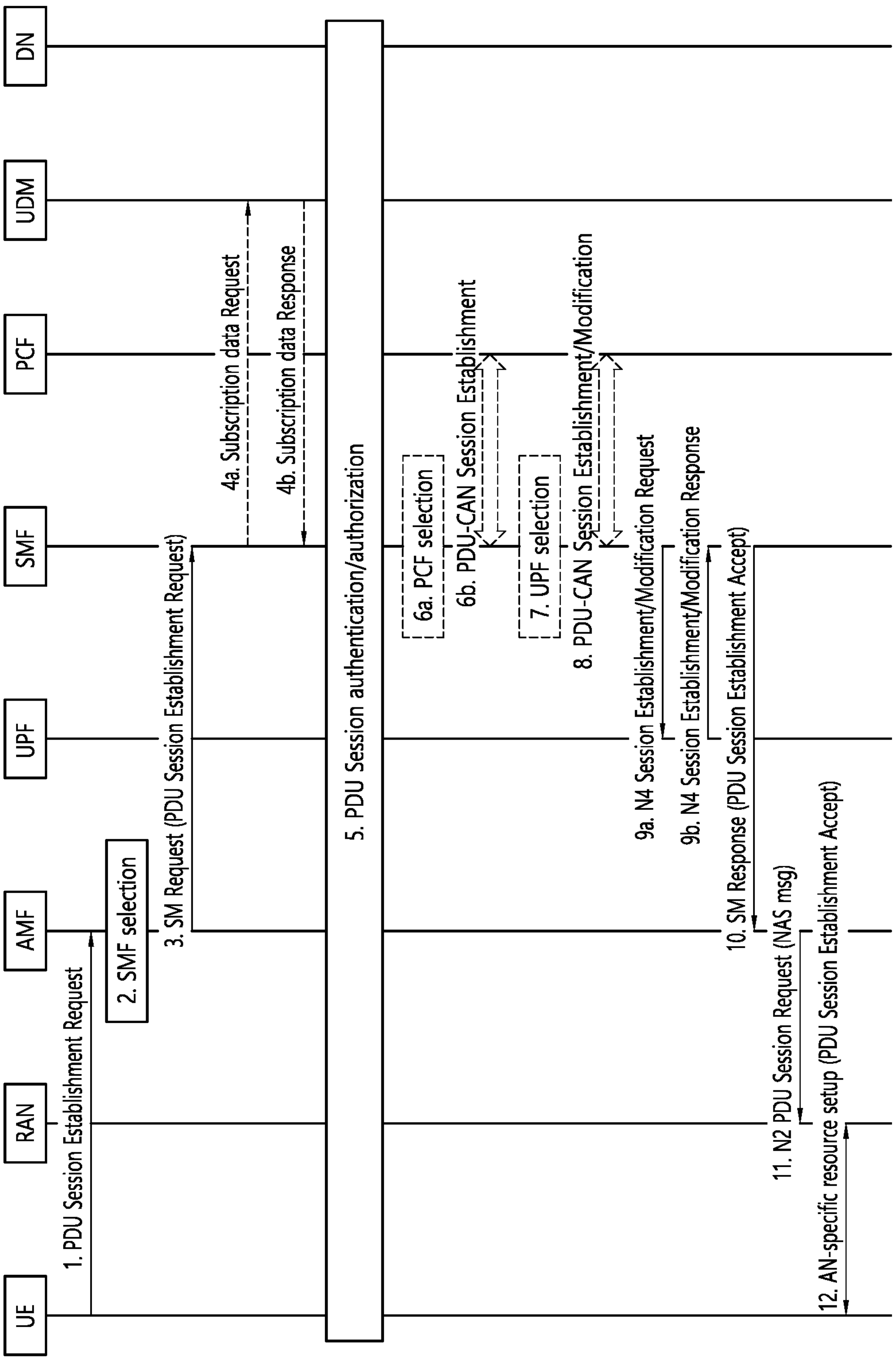
FIGS. 8*a* and 8*b* is a signal flowchart illustrating an exemplary PDU session establishment procedure.
Figure 8B:
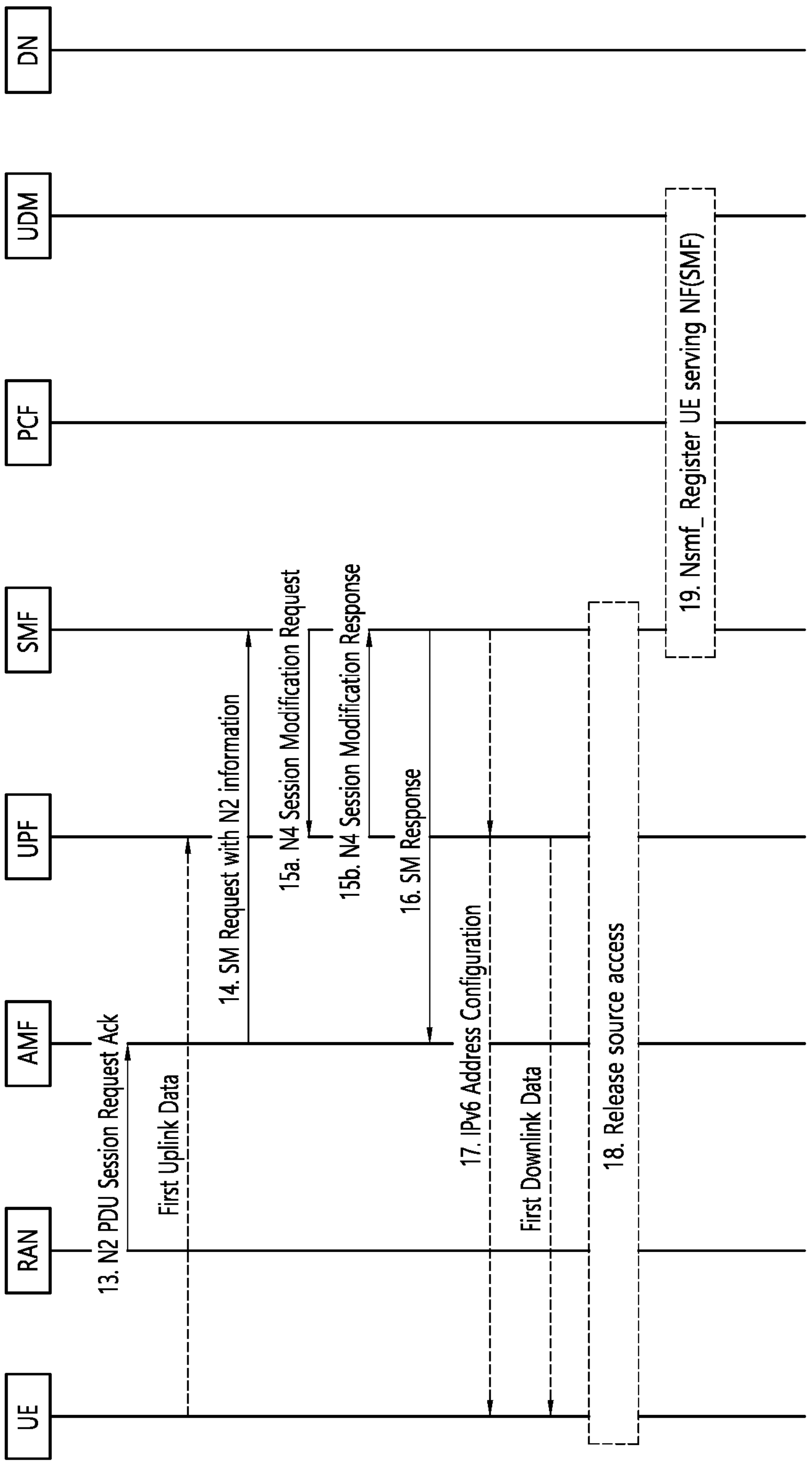

FIGS. 8*a* and 8*b* are a signal flowchart illustrating an exemplary PDU session establishment procedure.

The procedure shown in FIGS. 8*a* and 8*b* assumes that the UE has already registered on the AMF according to the registration procedure. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information (including PDU Session Request), and so on.

Specifically, the UE includes the S-NSSAI from the allowed (allowed) NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information that maps each S-NSSAI of the allowed NSSAI to the S-NASSI of the NSSAI configured for HPLMN.

More specifically, The UE may extract and store the information of the allowed S-NSSAI and the mapped S-NSSAI included in the registration accept message received from the network (i.e., AMF) in the registration procedure. Accordingly, the UE may transmit the PDU session establishment request message by including both the S-NSSAI based on the allowed NSSAI and the corresponding S-NSSAI based on the mapped NSSAI information.

In order to establish anew PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS flow identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM_Register UE serving NF service" including an SMF address and DNN. The UDM may store the ID, address, and DNN of the SMF.

During the procedure, if the PDU Session Establishment is not successful, the SMF notifies this to the AMF.

II. Techniques and Procedures Related to the Disclosure of the Present Specification Techniques and procedures related to the disclosure herein are described below. In addition, examples of problems to be solved in the disclosure of the present specification may also be described below.

A method for supporting 5GC assisted cell selection to access a network slice (e.g., "Support of 5GC assisted cell selection to access network slice") is required. For example, the present disclosure proposes examples of schemes for supporting 5GC support cell selection for accessing a network slice.

In particular, a terminal receiving a service for a specific network slice (e.g. Single—Network Slice Selection Assistance Information (S-NSSAI)-1) through a specific frequency band, may try to get service for S-NSSAI-2 through a different frequency band. In this case, it is necessary to discuss how to handle the PDU session being used in the existing S-NSSAI-1.

There may be a network slice that the UE wants to use. In this case, to use this network slice, the UE transmits Single-Network Slice Selection Assistance Information (S-NSSAI) related to this network slice to the network, the UE may attempt an operation of selecting a 5G Access Network (5G-AN) (e.g. a specific frequency band).

On the other hand, the UE must try to select 5G-AN until S-NSSAI is allowed, without the UE knowing whether 5G-AN supports S-NSSAI. It is necessary to discuss whether to support S-NSSAI-aware 5G-AN selection and how to support it.

In relation to this issue, when an operator manages different ranges of radio spectrums per network slice, a method of selecting a specific cell that can be used to access the network slice needs to be discussed. For example, the following examples need to be discussed:

How does 5GS steer UEs to a 5G-AN (e.g. a specific frequency band) that can support the network slices that the UE can use.

What information does 5GS need to take a decision to steer UE to a proper 5G-AN.

What information should be provided to the UE to select a proper 5G-AN and how it is sent to the UE.

Hereinafter, with reference to FIG. 9, an example of a conventional procedure for supporting radio spectrum attribute by CN assisted RAN control will be described.

Figure 9:
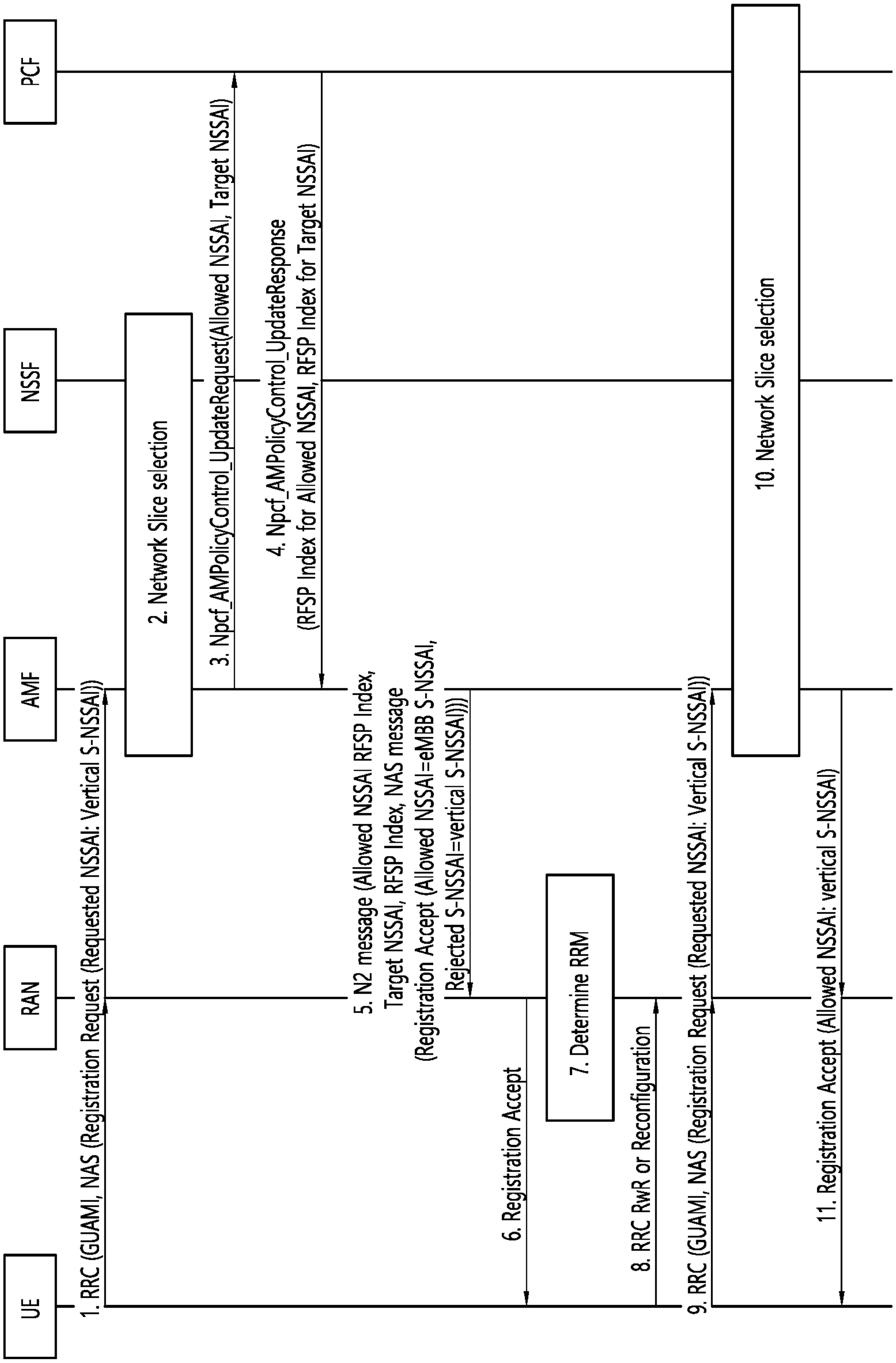
FIG. 9 shows an example of a procedure for supporting radio spectrum attributes by CN-assisted RAN control.

The example of FIG. 9 is an example of a conventional procedure for solving the problems described above.

If the network cannot accept the Requested NSSAI because it is not allowed within the current Tracking Area Identity (TAI), 5GC may provide the Requested NSSAI and the corresponding RAT/Frequency Selection Priority (RFSP) to the NG-RAN. The RAN may select a radio spectrum suitable for the UE. Regarding the example of FIG. 9, a series of events can be envisioned such as the following example:

1. The Network Slice may be created for supporting specific radio spectrum to support vertical requirements, and other Network Slices, e.g. network slices related to eMBB, are created supporting the radio spectrum available for the operator.
2. The UE may have a subscription for both the vertical Network Slice and an eMBB Network Slice.
3. The subscription for the UE includes the vertical S-NSSAI and eMBB S-NSSAI and the eMBB S-NSSAI is marked as default;
4. The UE has been registered in the network and been configured with a Configured NSSAI and provided an Allowed NSSAI including the eMBB but not the vertical Network Slice;
5. The UE/user decides to use the vertical S-NSSAI and therefore issues a Requested NSSAI with only the vertical S-NSSAI.
6. If at least one S-NSSAI in the Requested NSSAI is not allowed in the current TAI, the 5GC derive a Target NSSAI that is same as the Requested NSSAI (excluding any S-NSSAIs that are e.g. rejected for the PLMN).

The following drawings are made to explain a specific example of the present specification. Since the names of specific devices or names of specific signals/messages/fields described in the drawings are provided as examples, the technical features of the present specification are not limited to the specific names used in the drawings below.

FIG. 9 shows an example of a procedure for supporting radio spectrum attributes by CN-assisted RAN control.

The example of FIG. 9 shows an example of a procedure performed when a UE registers in a TA defined as not supporting any of the S-NSSAIs of Requested NSSAI.

In the example of FIG. 9, the UE requests to be registered to vertical S-NSSAI while not using the radio spectrum defined for the vertical Network Slice.

1. The UE decides to use Vertical S-NSSAI and sends a Registration Request (Requested NSSAI=Vertical S-NSSAI). The RRC includes the GUAMI. NG-RAN selects AMF as per current procedures.
2. The AMF and NSSF performs Network Slice selection. As the Vertical S-NSSAI is not defined for the current TAI, the AMF/NSSF selects the eMBB S-NSSAI as Allowed NSSAI due to it is defined as the default Subscribed S-NSSAI;
3. The Allowed NSSAI has not been changed, but the fact that at least one of the S-NSSAIs in the Requested NSSAI is not allowed in the current TAI is taken as a trigger for AMF Policy Update towards the PCF, the AMF provides Allowed NSSAI, Subscribed RFSP and also a Target NSSAI with the content of the Requested NSSAI, where the AMF removes any S-NSSAI in Requested NSSAI that is not a Subscribed S-NSSAI.
4. The PCF may select RFSP for both the Allowed NSSAI and the Target NSSAI (without considering the current TAI) and send both to the AMF;
5. The AMF sends an N2 message to the NG-RAN with Allowed NSSAI and the corresponding RFSP Index, and in addition the AMF sends the Target NSSAI and the corresponding RFSP Index, and the NAS message that includes the eMBB S-NSSAI as Allowed NSSAI and the Vertical S-NSSAI as a rejected S-NSSAI for the RA.
6. The NG-RAN may forward the NAS message to the UE.
7. The NG-RAN determines the Radio Spectrum to be used in order to allow UE access to the Target NSSAI, and as the NG-RAN got the additional Target NSSAI and RFSP Index for the Target NSSAI the NG-RAN decides to move the UE accordingly;
8. The NG-RAN issues an RRC Release and includes cell reselection priorities or the NG-RAN performs a Reconfiguration and moves the UE according to the RFSP for the Target NSSAI;

For reference, steps 6 and 8 can possibly be done at the same time.

9. The UE realizes that the TAI is outside of the RA and issues a Registration Request and includes the Vertical S-NSSAI in the Requested NSSAI as the UE still wants to register to that Network Slice;
10. Network Slice selection is performed as per conventional procedures.
11. The AMF sends a Registration Accept as per current procedures and includes the Vertical S-NSSAI as Allowed NSSAI.

Note that, If the eMBB slice is not available on the radio spectrum dedicated to the vertical Network Slice, as these Network Slices are to be isolated, when an application in the UE requires connectivity for eMBB, the whole procedure is repeated with the UE adding the eMBB slice in a Requested NSSAI.

According to the example of FIG. 9, NG-RAN may support getting additional Target NSSAI and RFSP Index for the Target NSSAI, and support moving the UE accordingly. AMF may support a new or extended Policy Control Request Trigger condition when Allowed NSSAI is based on default Subscribed S-NSSAI(s) due to Requested NSSAI was not supported in the current TAI. The AMF may support providing Target NSSAI to the PCF in the Npcf AMPolicyControl_Update Request message, and support receiving RFSP Index for the Target NSSAI in the Npcf AMPolicyControl_Update Response message. The AMF may support providing Target NSSAI and RFSP Index for the Target NSSAI to NG-RAN in an N2 message. The PCF may support determining an RFSP for the Target NSSAI. The PCF may support extending the Access and mobility related policy control information with RFSP Index for the Target NSSAI.

Hereinafter, an example of a prior art in which Operating Band Information is provided together with Configured NSSAI will be described. What will be described below may be an example of a method for supporting 5GC assisted cell selection for accessing a network slice (e.g., "Support of 5GC assisted cell selection to access network slice"). In the provision of Operating Band Information, structural assumptions such as the following examples may be applied:

The UE shall not simultaneously register to slices that are not all accessible on the same operating band(s). In other words, the UE shall not have S-NSSAIs in the Allowed NSSAI that are not all available in a common operating band The UE may be provisioned with the operating band(s) that are allowed for each S-NSSAI in the PLMN. This information (e.g., Operating Band Information) is sent to the UE in the Configured NSSAI and Mapping of Configured NSSAI. It is then understood that the UE will only request slices that are all accessible in the same operating band(s) and the AMF will include in the Allowed NSSAI only S-NSSAI(s) that are all accessible in the same operating band(s). The RFSP Index will be determined based on the Allowed NSSAI.

According to the operation of the prior art, the serving AMF may determine a Registration Area such that all S-NSSAIs of the Allowed NSSAI for this Registration Area are available in all Tracking Areas of the Registration Area. However, the case where some cell(s) in the tracking area(s) do not support all of the slices in the Allowed NSSAI may be allowed. If some cell(s) in the tracking area(s) do not support all of the slices in the Allowed NSSAI, then the RFSP Index will be selected such that the UE will not select operating bands (i.e. cells) that do not allow the UE to simultaneously access all of the slices in the Allowed NSSAI.

When the UE is provisioned with a Configured NSSAI or Mapping of Configured NSSAI (i.e. pre-provisioned, provisioned during Registration, or provisioned during a UE Configuration Update), the UE is also provisioned with the operating band(s) of each S-NSSAI in the Configured S-NSSAI or Mapping of Configured NSSAI. In the case where the operator slice deployment is governed by frequency ranges (e.g. FR1 and FR2), the AMF may indicate that an S-NSSAI is supported on [FR1 only], [FR2 only] or [FR1+FR2] instead of explicitly listing out all the operating bands where each S-NSSAI is supported. The Default Configured NSSAI is not associated with any specific operating band information but may be associated with frequency range information.

The UE may take into account the operating band(s) of each S-NSSAI when the UE selects a cell to camp on and/or generates a Requested NSSAI, e.g. UE selects S-NSSAIs which are associated with the operating band that the UE is currently using and generates a Requested NSSAI based on the operating band.

If the UE is interested to access an S-NSSAI which is not supported on the currently camped operating band and not in the Allowed NSSAI, the UE may choose to re-select to the new operating band, initiate the radio connection, and send a Mobility Registration Update Request and include the S-NSSAI in the Requested NSSAI.

The Registration Accept message and UE Configuration Update Command from the AMF to the UE may be updated to include permissible operating band(s) of each S-NSSAI in the Configured S-NSSAI and to include permissible operating band(s) of each S-NSSAI in the Mapping of Configured S-NSSAI.

In the Registration and UE Configuration Update procedures, the AMF will only include S-NSSAIs in the UE's Allowed NSSAI that are all available via the UE's current operating band. The AMF may be locally provisioned with operating band information for each S-NSSAI.

The AMF may provide the UE with permissible operating band(s) for each S-NSSI in the Configured NSSAI and Mapping of Configured NSSAI. During the Registration and UE Configuration Update procedures, the UE may receive permissible operating band(s) for each S-NSSAI in the Configured NSSAI and Mapping of Configured NSSAI.

Hereinafter, examples of the prior art for Preferred frequency bands in Configured NSSAI will be described. What will be described below may be an example of a method for supporting 5GC assisted cell selection for accessing a network slice (e.g., "Support of 5GC assisted cell selection to access network slice"). In the description of Preferred frequency bands in Configured NSSAI, the following example assumptions can be applied:

If the UE registers to a single network slice identified by S-NSSAI which is accessible on some preferred frequency band(s), then the UE considers the list of preferred band(s) of this S-NSSAI for Idle mode mobility.

If the UE registers to multiple network slices which are accessible on different preferred frequency band(s), then the UE may consider the provided configuration from the RAN to follow carrier frequencies for Idle mode mobility.

The AMF (or NSSF, or both) and the NG-RAN may be configured with the preferred frequency band(s) per S-NSSAI. With this, signaling enhancements to the N2 MM and N2 SM signaling are not needed.

The UE is provided with preferred frequency band(s) information per network slice (e.g. target carrier frequencies per S-NSSAI) in the Configured NSSAI. The preferred frequency band(s) are applicable to the S-NSSAIs of the Serving PLMN. The UE may use this information for cell selection in order to select the appropriate cell offering the S-NSSAI.

The parameter preferred frequency bands may include a list of target carrier frequencies containing one or more entries, and for each entry a carrier frequency priority index may be associated as well. For example, the priority index indicating the priority for scanning/selecting of a carrier frequency.

It is assumed that the serving AMF provides to the UE with Allowed NSSAI as per principles known in a prior art. However, the network (e.g. AMF or NSSF) in addition considers the RAN deployment and the frequency bands where the requested S-NSSAIs are available when creating the Allowed NSSAI.

After the Configured NSSAI has been updated and the UE is in Idle state, the UE determines which S-NSSAIs it wants to register with, i.e. the S-NSSAIs to be included in the Requested NSSAI. Then, the UE performs cell selection procedure considering the frequency priority (and the priority index) for the S-NSSAI(s) to be included in the Requested NSSAI.

The Configured NSSAI is provided to the UE during the Registration Accept message and UE Configuration Update Command transmitted from the AMF.

The generation of the Allowed NSSAI (and correspondingly the Rejected S-NSSAIs) in the AMF or NSSF should take into account the local configuration with the preferred frequency band(s) per S-NSSAI.

With respect to the cell selection procedure, the UE may first create a Requested NSSAI (e.g. based on the Configured NSSAI) to be included in the Registration Request message. The UE may then consider the list of target carrier frequencies for the S-NSSAI values included in the Requested NSSAI. If there are more than one S-NSSAIs in the Requested NSSAI, the UE may prioritize the S-NSSAIs, and consequently, prioritize the carrier frequencies to be used for cell selection. The prioritization of S-NSSAIs is up to UE internal configuration (e.g. from higher layers) or user priorities.

If a Service Request procedure or activation of User plane (UP) resourced for a PDU Session procedure result in use of multiple network slices operated in different frequency bands, the NG-RAN node may decide to activate Dual Connectivity in order to used different frequency bands simultaneously.

The AMF may take into account the preferred frequency bands per S-NSSAI when generating the Configured NSSAI, Allowed NSSAI and Rejected S-NSSAIs. The AMF may provide to the UE preferred frequency bands per S-NSSAI within the Configured NSSAI If the UE is allowed to use multiple S-NSSAIs, when the UE is transferred to Idle mode the NG-RAN steers the UE to the preferred carrier frequencies(s) for camping. If multiple network slices operating in different frequency bands are to be used in Connected state, the NG-RAN can activate Dual Connectivity or Carrier Aggregation based on local configuration.

The UE may take into account the preferred frequency bands per S-NSSAI as provided in the Configured NSSAI for Idle mode mobility Hereinafter, with reference to FIG. 10, an example of a conventional procedure for steer a UE to a network slice of a different frequency band will be described.

The following drawings are made to explain a specific example of the present specification. Since the names of specific devices or names of specific signals/messages/fields described in the drawings are provided as examples, the technical features of the present specification are not limited to the specific names used in the drawings below.

Figure 10:
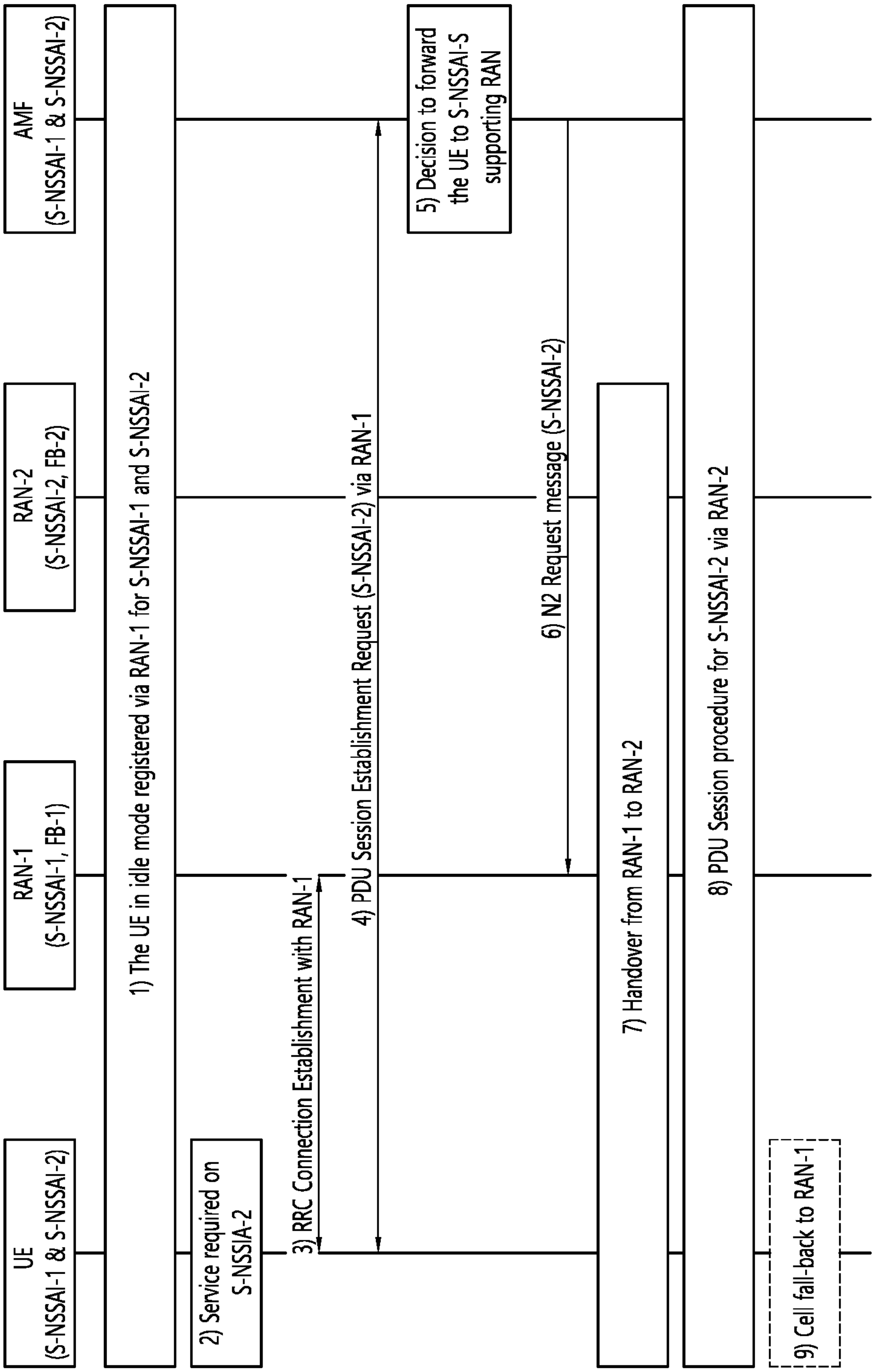
FIG. 10 shows an example of a procedure for steering a UE to a network slice of a different frequency band.

FIG. 10 shows an example of a procedure for steering a UE to a network slice of a different frequency band.

In the example of FIG. 10, the following situation may be assumed. The Allowed NSSSAI allocated to the UE may include S-NSSAIs supported in other frequency bands. However, all S-NSSAIs may be supported in all Tracking Areas or Registration Areas.

1) The UE is in idle mode, registered via RAN-1 for S-NSSAI-1, which operates only in frequency band 1 (FB-1) and S-NSSAI-2, which operates only in frequency band 2 (FB-2).
2) An application in the UE needs to establish service on S-NSSAI-2 in FB-2.
3) The UE may establish RRC connection with RAN-1.
4) The UE triggers PDU Session Establishment Request on S-NSSAI-2 via RAN-1.
5) AMF is aware that RAN-1, via which the UE is connected, does not support S-NSSAI-2 and the AMF is aware that S-NSSAI-2 is supported by another RAN Node.
6) AMF requests RAN-1 to steer the UE to a RAN Node supporting S-NSSAI-2.
7) RAN-1 triggers inter-frequency cell change to RAN-2 which supports S-NSSAI-2 and is in UE's location.
8) AMF continues with the PDU Session establishment procedure on S-NSSAI-2 via RAN-2.
9) After PDU session on S-NSSAI-2 is released, the UE falls-back (e.g. re-selects back) to a cell in FB-1. This step is optional. If not implemented, the UE will stay on FB-2 until it is steered back to FB-1 due to a new service request on FB-2.

According to the example of FIG. 10, a UE cell fallback operation to a cell of an initial frequency band may be selectively performed. AMF may determine and request handover to a cell of a different frequency band.

A method for supporting 5GC assisted cell selection to access a network slice (e.g., "Support of 5GC assisted cell selection to access network slice") is required. A terminal receiving a service for a specific network slice (e.g. Single—Network Slice Selection Assistance Information (S-NSSAI)-1) through a specific frequency band, may try to get service for another network slice (e.g. S-NSSAI-2) through a different frequency band. In this case, it is necessary to discuss how to handle the PDU session being used in the existing S-NSSAI-1. For example, there is a need to discuss how to steer a UE to a 5G-Access Network (AN) (e.g., a specific frequency band) that a 5G System (5GS) can support a network slice (e.g., a network slice the UE can use) will be discussed. When 5GS makes decision to steer a UE to an appropriate 5G-AN, information needed for 5GS needs to be discussed. In order to select an appropriate 5G-AN, it is necessary to discuss what information 5GS should provide to the UE and how to transmit this information to the UE.

Additionally, according to various examples described above, after the UE performs handover to RAN-2, the UE performs a PDU session establishment procedure for S-NSSAI-2 with RAN-2. Accordingly, there is a problem in that unnecessary signaling occurs and it may take a long time for the terminal to receive the service.

In other words, when the terminal tries to use a specific network slice, the UE may transmit a message requesting establishment of a PDU (Protocol Data Unit or Packet Data Unit) session related to this network slice to the Next Generation Radio Access Network (NG-RAN) and/or the core network. In this case, a network slice supported by the NG-RAN and a frequency band related to the network slice may be different from a specific network slice and frequency band related to the PDU session requested by the UE. According to the prior art, in this case, the NG-RAN must reject the UE's PDU session establishment request for the corresponding PDU session.

After the NG-RAN rejects the terminal's PDU session establishment request, in order for the terminal to receive service through the network slice related to the PDU session, the UE must move to the NG-RAN supporting the corresponding network slice. And, after moving to the corresponding NG-RAN, the terminal must start the PDU session establishment procedure again. Accordingly, there is a problem in that unnecessary signaling occurs and it may take a long time for the terminal to receive the service.

III. Disclosure of the Present Specification

Disclosures described later in this specification may be implemented in one or more combinations (e.g., a combination including at least one of the contents described below). Each of the drawings represents an embodiment of each disclosure, but the embodiments of the drawings may be implemented in combination with each other.

Description of the method proposed in the disclosure of this specification may be composed of a combination of one or more operations/configurations/steps described below. The following methods described below may be performed or used in combination or complementary.

In the disclosure of the present specification, when a terminal changes a network slice, an example of a method of processing an existing PDU session and an example of a method of establishing a new PDU session are described. For example, examples of methods for efficiently deactivating a PDU session being serviced through an existing frequency band and generating a PDU session through a new frequency band, when changing the slice used by the terminal to change the frequency band used are described.

Some of the service operations (e.g., service operation between Core NFs) described in various examples of the disclosure of this specification may be newly defined service operations for the disclosure of this specification. In addition, some of the N2 messages between AMF and NG-RAN described below may be newly defined N2 messages for the disclosure of this specification. In addition, in some of the RRC messages between the NG-RAN and the UE described below, a new RRC message may be defined and used for the disclosure of this specification.

Hereinafter, slice and S-NSSAI may be used interchangeably as terms representing the same meaning.

In the procedures described in various examples of the disclosure herein below, certain actions/steps may be performed concurrently/parallel, or may be performed in an order different from the order described in the disclosure herein.

Hereinafter, the disclosure of the present specification will be described with reference to the first to fifth examples of the disclosure of the present specification. The first to fifth examples of the disclosure of the present specification described below may be implemented in combination.

1. The First Example of the Disclosure of the Present Specification

Hereinafter, a first example of the disclosure of the present specification will be described with reference to examples of FIGS. 11*a* to 11*c* and examples of FIGS. 13*a* to 13*c*.

1-1. A First Example of a First Example of the Disclosure of the Present Specification First, a first example of a first example of the disclosure of the present specification will be described with reference to examples of FIGS. 11*a* to 11*c*.

Basically, in the disclosure of this specification, assumptions such as the following examples may be applied. It is assumed that information on frequency bands available for each network slice is not configured in the terminal. In addition, NG-RAN-1 supports S-NSSAI-1 using Frequency Band 1 (FB-1) frequency band, and NG-RAN-2 supports S-NSSAI-2 using FB-2 frequency band. Assume. In addition, to support when the terminal is trying to move to S-NSSAI, which must use a frequency band different from the frequency band currently in use, additional information (e.g., frequency band used by individual S-NSSAI, priority of individual S-NSSAI, NG-RAN or cell ID list supporting specific S-NSSAI, etc.) may be configured in the NG-RAN.

The following drawings are made to explain a specific example of the present specification. Since the names of specific devices or names of specific signals/messages/fields described in the drawings are provided as examples, the technical features of the present specification are not limited to the specific names used in the drawings below.

Figure 11A:
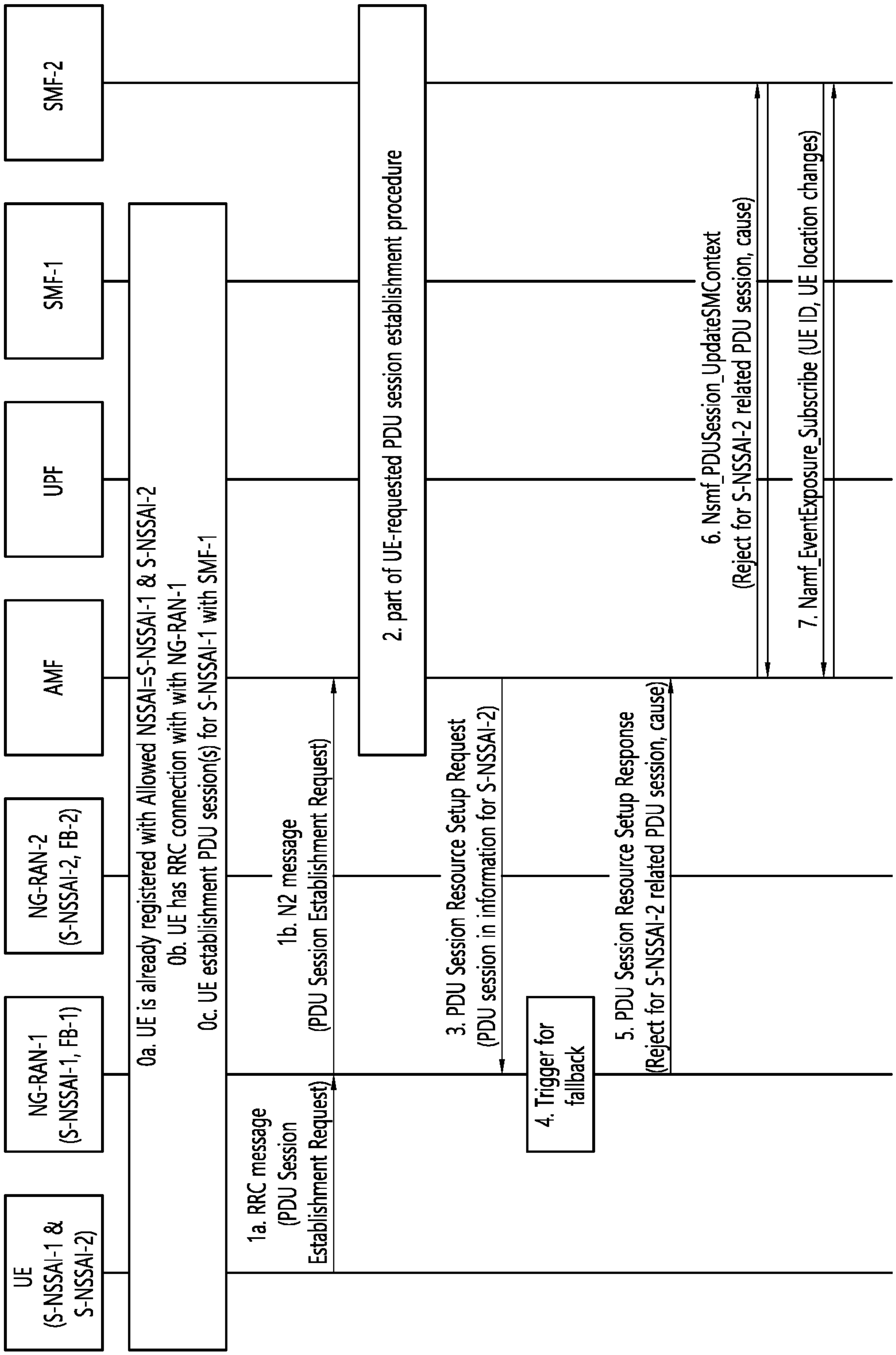
FIGS. 11*a* to 11*c* show signal flow diagrams according to a first example of a first example of the disclosure of the present specification.
Figure 11B:
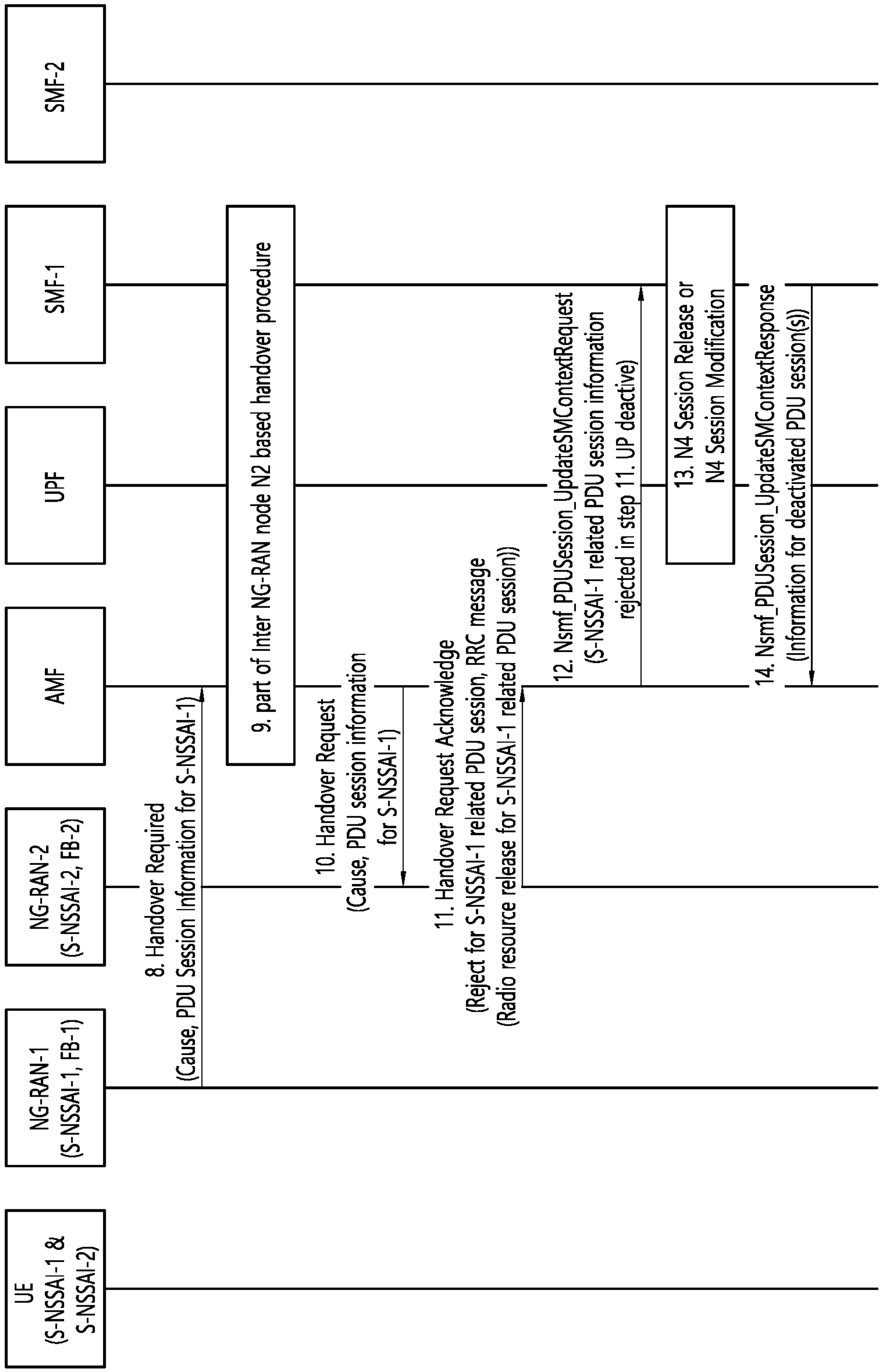
Figure 11C:
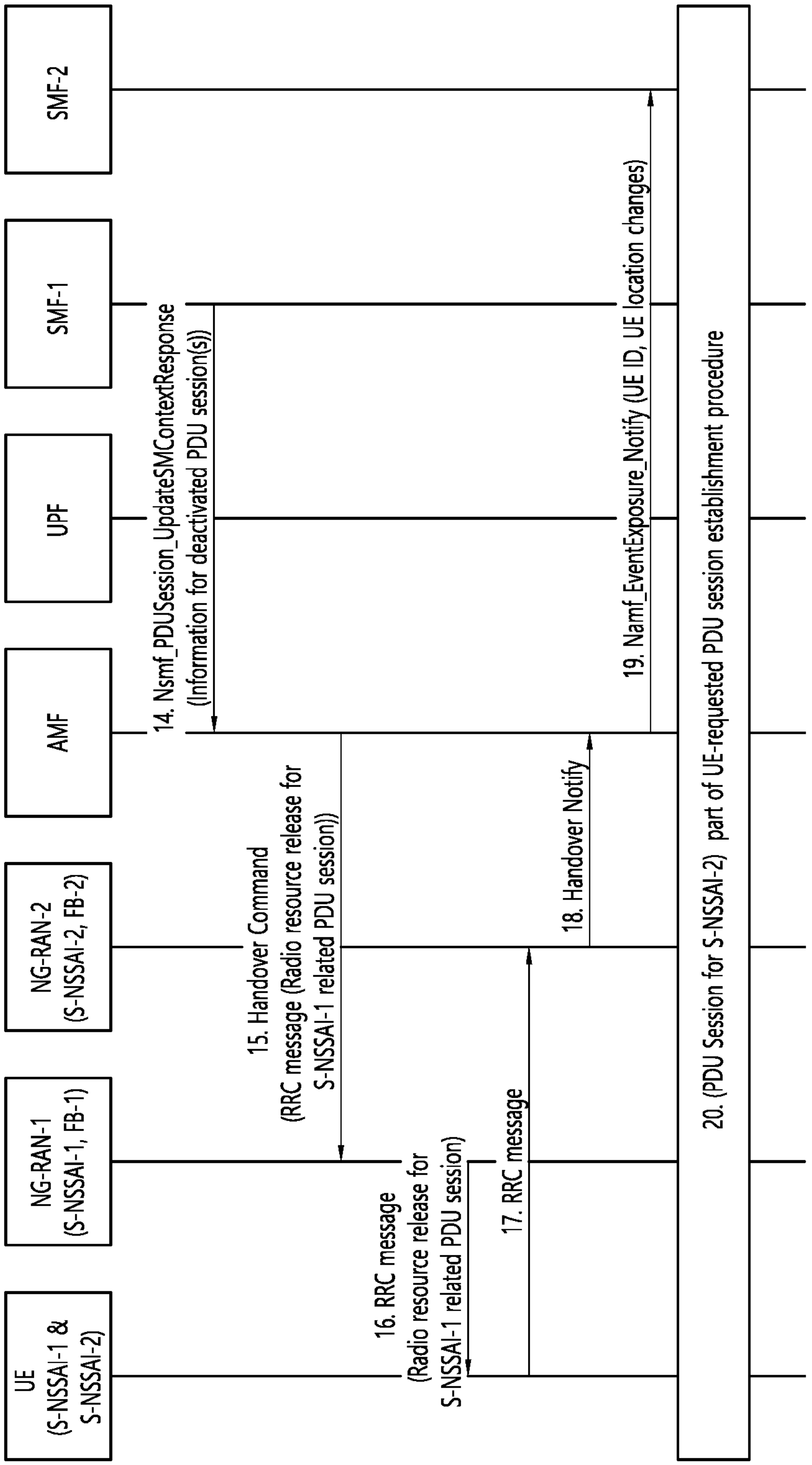

FIGS. 11*a* to 11*c* show signal flow diagrams according to a first example of a first example of the disclosure of the present specification.

The examples of FIGS. 11*a* to 11*c* may include an operation in which the SMF requests the AMF to inform the UE of handover termination, in the process of changing the frequency band of the terminal using Next Generation (NG)-based handover.

Step 0: The terminal may be already registered in the network. In addition, it is assumed that the terminal receives allowed NSSAI=S-NSSAI-1 and S-NSSAI-2 from AMF. In addition, the terminal may be in a state of establishing an RRC connection with NG-RAN-1 and having one or more PDU sessions for S-NSSAI-1 through SMF-1.

Step 1: The terminal may transmit a PDU session establishment request message for S-NSSAI-2 to the network through RRC and N2 message in order to receive service using S-NSSAI-2. At this time, the terminal may transmit a PDU session establishment request message for S-NSSAI-2 by including information such as a Globally Unique AMF ID (GUAMI) received from AMF in a previously performed registration procedure.

Step 2: The AMF may initiate the PDU session establishment procedure for S-NSSAI-2. For example, the AMF may perform operations of steps 2 to 10 in the examples of FIGS. 8*a* and 8*b*. In this process, the AMF may receive a resource allocation request for the PDU session for S-NSSAI-2 from the SMF.

Step 3: The AMF may transmit the resource allocation request message (e.g., PDU session resource setup request message) for the PDU session for S-NSSAI-2 received from the SMF in step 2 to NG-RAN-1. The resource allocation request message may include a PDU session establishment accept message to be delivered to the terminal.

Step 4: When the terminal tries to receive service through S-NSSAI using a frequency band different from the frequency band the terminal is currently using, NG-RAN-1 may be configured to support such a terminal. In this case, NG-RAN-1 may determine to move the UE to an NG-RAN supporting S-NSSAI-2 among neighboring NG-RANs. For example, based on the NG-RAN-1 receiving the resource allocation request message for the PDU session for S-NSSAI-2 in step 3, NG-RAN-1 may determine to move the UE to an NG-RAN supporting S-NSSAI-2 among neighboring NG-RANs. At this time, NG-RAN-1 can refer to pre-configured information (e.g., frequency band used by individual S-NSSAI, NG-RAN or cell ID supporting specific S-NSSAI, priority of individual S-NSSAI, etc.) in NG-RAN-1 and radio quality. For example, based on the pre-configured information and radio quality (e.g., frequency band used by individual S-NSSAI, NG-RAN or cell ID supporting specific S-NSSAI, priority of individual S-NSSAI, etc.), NG-RAN-1 may determine an NG-RAN supporting S-NSSAI-2 among neighboring NG-RANs. In order to move the terminal to an NG-RAN (e.g., NG-RAN-2) supporting S-NSSAI-2, NG-RAN-1 may request a measurement result report from the UE and receive the measurement result from the UE. Based on the measurement result received from the terminal, NG-RAN-1 determines whether handover for the terminal is possible and if handover is executed, NG-RAN-1 may determine its target cell.

Step 5: NG-RAN-1 may reject the resource allocation request for the PDU session for S-NSSAI-2. At this time, NG-RAN-1 may inform the AMF and the SMF of the reason for rejecting the resource allocation request for the PDU session for S-NSSAI-2. For example, NG-RAN-1 may notify the AMF and the SMF of an indication or cause including information that the reason for rejecting the request is to move the terminal to the frequency band used by S-NSSAI-2. In addition, NG-RAN-1 may notify the AMF and the SMF that the PDU session establishment accept message has not been delivered to the UE through the corresponding rejection reason.

Step 6: The AMF transmits Nsmf_PDUSession_UpdateSMContext Request message to each SMF (e.g. SMF-2) that manages PDU sessions for S-NSSAI-2, such that the AMF may deliver the information received in step 5 to each SMF (e.g., SMF-2). For example, the AMF may transmit an indication or cause including information that the resource allocation request for the PDU session for S-NSSAI-2 is rejected and information indicating that the UE required to be moved to the frequency band used by S-NSSAI-2 to SMF (e.g., SMF-2).

The SMF (e.g., SMF-2) receiving this information may decide to postpone the resource allocation request for the PDU session for S-NSSAI-2 until the handover or RRC release with redirection of the terminal is completed.

Step 7: The SMF (e.g., SMF-2) sends Namf_EventExposure_Subscribe Request message to AMF, such that the SMF (e.g., SMF-2) may request to be notified of the location change of the UE when an event in which the current location of the UE is changed occurs. The reason SMF (e.g. SMF-2) performs these requests is to request resource allocation for the PDU session for S-NSSAI-2 to the NG-RAN (e.g., NG-RAN-2) again as soon as the handover or RRC release with redirection of the terminal is completed.

Step 8: NG-RAN-1 may initiate an NG-based handover procedure while transmitting a Handover Required message to AMF. The Handover Required message may include PDU session information for S-NSSAI-1 served by NG-RAN-1. In addition, the Handover Required message may include an indication or cause value indicating that the reason why the current handover procedure was started is that the UE needs to move to a frequency band served by S-NSSAI-2. To inform the AMF and target NG-RAN (here, NG-RAN-2), this indication or cause value may be included in the Handover Required message.

NG-RAN-1 may transmit a request to the AMF to deactivate the PDU session for S-NSSAI-1 to the AMF in step 8 together with a Handover Required message.

Step 9: NG-based handover procedure can be performed. For example, some of the NG-based handover procedures (e.g., operation of the source AMF selecting target AMF, operation of the source AMF sending a UE context request to the target AMF, operation of the target AMF requesting SM context update from SMF, operation of the SMF selecting the UPF, operation of SMF modifying (or establishing) an N4 session with UPF, operation of the SMF sending an SM context update response message to the target AMF, operation of the Target AMF performs PDU handover response supervision, etc.) according to the prior art may be performed. In this process, each SMF (e.g. SMF-1) managing the PDU session for S-NSSAI-1 may know that the corresponding PDU session will be handover to the target NG-RAN (here, NG-RAN-2) and may decide whether to accept the handover. If the SMF (e.g., SMF-1) accepts the handover, the SMF (e.g., SMF-1) allocates anew UL CN Tunnel Info for N3 tunnel for the corresponding PDU session through UPF, the SMF (e.g., SMF-1) may deliver allocated UL CN Tunnel Info for N3 tunnel information to the AMF.

For reference, in step 8, NG-RAN-1 may transmit a request to the AMF to deactivate the PDU session for S-NSSAI-1 together with a Handover Required message to the AMF. In this case, the AMF sends an Nsmf_PDUSession_UpdateSMContext Request message to each SMF (e.g., SMF-1) that manages PDU sessions for S-NSSAI-1 in step 9, such that the AMF may request deactivation for each PDU session.

Step 10: The AMF may transmit a Handover Request message to NG-RAN-2. The Handover Request message may include information about the reason why handover started and information about the PDU session for S-NSSAI-1 for which SMF accepted handover in Step 9.

Step 11: Since NG-RAN-2 cannot support S-NSSAI-1, it may reject the setup request for the PDU session for S-NSSAI-1. In this case, except for the PDU session for S-NSSAI-1, there may be no PDU session in which NG-RAN-2 can currently service the terminal. At this time, NG-RAN-2 may refer to the cause sent by NG-RAN-1 to prevent NG-RAN-2 from rejecting the corresponding handover procedure. For example, even if there is no PDU Session in which NG-RAN-2 can service the current terminal, since NG-RAN-2 has identified the cause, NG-RAN-2 can accept handover because it knows that the terminal must move to the frequency band served by S-NSSAI-2. Therefore, NG-RAN-2 may transmit a Handover Request Acknowledge message to AMF. In addition, NG-RAN-2 may inform AMF that the setup request for the PDU session for S-NSSAI-1 has been rejected (Example: List of rejected PDU sessions for S-NSSAI-1 and reasons) through the corresponding message.

Since NG-RAN-2 rejected the setup request for the PDU session for S-NSSAI-1, it can notify the terminal that the radio resources for the corresponding PDU session have been released. In addition, NG-RAN-2 may transmit an RRC message including information for redirecting the terminal to the frequency band used by S-NSSAI-2 in the Handover Request Acknowledge message.

For reference, the Handover Request message transmitted in Step 10 may not include PDU Session information that can be serviced in NG-RAN-2 at all. In this case, NG-RAN-1 may include "Indication (or information) (e.g. it can be a separate indication or information other than cause) to prevent NG-RAN-2 from rejecting the Handover message (e.g. Handover message not to be treated as an error) "in the Handover Required message and deliver it to NG-RAN-2 through the AMF.

For reference, even if NG-RAN-2 does not support S-NSSAI-1, after NG-RAN-2 accepts the handover request for the PDU session for S-NSSAI-1, by not allocating resources for actual data transmission, it is possible to prevent a handover procedure from being rejected. For example, as NG-RAN-2 refers to the cause or indication sent by NG-RAN-1, even if you do not support S-NSSAI-1, after accepting the handover request for the PDU session for S-NSSAI-1, it is also possible to avoid rejection of the corresponding handover procedure by not allocating resources for actual data transmission. In this case, NG-RAN-2 may include a separate indication for notifying NG-RAN-1, AMF, and SMF of this situation in the Handover Request Acknowledge message. Since the terminal may know that the radio resources for the PDU session for S-NSSAI-1 are not allocated by NG-RAN-2 through the RRC message, the terminal may not attempt uplink data transmission for the corresponding PDU session.

Step 12: The AMF may check the PDU session list for S-NSSAI-1 for which the setup request was rejected and the reason included in the Handover Request Acknowledge message of NG-RAN-2. After that, the AMF transmits Nsmf_PDUSession_UpdateSMContext Request message (including UP deactivate information) to each SMF (e.g., SMF-1), such that the AMF may request deactivation instead of release for the corresponding PDU session. The AMF may know this through the Handover cause transmitted by NG-RAN-1 in Step 8 and the Reject cause transmitted by NG-RAN-2 in Step 11. The AMF may transmit a separate indication requesting deactivation along with the PDU session list for S-NSSAI-1 rejected by NG-RAN-2 in Step 11.

For reference, in Step 11, NG-RAN-2 may accept the PDU session list for S-NSSAI-1 and may not allocate resources for actual data transmission instead. In this case, NG-RAN-2 may inform the AMF of the situation through a separate indication. The AMF may request deactivation for the PDU session for S-NSSAI-1 from the SMF through the corresponding indication.

For reference, in step 8, when NG-RAN-1 transmits a request to AMF to deactivate the PDU session for S-NSSAI-1 together with a Handover Required message, steps 12 to 14 may be omitted.

Step 13: The SMF (e.g. SMF-1) uses the N4 Session Release procedure or the N4 Session Modification procedure, such that the SMF (e.g., SMF-1) may request the UPF to delete the AN Tunnel Info for N3 tunnel information for the PDU session for S-NSSAI-1 received in Step 12. By making such a request, the SMF can prevent additional data transmission to the NG-RAN.

Step 14: The SMF may transmit Nsmf_PDUSession_UpdateSMContext Response message or other message to AMF, such that the SMF may inform that the PDU session deactivation requested by the AMF has been successfully processed. The message may include information about the deactivated PDU session (e.g., PDU session ID (s) for S-NSSAI-1 and the reason for deactivation of the PDU session, etc.).

Step 15: The AMF may transmit a Handover Command message to NG-RAN-1 based on the information received in Step 11. At this time, the AMF may transmit the RRC message generated by NG-RAN-2 to NG-RAN-1 along with a Handover Command message. In addition, the AMF may transmit information about a PDU session, which is deactivated as the operations of Steps 12 to 14 is performed, for S-NSSAI-1 to NG-RAN-1 along with a Handover Command message.

For reference, the Handover Request Acknowledge message and the Handover Command message may not include PDU session information that can be serviced to the UE through NG-RAN-2 at all. To ensure that the receiving node (e.g. AMF or NG-RAN-1) does not treat this case as an error, NG-RAN-2 or the AMF can deliver a separate indication in addition to the cause to the corresponding N2 message. That is, an indication to ignore the mandatory field related to the PDU session context may be added in each N2 message.

Step 16: NG-RAN-1 delivers the RRC message received from NG-RAN-2 to the terminal. The corresponding RRC message may include information necessary for redirection to the frequency band used by S-NSSAI-2. At this time, the terminal may release all radio resources allocated for the PDU session for S-NSSAI-1.

Step 17: After the configuration for redirection is completed, the UE may respond to NG-RAN-2 by transmitting an RRC message to NG-RAN-2.

Step 18: NG-RAN-2 may notify that the UE has successfully moved to NG-RAN-2 by sending a Handover Notify message to AMF.

Step 19: The AMF sends Namf_EventExposure_Notify message to SMF, the AMF may notify the SMF that a mobility event for the UE has occurred. For example, the AMF may transmit a Namf_EventExposure_Notify message including information that the location of the UE has changed (e.g., UE location change) to the SMF.

Step 20: After confirming that the Handover procedure for the UE has ended through Step 19, the SMF may resume processing of the PDU session creation request for S-NSSAI-2. The SMF may perform a PDU session establishment procedure for S-NSSAI-2. For example, operations of steps 10 to 19 in the examples of FIGS. 8*a* and 8*b* may be performed.

1-2. Second Example of the First Example of the Disclosure of the Present Specification Hereinafter, a second example of the first example of the disclosure of the present specification will be described with reference to examples of FIGS. 12*a* to 12*c*.

The following drawings are made to explain a specific example of the present specification. Since the names of specific devices or names of specific signals/messages/fields described in the drawings are provided as examples, the technical features of the present specification are not limited to the specific names used in the drawings below.

Figure 12A:
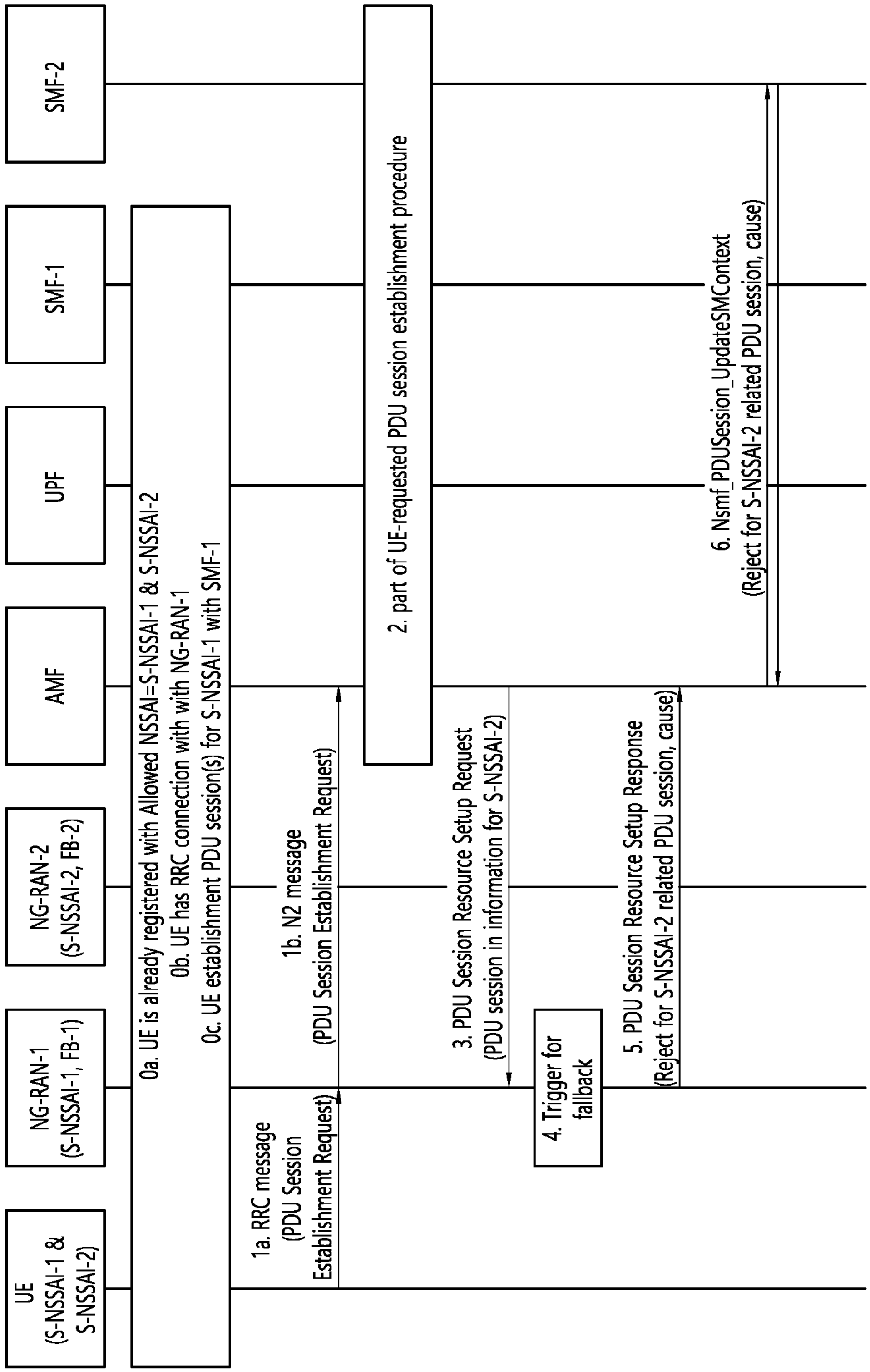
FIGS. 12*a* to 12*c* show signal flow diagrams according to a second example of the first example of the disclosure of the present specification.
Figure 12B:
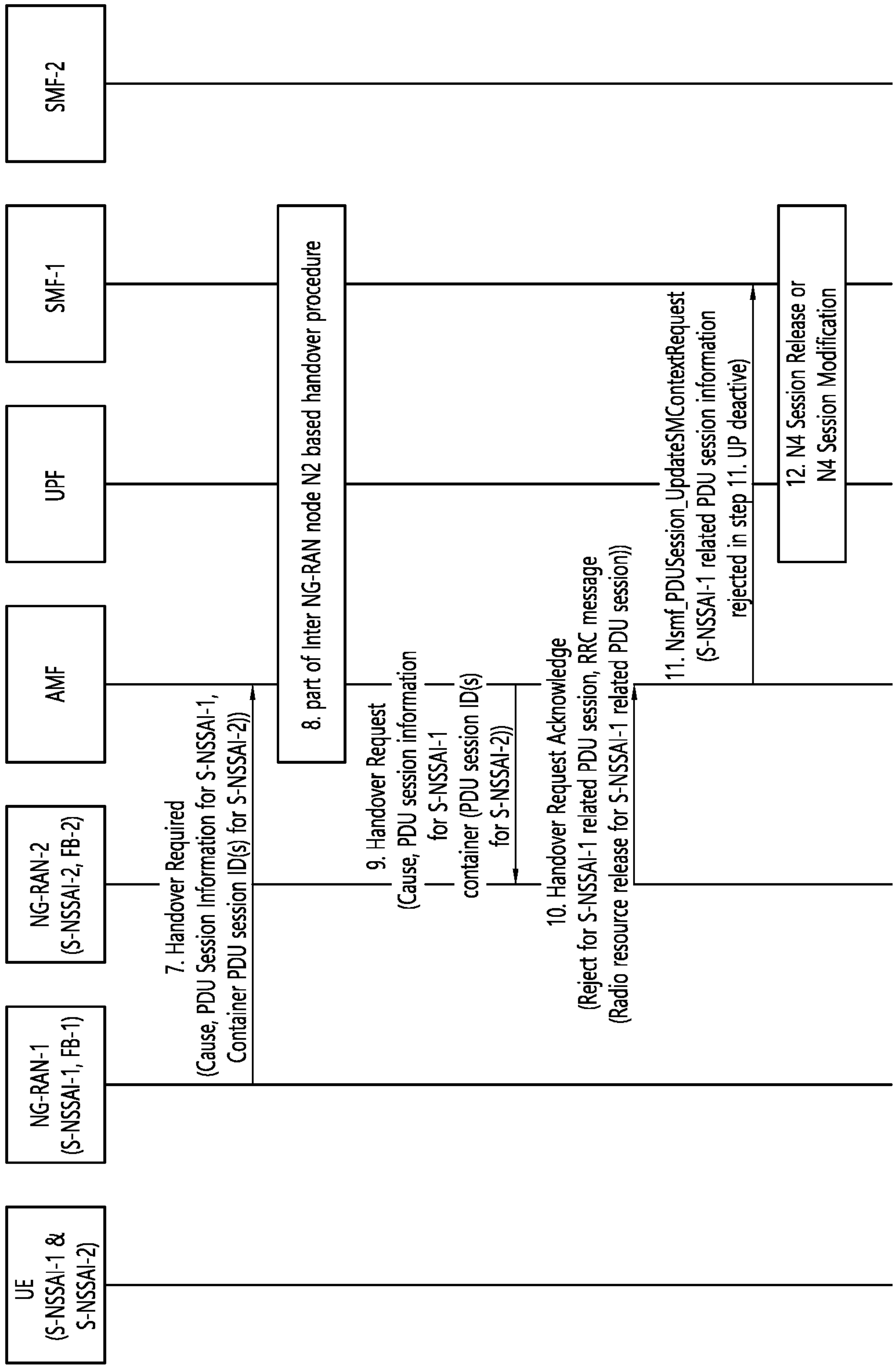
Figure 12C:
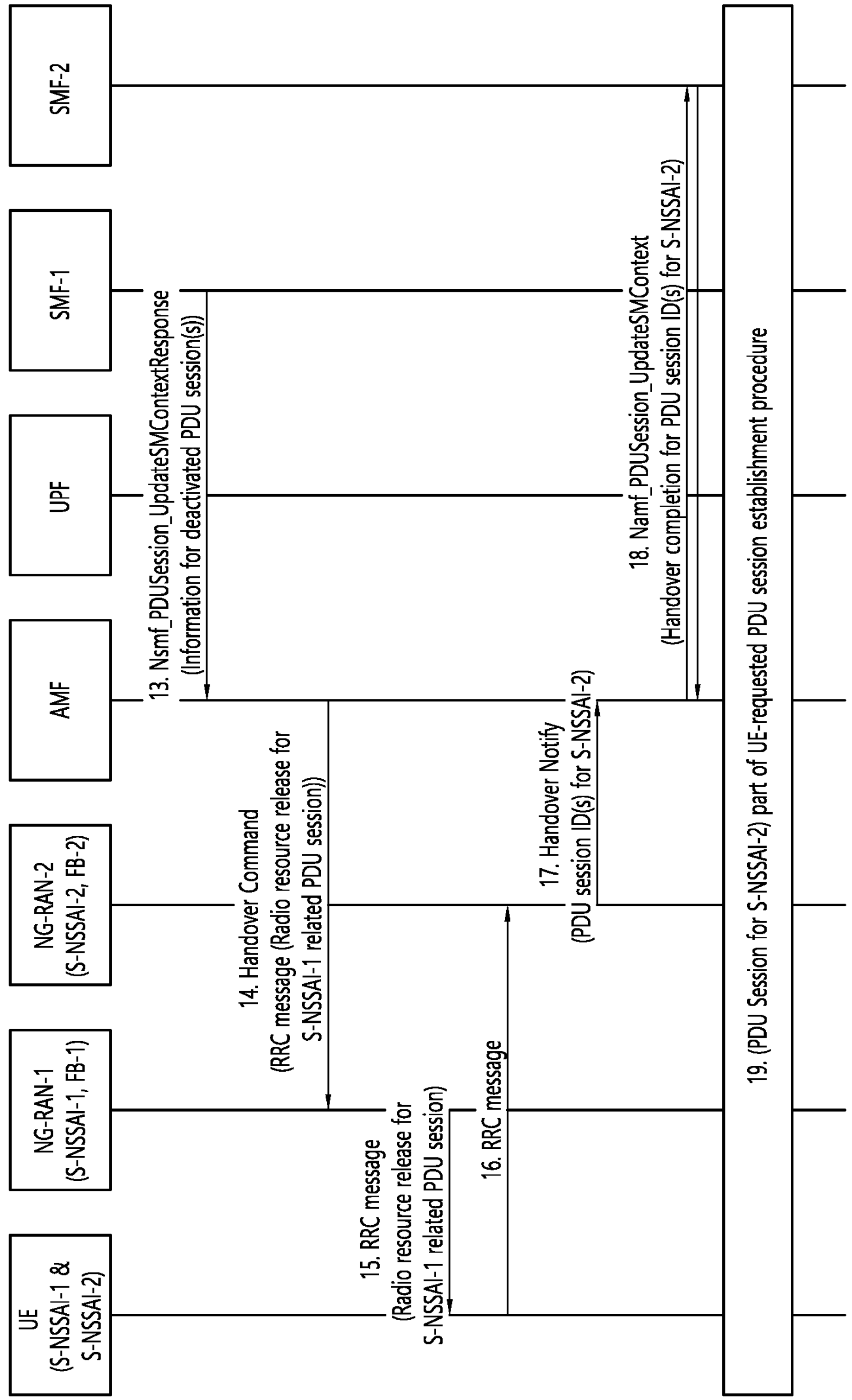

FIGS. 12*a* to 12*c* show signal flow diagrams according to a second example of the first example of the disclosure of the present specification.

The examples of FIGS. 12*a* to 12*c* may include an operation in which the target NG-RAN notifies the SMF of handover termination for the UE through AMF, in the process of changing the frequency band of the terminal using NG-based handover.

In describing the examples of FIGS. 12*a* to 12*c*, descriptions of overlapping contents with the examples of FIGS. 11*a* to 11*c* will be omitted. In other words, the examples of FIGS. 12*a* to 12*c* will be described below, focusing on differences between the examples of FIGS. 12*a* to 12*c* and the examples of FIGS. 11*a* to 11*c*.

Steps 0 to 6: Steps 0 to 6 in the example of FIGS. 12*a* to 12*c* may be performed in the same manner as steps 0 to 6 in the example of FIGS. 11*a* to 11*c*.

Step 7: NG-RAN-1 may initiate an NG-based handover procedure while transmitting a Handover Required message to AMF. The Handover Required message may include PDU session information for S-NSSAI-1 served by NG-RAN-1. In addition, the Handover Required message may include an indication or cause value indicating that the reason why the current handover procedure was started is that the UE needs to move to a frequency band served by S-NSSAI-2. To inform the AMF and target NG-RAN (here, NG-RAN-2), this indication or cause value may be included in the Handover Required message.

In addition, NG-RAN-1 may include the PDU session ID(s) for S-NSSAI-2 received in Step 3 in the Source to Target Transparent Container and transmit it to the target NG-RAN (here, NG-RAN-2). When the handover procedure is completed, the target NG-RAN (here, NG-RAN2) may deliver corresponding information (e.g., PDU session ID (s) for S-NSSAI-2) to the AMF. Then, the AMF may find each SMF that manages the PDU sessions for S-NSSAI-2 and notify the SMF of that handover is completed.

NG-RAN-1 may transmit a request to the AMF to deactivate the PDU session for S-NSSAI-1 to the AMF in step 7 together with a Handover Required message.

Step 8: Step 8 in the examples of FIGS. 12*a* to 12*c* may be performed in the same manner as step 9 in the examples of FIGS. 11*a* to 11*c*.

For reference, in step 7, NG-RAN-1 may transmit a request to the AMF to deactivate the PDU session for S-NSSAI-1 together with a Handover Required message to the AMF. In this case, the AMF sends an Nsmf_PDUSession_UpdateSMContext Request message to each SMF (e.g., SMF-1) that manages PDU sessions for S-NSSAI-1 in step 8, such that the AMF may request deactivation for each PDU session.

Step 9: The AMF may transmit a Handover Request message to NG-RAN-2. The Handover Request message may include a Source to Target Transparent Container including the reason why the handover started and the PDU session ID(s) for S-NSSAI-2, and information about the PDU session for S-NSSAI-1 for which the SMF accepted Handover.

Step 10: Step 10 in the example of FIGS. 12*a* to 12*c* may be performed in the same manner as step 11 in the example of FIGS. 11*a* to 11*c*.

For reference, the Handover Request message transmitted in Step 9 may not include PDU Session information that can be serviced in NG-RAN-2 at all. In this case, NG-RAN-1 may include "Indication (or information) (e.g. it can be a separate indication or information other than cause) to prevent NG-RAN-2 from rejecting the Handover message (e.g. Handover message not to be treated as an error) "in the Handover Required message and deliver it to NG-RAN-2 through the AMF.

For reference, even if NG-RAN-2 does not support S-NSSAI-1, after NG-RAN-2 accepts the handover request for the PDU session for S-NSSAI-1, by not allocating resources for actual data transmission, it is possible to prevent a handover procedure from being rejected. For example, as NG-RAN-2 refers to the cause or indication sent by NG-RAN-1, even if you do not support S-NSSAI-1, after accepting the handover request for the PDU session for S-NSSAI-1, it is also possible to avoid rejection of the corresponding handover procedure by not allocating resources for actual data transmission. In this case, NG-RAN-2 may include a separate indication for notifying NG-RAN-1, AMF, and SMF of this situation in the Handover Request Acknowledge message. Since the terminal may know that the radio resources for the PDU session for S-NSSAI-1 are not allocated by NG-RAN-2 through the RRC message, the terminal may not attempt uplink data transmission for the corresponding PDU session.

Step 11: Step 11 in the example of FIGS. 12*a* to 12*c* may be performed in the same manner as step 12 in the example of FIGS. 11*a* to 11*c*.

For reference, in Step 10, NG-RAN-2 may accept the PDU session list for S-NSSAI-1 and may not allocate resources for actual data transmission instead. In this case, NG-RAN-2 may inform the AMF of the situation through a separate indication. The AMF may request deactivation for the PDU session for S-NSSAI-1 from the SMF through the corresponding indication.

For reference, in step 7, if NG-RAN-1 transmits a request to AMF to deactivate the PDU session for S-NSSAI-1 together with a Handover Required message, steps 11 to 13 may be omitted.

Steps 12 to 13: Steps 12 to 13 in the example of FIGS. 12*a* to 12*c* may be performed in the same manner as steps 13 to 14 in the example of FIGS. 11*a* to 11*c*.

Step 14: Step 14 in the example of FIGS. 12*a* to 12*c* may be performed in the same manner as step 15 in the example of FIGS. 11*a* to 11*c*.

For reference, the Handover Request Acknowledge and Handover Command messages may not include PDU session information that can be serviced to the UE through NG-RAN-2 at all. In this case, in order to prevent the receiving node (e.g., AMF or NG-RAN-1) from treating it as an error, a separate indication other than the cause may be added to the corresponding N2 message and delivered. That is, an indication to ignore the mandatory field related to the PDU session context may be added to each N2 message.

Step 15 to 16: Steps 15 to 16 in the example of FIGS. 12*a* to 12*c* may be performed in the same manner as steps 16 to 17 in the example of FIGS. 11*a* to 11*c*.

Step 17: NG-RAN-2 may notify that the UE has successfully moved to NG-RAN-2 by sending a Handover Notify message to AMF. In this process, NG-RAN-2 may transmit a Handover Notify message including the PDU session ID(s) for S-NSSAI-2 received in step 9.

Step 18: Since the AMF stores the relationship between PDU session ID and the SMF, based on the PDU session IDs received in step 17, the AMF may find each SMF (e.g., SMF-2) that manages PDU sessions for S-NSSAI-2. The AMF transmits the Nsmf_PDUSession_UpdateSMContext Request message to individual SMFs (e.g., SMF-2), such that the AMF may notify the SMF that the handover for the corresponding PDU session has ended.

Step 19: The SMF (e.g., SMF-2) that has confirmed that the handover procedure for the terminal has ended through Step 18 may resume processing of the PDU session creation request for S-NSSAI-2. The SMF may perform a PDU session establishment procedure for S-NSSAI-2. For example, operations of steps 10 to 19 in the examples of FIGS. 8A and 8B may be performed.

1-3. A Third Example of the First Example of the Disclosure of the Present Specification Hereinafter, a third example of the first example of the disclosure of the present specification will be described with reference to examples of FIGS. 13*a* to 13*c*.

The following drawings are made to explain a specific example of the present specification. Since the names of specific devices or names of specific signals/messages/fields described in the drawings are provided as examples, the technical features of the present specification are not limited to the specific names used in the drawings below.

Figure 13A:
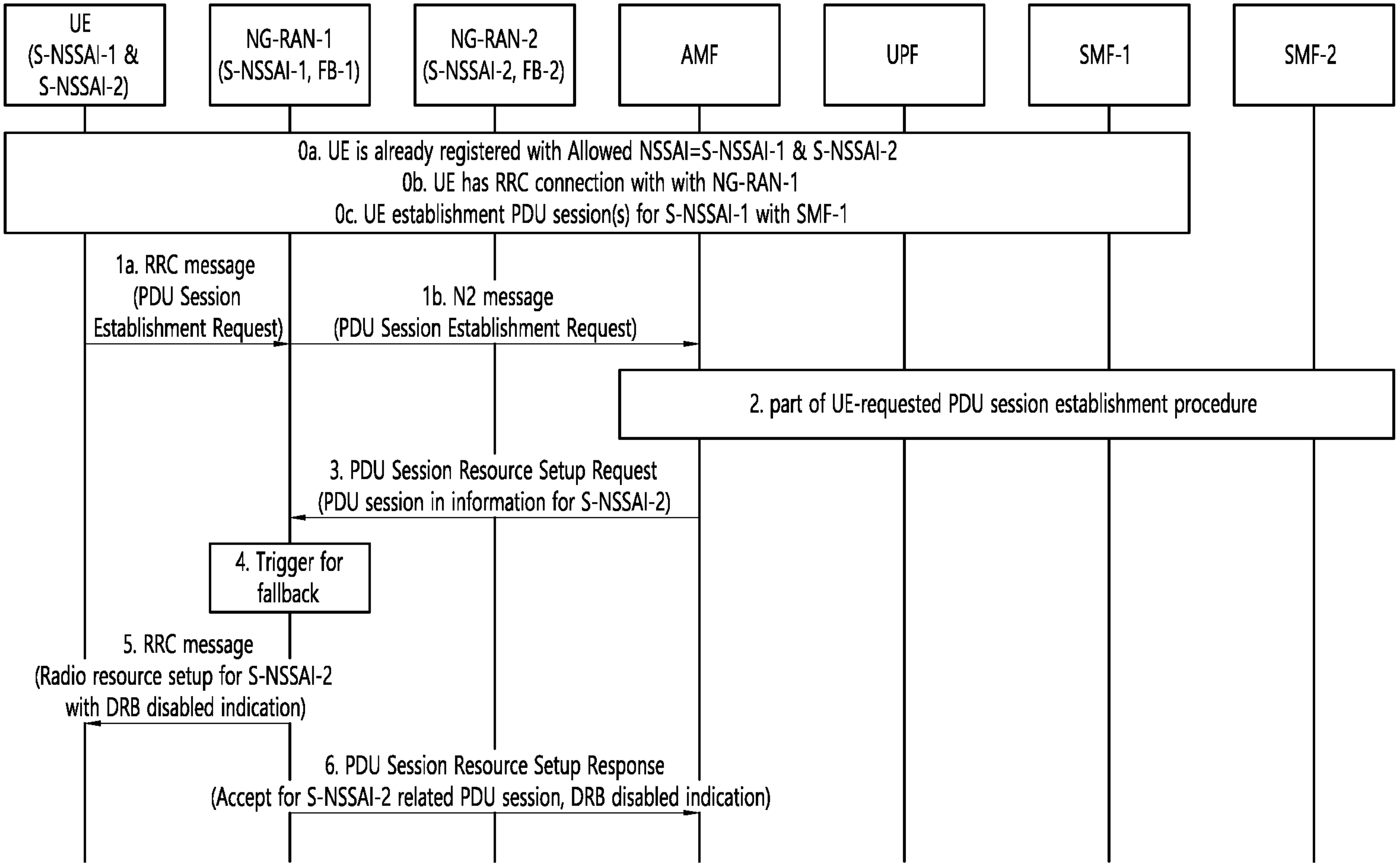
FIGS. 13*a* to 13*c* show signal flow diagrams according to a third example of the first example of the disclosure of the present specification.
Figure 13B:
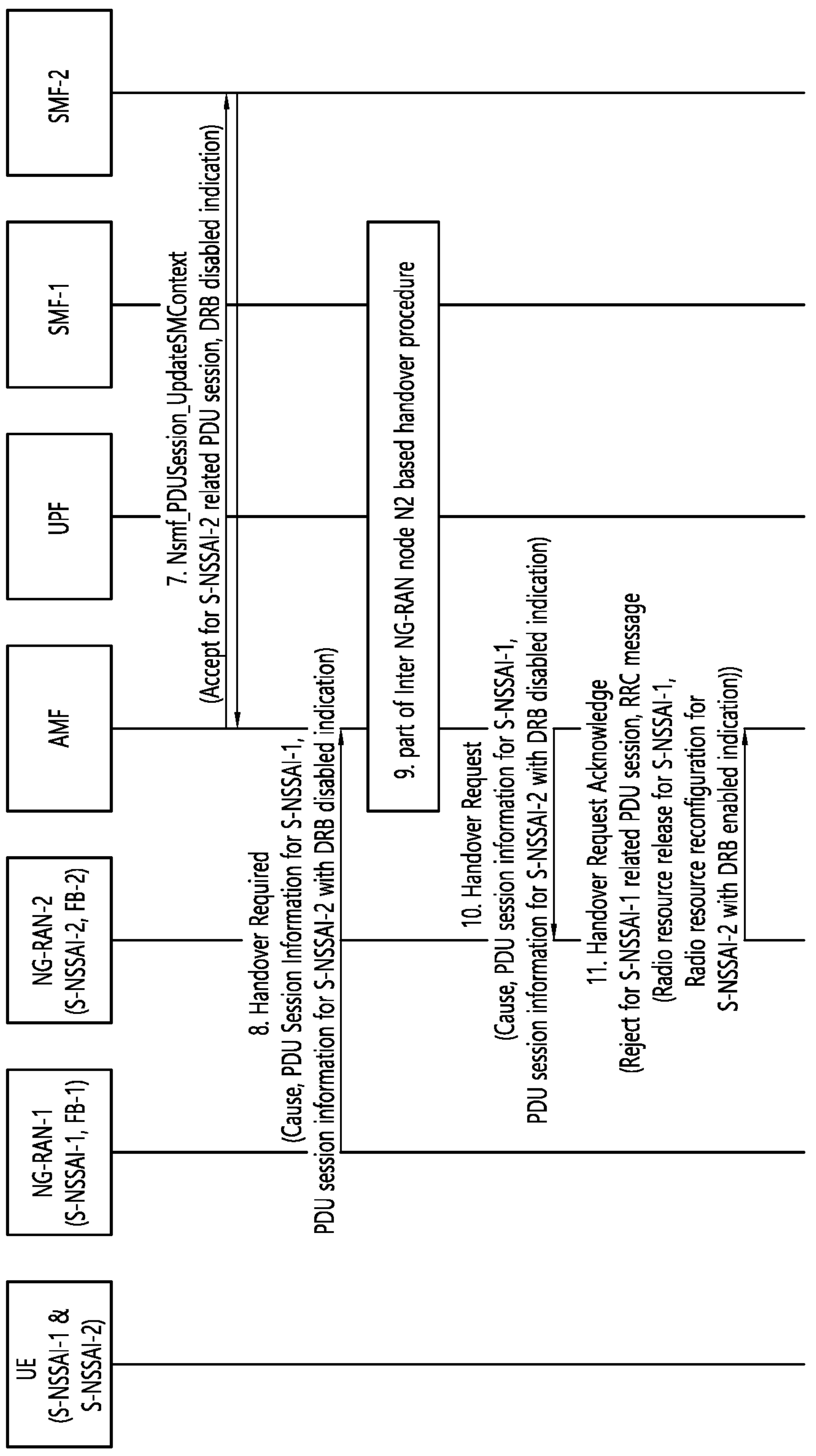
Figure 13C:
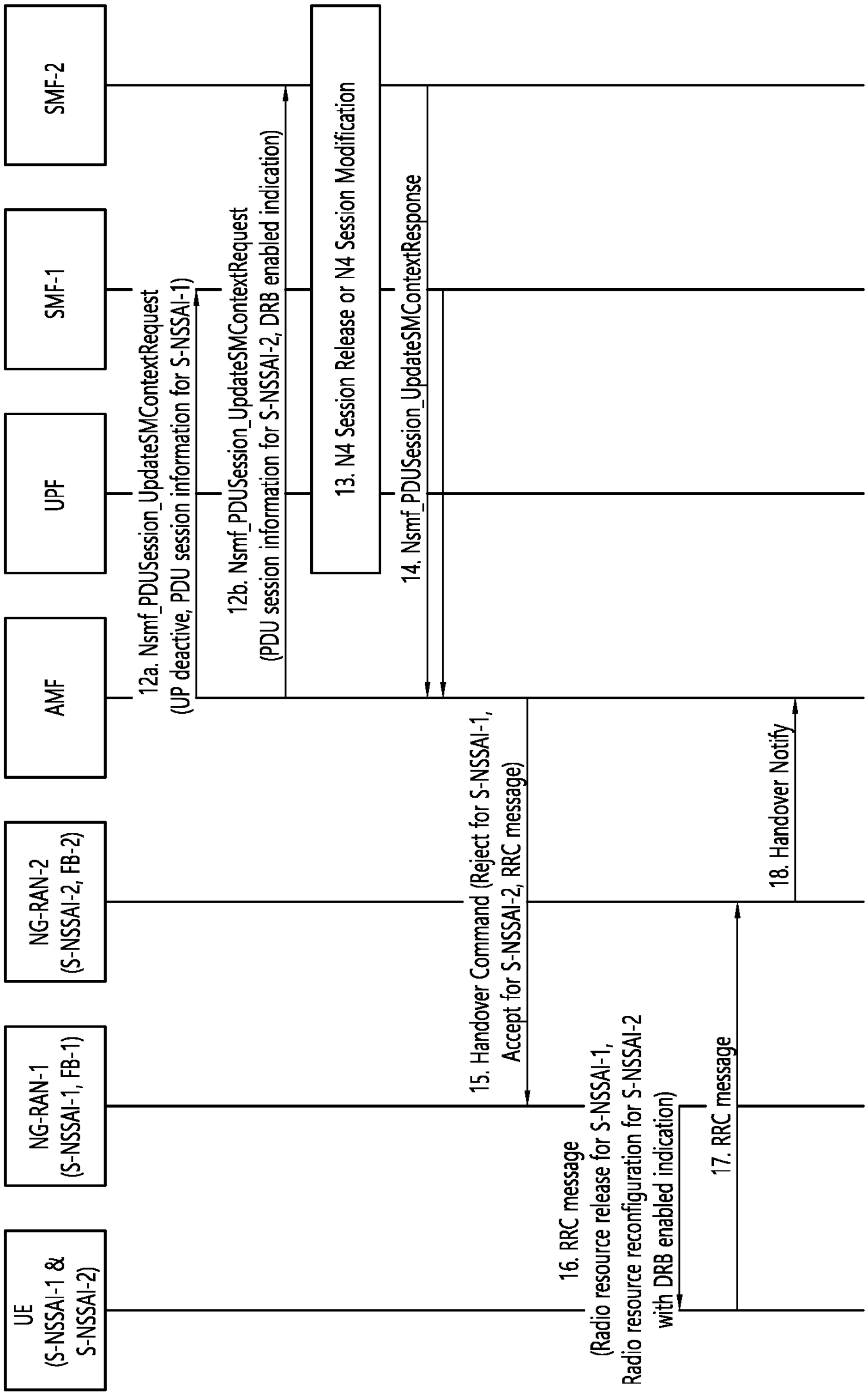

FIGS. 13*a* to 13*c* show signal flow diagrams according to a third example of the first example of the disclosure of the present specification.

The examples of FIGS. 13*a* to 13*c* may include an operation in which the target NG-RAN allocates actual radio resources after handover is terminated, after creating only the context for the PDU session regardless of whether the source NG-RAN supports S-NSSAI, in the process of changing the frequency band of the UE using NG-based handover.

In describing the examples of FIGS. 13*a* to 13*c*, descriptions of overlapping contents with the examples of FIGS. 11*a* to 11*c* will be omitted. In other words, the examples of FIGS. 13*a* to 13*c* will be described below, focusing on differences between the examples of FIGS. 13*a* to 13*c* and the examples of FIGS. 11*a* to 11*c*.

Steps 0 to 4: Steps 0 to 4 in the example of FIGS. 13*a* to 13*c* may be performed in the same manner as steps 0 to 4 in the example of FIGS. 11*a* to 11*c*.

Step 5-6: Although NG-RAN-1 does not support S-NSSAI-2, it may accept the resource allocation request for the PDU session for S-NSSAI-2. That is, NG-RAN-1 may determine the NG-RAN configuration (e.g., SDAP configuration, DRB configuration, etc.) for the PDU session for S-NSSAI-2 based on the information transmitted by the SMF in step 3. In addition, NG-RAN-1 may inform the terminal and SMF of the NG-RAN configuration for the PDU session for S-NSSAI-2 through an RRC message and a PDU Session Resource Setup Response message, respectively. However, NG-RAN-1 only creates a context for the PDU session for S-NSSAI-2, and may not allocate actual radio resources. NG-RAN-1 may notify the terminal and SMF that the context for the corresponding PDU session has been created, but actual data cannot be transmitted because the DRB is disabled.

The RRC message delivered to the terminal may also include the PDU session establishment accept message received in Step 3.

Step 7: The AMF may deliver the information received in step 6 by sending an Nsmf_PDUSession_UpdateSMContext Request message to each SMF (e.g., SMF-2) that manages PDU sessions for S-NSSAI-2. The AMF sends anNsmf_PDUSession_UpdateSMContext Request message to each SMF (e.g., SMF-2) that manages PDU sessions for S-NSSAI-2, such that the AMF may deliver the information received in step 5 to each SMF (e.g., SMF-2).

The SMF that received "DRB disabled indication" may know that resource allocation for the PDU session for S-NSSAI-2 has been made, but actual data transmission must wait until the handover of the terminal or RRC release with redirection is completed.

Step 8: NG-RAN-1 may initiate an NG-based handover procedure while transmitting a Handover Required message to AMF. The Handover Required message may include PDU session information for S-NSSAI-1 served by NG-RAN-1. In addition, the Handover Required message may include an indication or cause value indicating that the reason why the current handover procedure was started is that the UE needs to move to a frequency band served by S-NSSAI-2. To inform the AMF and target NG-RAN (here, NG-RAN-2), this indication or cause value may be included in the Handover Required message.

In addition, the Handover Required message may also include PDU session information for S-NSSAI-2 determined in Step 5-6. NG-RAN-1 may inform the target NG-RAN (here, NG-RAN-2) that the DRB is currently disabled for the corresponding PDU session.

Step 9: Step 9 in the examples of FIGS. 13*a* to 13*c* may be performed in the same manner as step 9 in the examples of FIGS. 11*a* to 11*c*.

For reference, in step 8, NG-RAN-1 may transmit a request to the AMF to deactivate the PDU session for S-NSSAI-1 together with a Handover Required message to the AMF. In this case, the AMF sends an Nsmf_PDUSession_UpdateSMContext Request message to each SMF (e.g., SMF-1) that manages PDU sessions for S-NSSAI-1 in step 9, such that the AMF may request deactivation for each PDU session.

Step 10: Step 10 in the example of FIGS. 13*a* to 13*c* may be performed in the same manner as step 10 in the example of FIGS. 11*a* to 11*c*.

In addition, the message includes that the current DRB is disabled in the case of the PDU session for S-NSSAI-2.

Step 11: Since NG-RAN-2 cannot support S-NSSAI-1, it may reject the setup request for the PDU session for S-NSSAI-1. However, since NG-RAN-2 supports S-NSSAI-2, the setup request for the PDU session for S-NSSAI-2 can be accepted. Therefore, in the case of a PDU session for S-NSSAI-2, the NG-RAN configuration (e.g., SDAP configuration, DRB configuration, etc.) can be updated according to the situation (e.g., radio resource, network configuration, etc.) of NG-RAN-2. In addition, NG-RAN-2 may include new AN Tunnel Info for N3 tunnel information of the PDU session for S-NSSAI-2 in the Handover Request Acknowledge message and deliver it to the AMF. In addition, NG-RAN-2 may inform SMF through the AMF that the DRB related to the PDU session for S-NSSAI-2 is enabled. Through this message, NG-RAN-2 can inform the AMF that the setup request for the PDU session for S-NSSAI-1 has been rejected (i.e. rejected PDU session list for S-NSSAI-1 and reason).

Since NG-RAN-2 rejected the setup request for the PDU session for S-NSSAI-1, it can notify the terminal that the radio resources for the corresponding PDU session have been released. In addition, NG-RAN-2 may transmit an RRC message including information for redirecting the terminal to the frequency band used by S-NSSAI-2 in the Handover Request Acknowledge message. When NG-RAN-2 updates the NG-RAN configuration (e.g., SDAP configuration, DRB configuration, etc.) for the PDU session for S-NSSAI-2, NG-RAN-2 may include the corresponding update content in the RRC message and deliver it to the UE. In addition, along with the transmission of the RRC message, NG-RAN-2 may notify the UE that the DRB related to the PDU session for S-NSSAI-2 is enabled.

For reference, even if NG-RAN-2 does not support S-NSSAI-1, after NG-RAN-2 accepts the handover request for the PDU session for S-NSSAI-1, by not allocating resources for actual data transmission, it is possible to prevent a handover procedure from being rejected. For example, as NG-RAN-2 refers to the cause or indication sent by NG-RAN-1, even if you do not support S-NSSAI-1, after accepting the handover request for the PDU session for S-NSSAI-1, it is also possible to avoid rejection of the corresponding handover procedure by not allocating resources for actual data transmission. In this case, NG-RAN-2 may include a separate indication for notifying NG-RAN-1, AMF, and SMF of this situation in the Handover Request Acknowledge message. Since the terminal may know that the radio resources for the PDU session for S-NSSAI-1 are not allocated by NG-RAN-2 through the RRC message, the terminal may not attempt uplink data transmission for the corresponding PDU session.

Step 12: The AMF may check the PDU session list for S-NSSAI-1 for which the setup request was rejected and the reason included in the Handover Request Acknowledge message of NG-RAN-2. After that, the AMF transmits Nsmf_PDUSession_UpdateSMContext Request message (including UP deactivate information) to each SMF (e.g., SMF-1), such that the AMF may request deactivation instead of release for the corresponding PDU session. The AMF may know this through the Handover cause transmitted by NG-RAN-1 in Step 8 and the Reject cause transmitted by NG-RAN-2 in Step 11. The AMF may transmit a separate indication requesting deactivation along with the PDU session list for S-NSSAI-1 rejected by NG-RAN-2 in Step 11.

The AMF can check the PDU session list included in Handover Request Acknowledge message by NG-RAN-2 for S-NSSAI-2 for which the setup request has been accepted. After that, the AMF sends an Nsmf_PDUSession_UpdateSMContext Request message to each SMF (here, SMF-2), The AMF may request an update of AN Tunnel Info for N3 tunnel information for the corresponding PDU session. At this time, the AMF may also inform that DRB for the corresponding PDU session is enabled in NG-RAN.

For reference, in Step 11, NG-RAN-2 may accept the PDU session list for S-NSSAI-1 and may not allocate resources for actual data transmission instead. In this case, NG-RAN-2 may inform the AMF of the situation through a separate indication. The AMF may request deactivation for the PDU session for S-NSSAI-1 from the SMF through the corresponding indication.

For reference, when NG-RAN-1 transmits a request to deactivate the PDU session for S-NSSAI-1 to AMF in step 8, only operations related to SMF-2 may be performed.

For reference, instead of step 11 and step 12*b*, "DRB enabled indication" may be delivered to AMF through step 18 and then delivered to SMF-2 through Nsmf_PDUSession_UpdateSMContext Request message.

Step 13: The SMF (e.g. SMF-1) uses the N4 Session Release procedure or the N4 Session Modification procedure, such that the SMF (e.g., SMF-1) may request the UPF to delete the AN Tunnel Info for N3 tunnel information for the PDU session for S-NSSAI-1 received in Step 12*a*. By making such a request, the SMF can prevent additional data transmission to the NG-RAN.

By using the N4 Session Release procedure or the N4 Session Modification procedure, the SMF-2 may prepare data transmission to the NG-RAN by requesting the UPF to update the AN Tunnel Info for N3 tunnel information for the PDU session for S-NSSAI-2 received in Step 12*b*.

Step 14: The SMF may transmit Nsmf_PDUSession_UpdateSMContext Response message or other message to AMF, such that the SMF may inform that the PDU session deactivation requested by the AMF has been successfully processed. The message may include information about the deactivated PDU session (e.g., PDU session ID (s) for S-NSSAI-1 and the reason for deactivation, etc.) or information about the updated PDU session (e.g., PDU session ID(s) for S-NSSAI-2, etc.).

Step 15: The AMF may transmit a Handover Command message to NG-RAN-1 based on the information received in Step 11. At this time, the AMF may transmit the RRC message generated by NG-RAN-2 to NG-RAN-1 along with a Handover Command message. In addition, the AMF may transmit information about a PDU session, which is deactivated as the operations of Steps 12 to 14 is performed, for S-NSSAI-1 to NG-RAN-1 along with a Handover Command message.

Step 16: NG-RAN-1 delivers the RRC message received from NG-RAN-2 to the terminal. The corresponding RRC message may include information necessary for redirection to the frequency band used by S-NSSAI-2. At this time, the terminal may release all radio resources allocated for the PDU session for S-NSSAI-1.

In addition, the terminal may also update the configuration according to the configuration information for the PDU session for S-NSSAI-2 sent by NG-RAN-2. In addition, it is possible to enable DRB for the corresponding PDU session (i.e., allocate actual radio resources for the corresponding DRB).

Step 17: After the configuration for redirection is completed, the UE may respond to NG-RAN-2 by transmitting an RRC message to NG-RAN-2.

Step 18: NG-RAN-2 may notify that the UE has successfully moved to NG-RAN-2 by sending a Handover Notify message to the AMF.

2. The Second Example of the Disclosure of the Present Specification

Hereinafter, a second example of the disclosure of the present specification will be described with reference to examples of FIGS. 14*a* to 14*c* and examples of FIGS. 16*a* to 16*c*.

2-1. A First Example of the Second Example of the Disclosure of the Present Specification First, a first example of the second example of the disclosure of the present specification will be described with reference to examples of FIGS. 14*a* to 14*c*.

Basically, in the disclosure of this specification, assumptions such as the following examples may be applied. It is assumed that information on frequency bands available for each network slice is not configured in the terminal. In addition, NG-RAN-1 supports S-NSSAI-1 using Frequency Band 1 (FB-1) frequency band, and NG-RAN-2 supports S-NSSAI-2 using FB-2 frequency band. Assume. In addition, to support when the terminal is trying to move to S-NSSAI, which must use a frequency band different from the frequency band currently in use, additional information (e.g., frequency band used by individual S-NSSAI, priority of individual S-NSSAI, NG-RAN or cell ID list supporting specific S-NSSAI, etc.) may be configured in the NG-RAN.

The following drawings are made to explain a specific example of the present specification. Since the names of specific devices or names of specific signals/messages/fields described in the drawings are provided as examples, the technical features of the present specification are not limited to the specific names used in the drawings below.

Figure 14A:
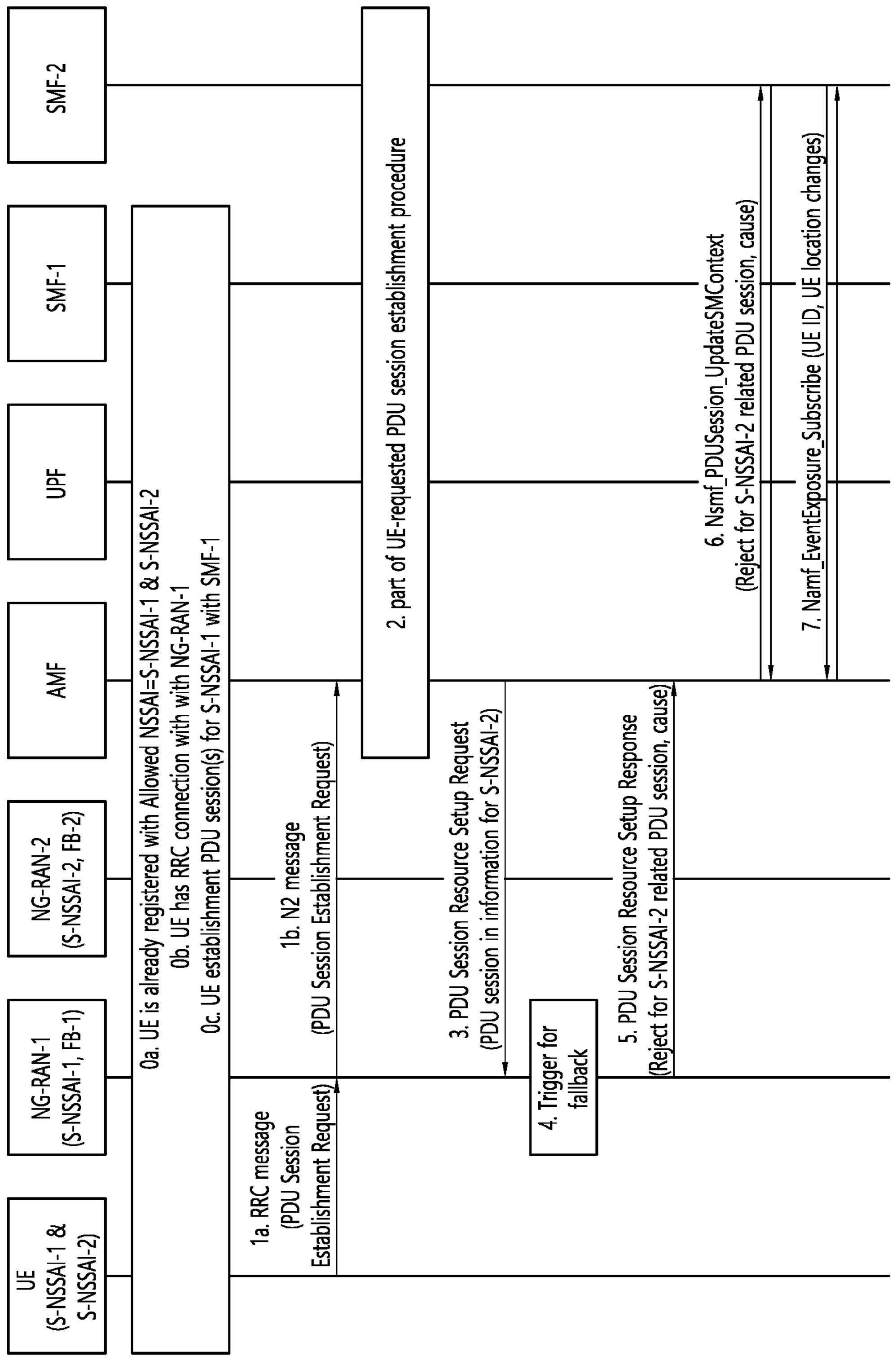
FIGS. 14*a* to 14*c* show signal flow diagrams according to the first example of the second example of the disclosure of the present specification.
Figure 14B:
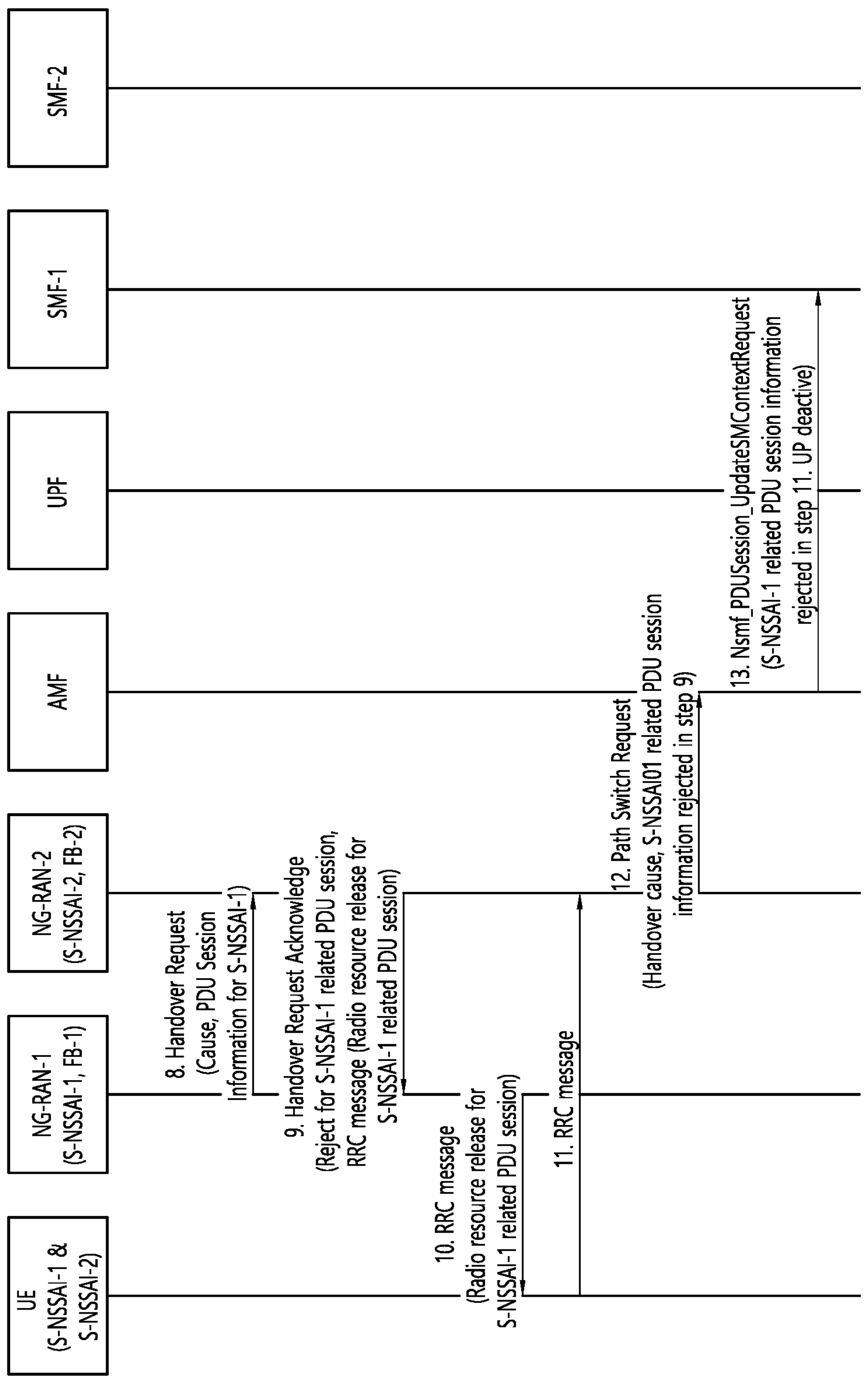
Figure 14C:
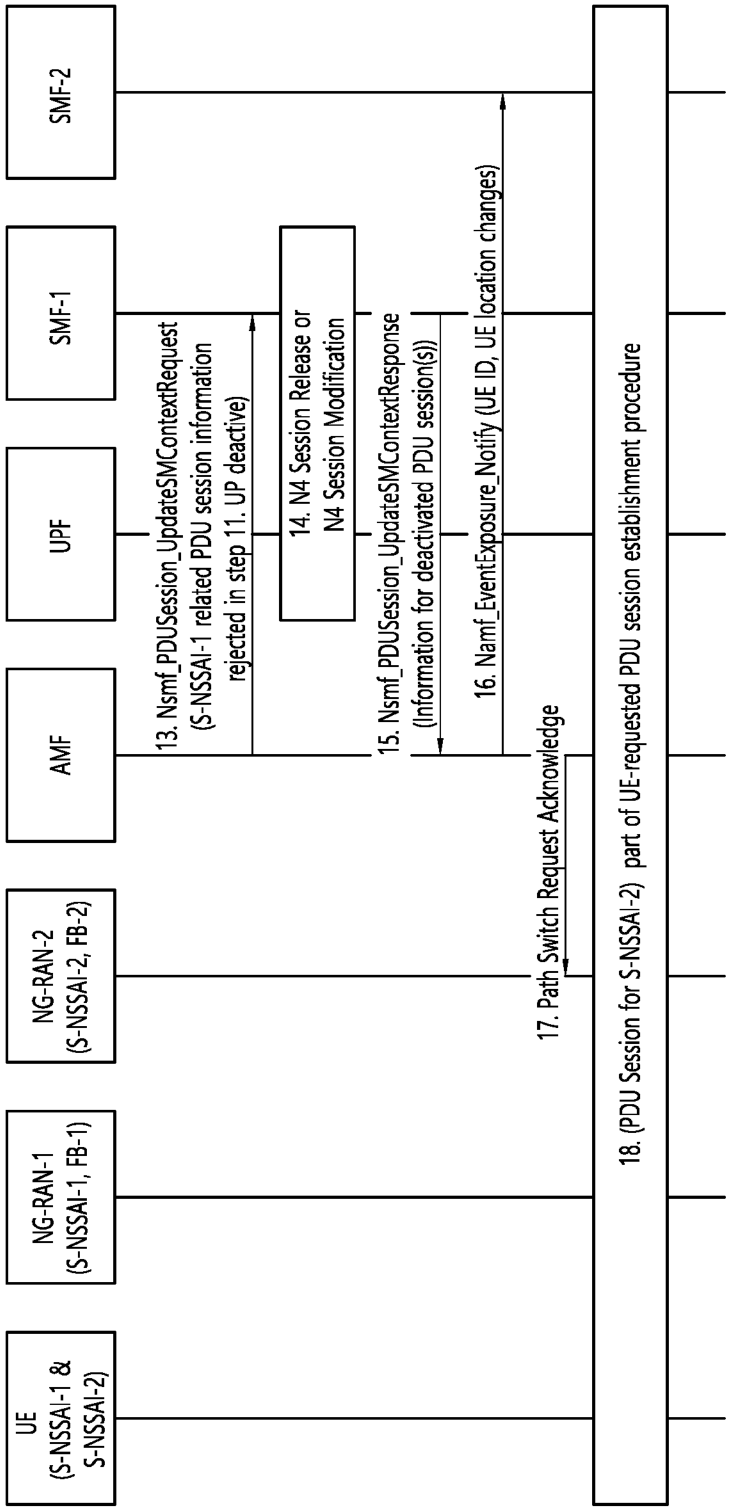

FIGS. 14*a* to 14*c* show signal flow diagrams according to the first example of the second example of the disclosure of the present specification.

The examples of FIGS. 14*a* to 1*c*C may include an operation in which the SMF requests the AMF to inform the UE of handover termination, in the process of changing the frequency band of the terminal using Xn-based handover.

For reference, in describing the examples of FIGS. 14*a* to 14*c*, descriptions of overlapping contents with the examples of FIGS. 11*a* to 11*c* will be omitted. In other words, the examples of FIGS. 14*a* to 14*c* will be described below, focusing on differences between the examples of FIGS. 14*a* to 14*c* and the examples of FIGS. 11*a* to 11*c*.

Steps 0 to 7: Steps 0 to 7 in the example of FIGS. 14*a* to 14*c* may be performed in the same manner as steps 0 to 7 in the example of FIGS. 11*a* to 11*c*.

Step 8: NG-RAN-1 may initiate an Xn-based handover procedure while transmitting a Handover Request message to the target NG-RAN (here, NG-RAN-2). The Handover Request message may include PDU session information for S-NSSAI-1 that NG-RAN-1 is serving. In addition, the Handover Request message may include an indication or cause value notifying that the reason why the current handover procedure is started is that the UE needs to move to a frequency band served by S-NSSAI-2. This indication or cause value may be included in the Handover Request message to inform the target NG-RAN (here, NG-RAN-2).

Step 9: Since NG-RAN-2 cannot support S-NSSAI-1, it may reject the setup request for the PDU session for S-NSSAI-1. In this case, except for the PDU session for S-NSSAI-1, there may be no PDU session in which NG-RAN-2 can currently service the terminal. At this time, NG-RAN-2 may refer to the cause sent by NG-RAN-1 to prevent NG-RAN-2 from rejecting the corresponding handover procedure. For example, even if there is no PDU Session in which NG-RAN-2 can service the current terminal, since NG-RAN-2 has identified the cause, NG-RAN-2 can accept handover because it knows that the terminal must move to the frequency band served by S-NSSAI-2. Therefore, NG-RAN-2 may transmit a Handover Request Acknowledge message to AMF. In addition, NG-RAN-2 may inform AMF that the setup request for the PDU session for S-NSSAI-1 has been rejected (Example: List of rejected PDU sessions for S-NSSAI-1 and reasons) through the corresponding message.

Since NG-RAN-2 rejected the setup request for the PDU session for S-NSSAI-1, it can notify the terminal that the radio resources for the corresponding PDU session have been released. In addition, NG-RAN-2 may transmit an RRC message including information for redirecting the terminal to the frequency band used by S-NSSAI-2 in the Handover Request Acknowledge message.

For reference, the Handover Request message transmitted in Step 10 may not include PDU Session information that can be serviced in NG-RAN-2 at all. In this case, NG-RAN-1 may include "Indication (or information) (e.g. it can be a separate indication or information other than cause) to prevent NG-RAN-2 from rejecting the Handover message (e.g. Handover message not to be treated as an error) "in the Handover Request message and Path Switch Request message and deliver it to NG-RAN-2.

For reference, even if NG-RAN-2 does not support S-NSSAI-1, after NG-RAN-2 accepts the handover request for the PDU session for S-NSSAI-1, by not allocating resources for actual data transmission, it is possible to prevent a handover procedure from being rejected. For example, as NG-RAN-2 refers to the cause or indication sent by NG-RAN-1, even if you do not support S-NSSAI-1, after accepting the handover request for the PDU session for S-NSSAI-1, it is also possible to avoid rejection of the corresponding handover procedure by not allocating resources for actual data transmission. In this case, NG-RAN-2 may include a separate indication for notifying NG-RAN-1, AMF, and SMF of this situation in the Handover Request Acknowledge message. Since the terminal may know that the radio resources for the PDU session for S-NSSAI-1 are not allocated by NG-RAN-2 through the RRC message, the terminal may not attempt uplink data transmission for the corresponding PDU session.

Steps 10 to 11: Steps 10 to 11 in the example of FIGS. 14*a* to 14*c* may be performed in the same manner as steps 16 to 17 in the example of FIGS. 11*a* to 11*c*.

Step 12: NG-RAN-2 may notify that the UE has successfully moved to NG-RAN-2 by transmitting a Path Switch Request message to the AMF. In addition, NG-RAN-2 may inform the AMF that the setup request for the PDU session for S-NSSAI-1 has been rejected (e.g. list of rejected PDU sessions for S-NSSAI-1 and reasons) through the corresponding message.

For reference, the Path Switch Request message may not include PDU session information that can be serviced in NG-RAN-2 at all. In order to prevent NG-RAN-2 from treating this case as an error, NG-RAN-2 may add a separate indication in addition to the cause to the Path Switch Request message and deliver it to AMF. That is, NG-RAN-2 may add an indication to ignore the PDU Session Resource to be Switched in Downlink List Information Element (IE), which is a mandatory field in the current Path Switch Request message.

Step 13: The AMF checks the PDU session list for S-NSSAI-1 for which the setup request included in the Path Switch Request message by NG-RAN-2 has been rejected and the reason for it, the AMF may request deactivation instead of release for the corresponding PDU session through the Nsmf_PDUSession_UpdateSMContext Request message to each SMF. The AMF may know this through the cause sent by NG-RAN-2 in Step 12. The AMF may also transmit a separate indication requesting deactivation along with the PDU session list for S-NSSAI-1 rejected by NG-RAN-2 in Step 12.

For reference, in Step 9, NG-RAN-2 may accept the PDU session list for S-NSSAI-1 and may not allocate resources for actual data transmission instead. In this case, NG-RAN-2 may inform the AMF of the situation through a separate indication. The AMF may request deactivation for the PDU session for S-NSSAI-1 from the SMF through the corresponding indication.

Steps 14 to 15: Steps 14 to 15 in the example of FIGS. 14*a* to 14*c* may be performed in the same manner as steps 13 to 14 in the example of FIGS. 11*a* to 11*c*.

Step 16: The AMF sends Namf_EventExposure_Notify message to SMF, the AMF may notify the SMF that a mobility event for the UE has occurred. For example, the AMF may transmit a Namf_EventExposure_Notify message including information that the location of the UE has changed (e.g., UE location change) to the SMF.

Step 17: The AMF may respond to NG-RAN-2 through Path Switch Request Acknowledge message. As a result, the Path Switch Request Acknowledge message may not include PDU session information that can be serviced to the UE through NG-RAN-2 at all. In order to prevent NG-RAN-2 from treating this case as an error, a separate indication may be added to the Path Switch Request Acknowledge message and delivered. That is, an indication to ignore the mandatory field related to the PDU session context may be added in the corresponding message.

Step 18: After confirming that the Handover procedure for the UE has ended through Step 16, the SMF may resume processing of the PDU session creation request for S-NSSAI-2. The SMF may perform a PDU session establishment procedure for S-NSSAI-2. For example, operations of steps 10 to 19 in the examples of FIGS. 8*a* and 8*b* may be performed.

2-2. A Second Example of a Second Example of the Disclosure of this Specification Hereinafter, a second example of the second example of the disclosure of the present specification will be described with reference to the examples of FIGS. 15*a* to 15*c*.

The following drawings are made to explain a specific example of the present specification. Since the names of specific devices or names of specific signals/messages/fields described in the drawings are provided as examples, the technical features of the present specification are not limited to the specific names used in the drawings below.

Figure 15A:
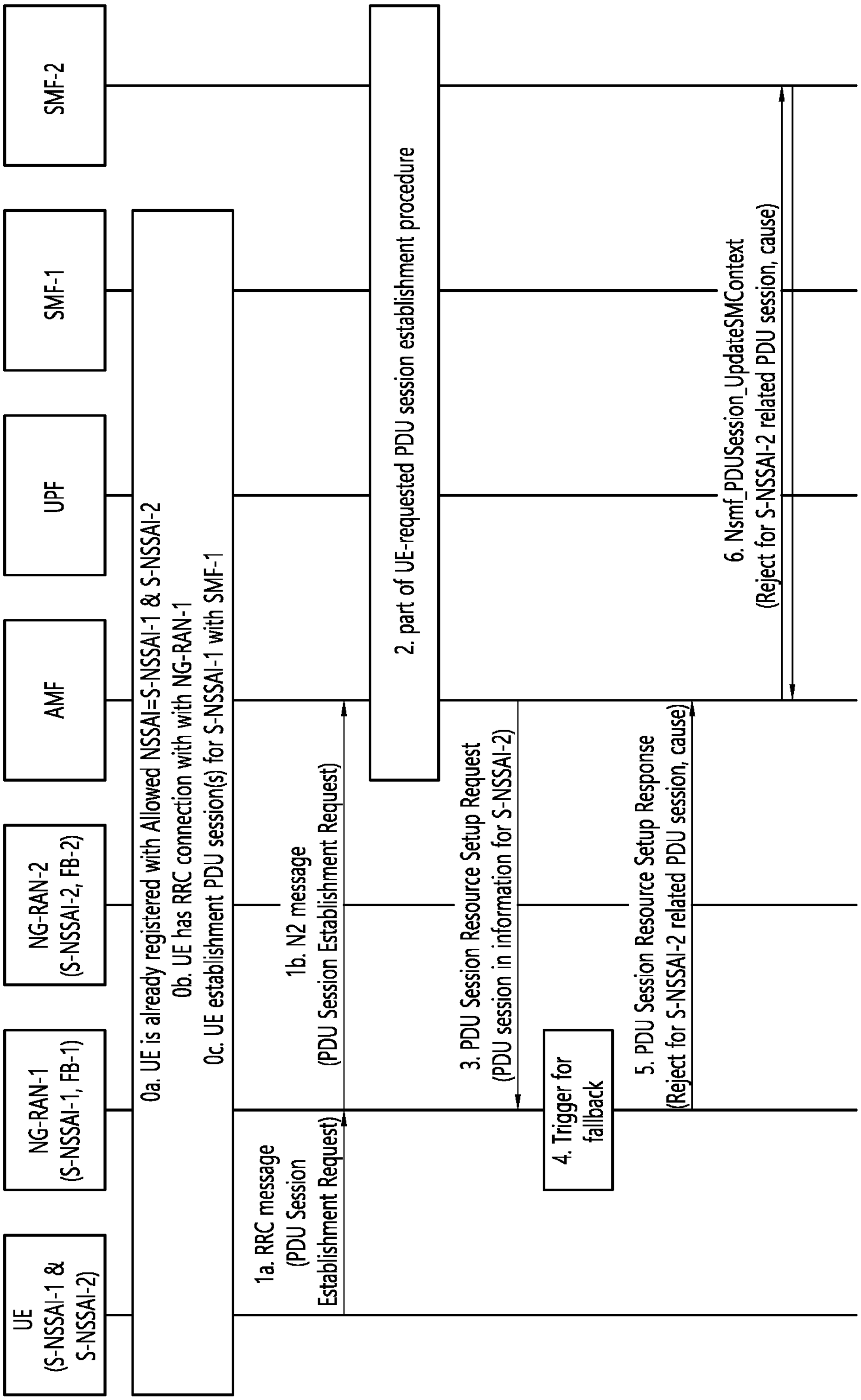
FIGS. 15*a* to 15*c* show signal flow diagrams according to a second example of a second example of the disclosure of the present specification.
Figure 15B:
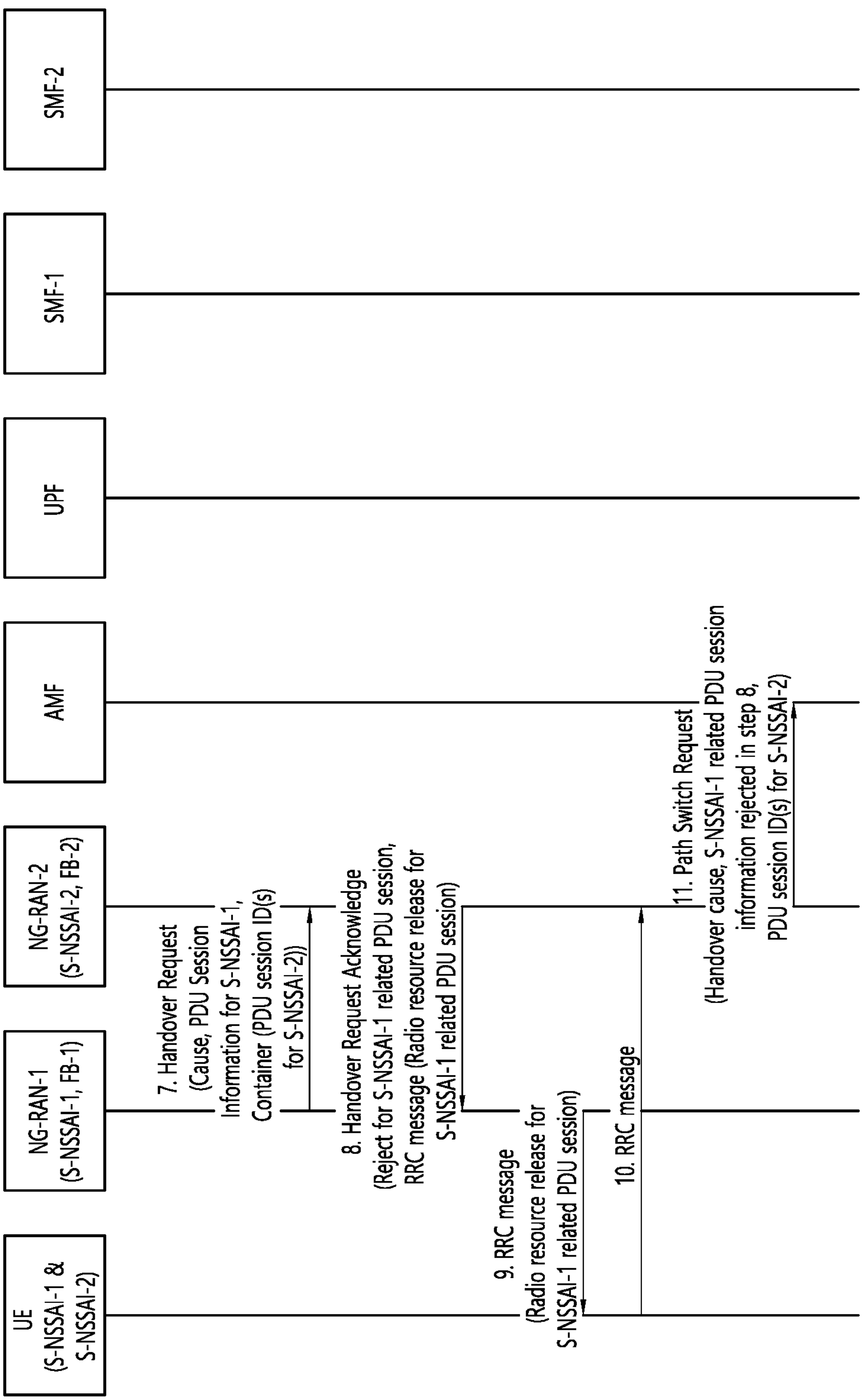
Figure 15C:
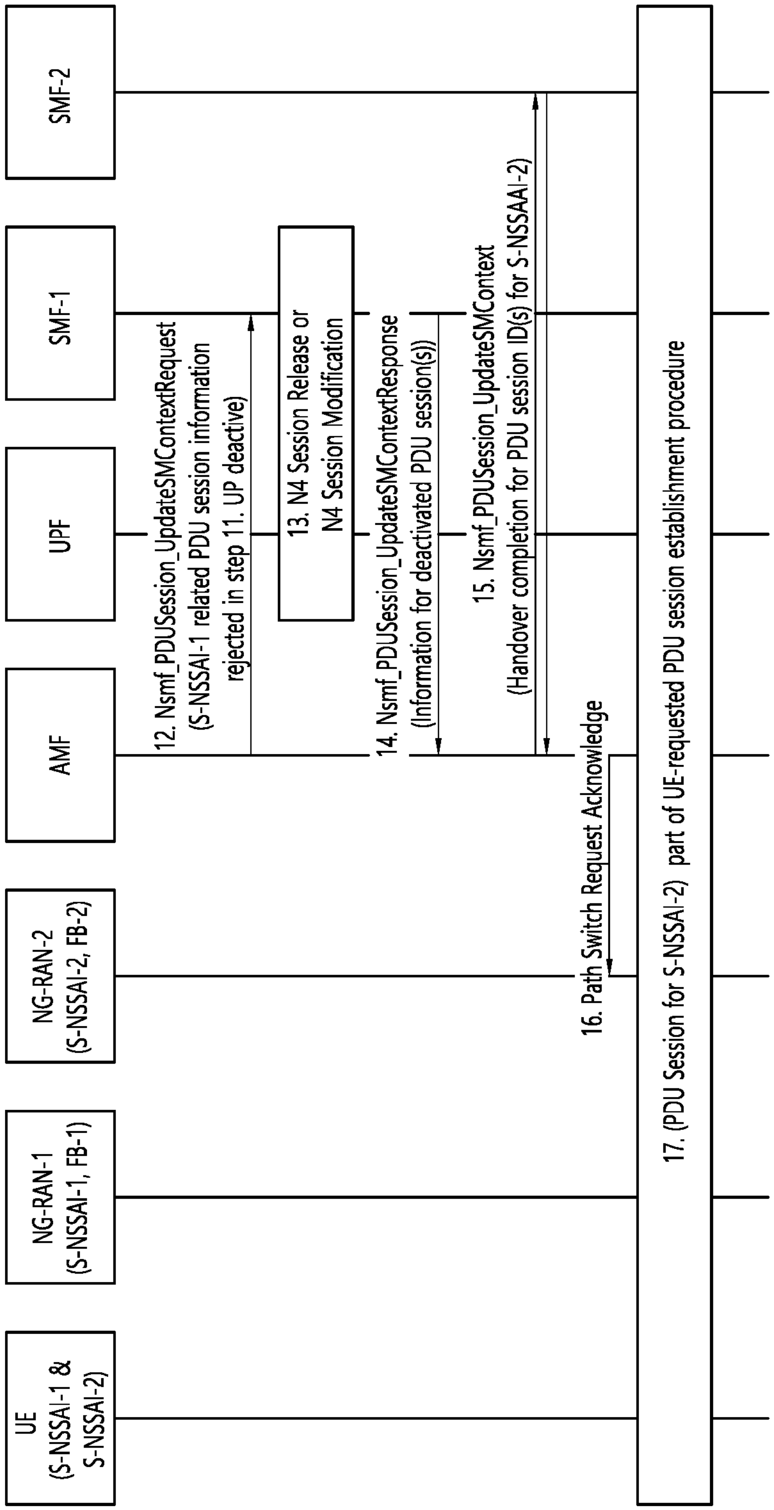

FIGS. 15*a* to 15*c* show signal flow diagrams according to a second example of a second example of the disclosure of the present specification.

The examples of FIGS. 15*a* to 15*c* may include an operation in which the target NG-RAN notifies the SMF of handover termination for the UE through the AMF, in the process of changing the frequency band of the terminal using Xn-based handover.

In describing the examples of FIGS. 15*a* to 15*c*, descriptions of overlapping contents with the examples of FIGS. 12*a* to 12*c* and the examples of FIGS. 14*a* to 14*c* will be omitted. In other words, the examples of FIGS. 15*a* to 15*c* will be described below, focusing on differences between the examples of FIGS. 15*a* to 15*c* and the examples of FIGS. 12*a* to 12*c* (and the examples of FIGS. 14*a* to 14*c*).

Steps 0 to 6: Steps 0 to 6 in the example of FIGS. 15*a* to 15*c* may be performed in the same manner as steps 0 to 6 in the example of FIGS. 12*a* to 12*c*.

Step 7: In the examples of FIGS. 15*a* to 15*c*, step 7 may be performed in the same manner as step 8 in the examples of FIGS. 14*a* to 14*c*.

In addition, NG-RAN-1 may include the PDU session ID(s) for S-NSSAI-2 received in Step 3 in the Source to Target Transparent Container and transmit it to the target NG-RAN (here, NG-RAN-2). When the handover procedure is completed, the target NG-RAN (here, NG-RAN2) may deliver corresponding information (e.g., PDU session ID (s) for S-NSSAI-2) to the AMF. Then, the AMF may find each SMF that manages the PDU sessions for S-NSSAI-2 and notify the SMF of that handover is completed.

Step 8: In the examples of FIGS. 15*a* to 15*c*, step 8 may be performed in the same manner as step 9 in the examples of FIGS. 14*a* to 14*c*.

Since NG-RAN-2 rejected the setup request for the PDU session for S-NSSAI-1, it can notify the terminal that the radio resources for the corresponding PDU session have been released. In addition, NG-RAN-2 may transmit an RRC message including information for redirecting the terminal to the frequency band used by S-NSSAI-2 in the Handover Request Acknowledge message.

For reference, the Handover Request message transmitted in Step 10 may not include PDU Session information that can be serviced in NG-RAN-2 at all. In this case, NG-RAN-1 may include "Indication (or information) (e.g. it can be a separate indication or information other than cause) to prevent NG-RAN-2 from rejecting the Handover message (e.g. Handover message not to be treated as an error) "in the Handover Request message and Path Switch Request message and deliver it to NG-RAN-2.

For reference, even if NG-RAN-2 does not support S-NSSAI-1, after NG-RAN-2 accepts the handover request for the PDU session for S-NSSAI-1, by not allocating resources for actual data transmission, it is possible to prevent a handover procedure from being rejected. For example, as NG-RAN-2 refers to the cause or indication sent by NG-RAN-1, even if you do not support S-NSSAI-1, after accepting the handover request for the PDU session for S-NSSAI-1, it is also possible to avoid rejection of the corresponding handover procedure by not allocating resources for actual data transmission. In this case, NG-RAN-2 may include a separate indication for notifying NG-RAN-1, AMF, and SMF of this situation in the Handover Request Acknowledge message. Since the terminal may know that the radio resources for the PDU session for S-NSSAI-1 are not allocated by NG-RAN-2 through the RRC message, the terminal may not attempt uplink data transmission for the corresponding PDU session.

Steps 9 to 10: Steps 9 to 10 in the example of FIGS. 15*a* to 15*c* may be performed in the same manner as steps 10 to 11 in the example of FIGS. 14*a* to 14*c*.

Step 11: NG-RAN-2 may notify that the UE has successfully moved to NG-RAN-2 by transmitting a Path Switch Request message to the AMF. The Path Switch Request message may inform the reason why the corresponding handover started and that the setup request for the PDU session for S-NSSAI-1 was rejected (i.e., the list of rejected PDU sessions for S-NSSAI-1 and the reason). NG-RAN-2 may transmit a Path Switch Request message including the PDU session ID(s) for S-NSSAI-2 received in step 7 during this process.

For reference, the Path Switch Request message may not include PDU session information that can be serviced in NG-RAN-2 at all. In order to prevent NG-RAN-2 from treating this case as an error, NG-RAN-2 may add a separate indication in addition to the cause to the Path Switch Request message and deliver it to AMF. That is, NG-RAN-2 may add an indication to ignore the PDU Session Resource to be Switched in Downlink List Information Element (IE), which is a mandatory field in the current Path Switch Request message.

Step 12: The AMF checks the PDU session list for S-NSSAI-1 for which the setup request included in the Path Switch Request message by NG-RAN-2 has been rejected and the reason for it, the AMF may request deactivation instead of release for the corresponding PDU session through the Nsmf_PDUSession_UpdateSMContext Request message to each SMF. The AMF may know this through the cause sent by NG-RAN-2 in Step 12. The AMF may also transmit a separate indication requesting deactivation along with the PDU session list for S-NSSAI-1 rejected by NG-RAN-2 in Step 12.

For reference, in Step 8, NG-RAN-2 may accept the PDU session list for S-NSSAI-1 and may not allocate resources for actual data transmission instead. In this case, NG-RAN-2 may inform the AMF of the situation through a separate indication. The AMF may request deactivation for the PDU session for S-NSSAI-1 from the SMF through the corresponding indication.

Steps 13 to 14: Steps 13 to 14 in the example of FIGS. 15*a* to 15*c* may be performed in the same manner as steps 14 to 15 in the example of FIGS. 14*a* to 14*c*.

Step 15: In the examples of FIGS. 15*a* to 15*c*, step 15 may be performed in the same manner as step 18 in the examples of FIGS. 12*a* to 12*c*.

Steps 16 to 17: Steps 16 to 17 in the example of FIGS. 15*a* to 15*c* may be performed in the same manner as steps 17 to 18 in the example of FIGS. 14*a* to 14*c*.

2-3. Third Example of Second Example of Disclosure of the Present Specification

Hereinafter, a third example of the second example of the disclosure of the present specification will be described with reference to the examples of FIGS. 16*a* to 16*c*.

The following drawings are made to explain a specific example of the present specification. Since the names of specific devices or names of specific signals/messages/fields described in the drawings are provided as examples, the technical features of the present specification are not limited to the specific names used in the drawings below.

Figure 16A:
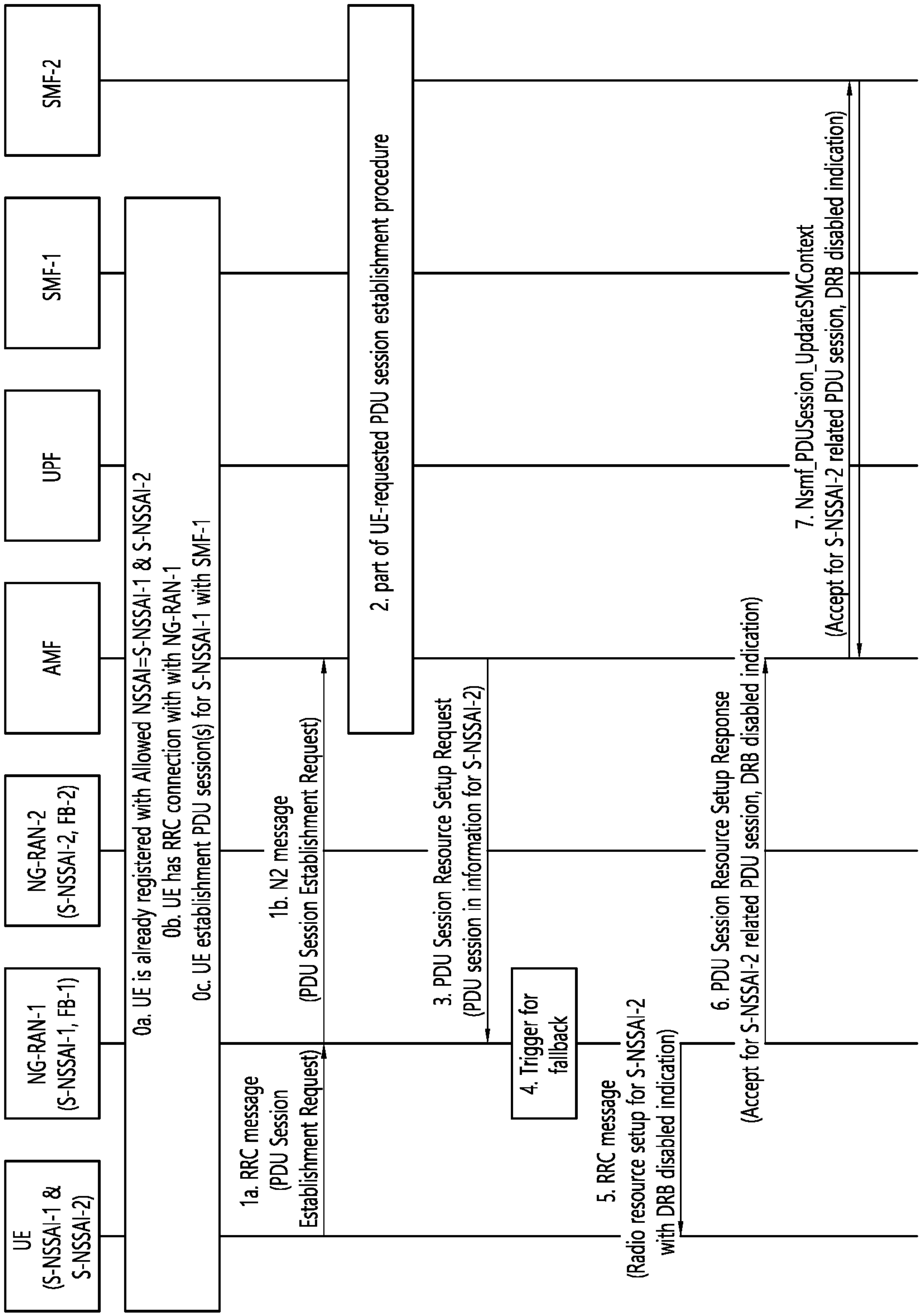
FIGS. 16*a* to 16*c* show signal flow diagrams according to a third example of a second example of the disclosure of the present specification.
Figure 16B:
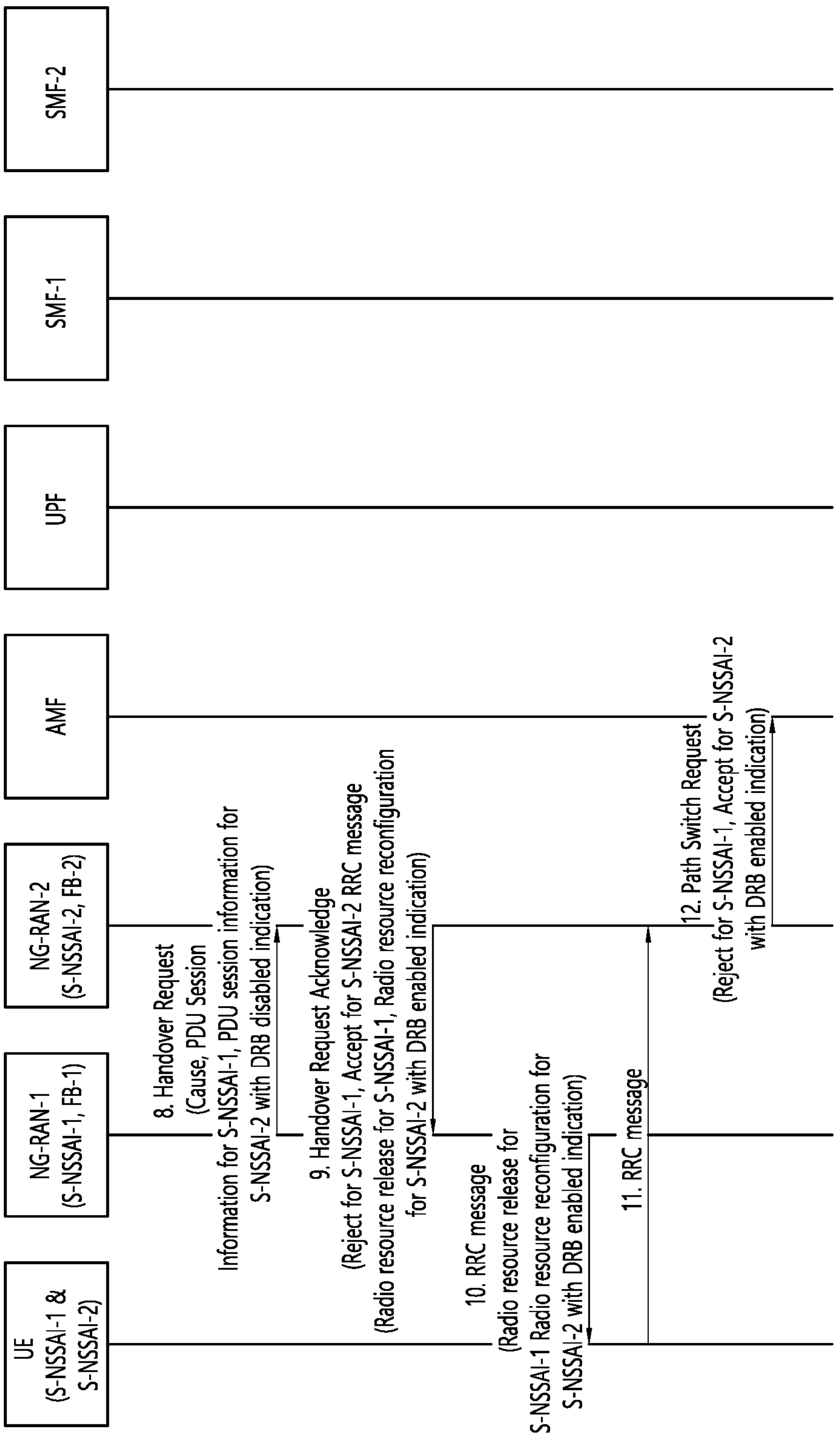
Figure 16C:
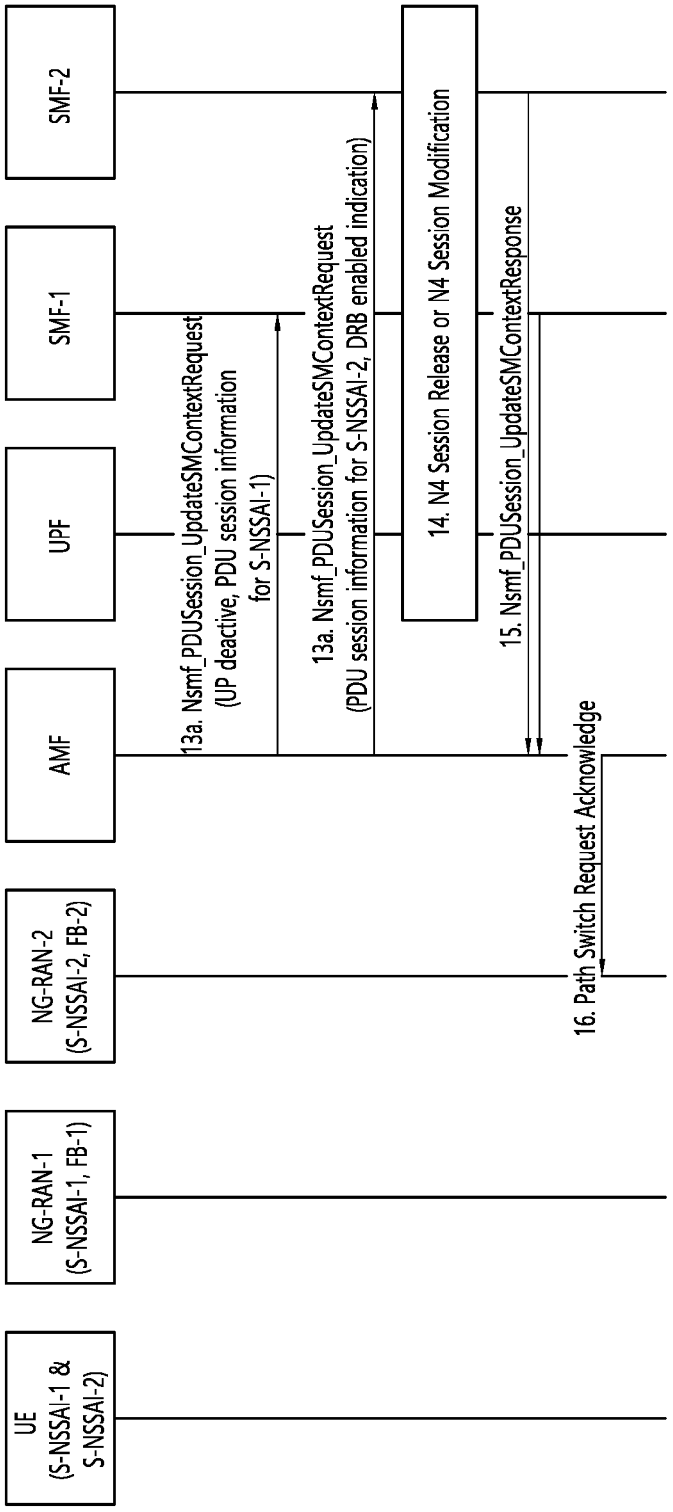

FIGS. 16*a* to 16*c* show signal flow diagrams according to a third example of a second example of the disclosure of the present specification.

The examples of FIGS. 16*a* to 16*c* may include an operation in which the target NG-RAN allocates actual radio resources after termination of handover, in the process of changing the frequency band of the UE using Xn-based handover, after creating the context for the PDU session regardless of whether the source NG-RAN supports S-NSSAI, In describing the examples of FIGS. 16*a* to 16*c*, descriptions of overlapping contents with the examples of FIGS. 13*a* to 13*c* and the examples of FIGS. 14*a* to 14*c* will be omitted. In other words, the examples of FIGS. 16*a* to 16*c* will be described below, focusing on differences between the examples of FIGS. 16*a* to 16*c* and the examples of FIGS. 13*a* to 13*c* (and the examples of FIGS. 14*a* to 14*c*).

Steps 0 to 6: Steps 0 to 4 in the example of FIGS. 16*a* to 16*c* may be performed in the same manner as steps 0 to 6 in the example of FIGS. 13*a* to 13*c*.

Step 7: In the example of FIGS. 16*a* to 16*c*, step 7 may be performed in the same manner as step 7 in the example of FIGS. 13*a* to 13*c*.

Step 8: NG-RAN-1 may initiate an Xn-based handover procedure while transmitting a Handover Request message to the target NG-RAN (here, NG-RAN-2). The Handover Request message may include PDU session information for S-NSSAI-1 that NG-RAN-1 is serving. In addition, the Handover Request message may include an indication or cause value notifying that the reason why the current handover procedure is started is that the UE needs to move to a frequency band served by S-NSSAI-2. This indication or cause value may be included in the Handover Request message to inform the target NG-RAN (here, NG-RAN-2).

In addition, the Handover Request message may also include PDU session information for the S-NSSAI-2 determined in Step 5-6. NG-RAN-1 may inform the target NG-RAN (here, NG-RAN-2) that the DRB is currently disabled for the corresponding PDU session.

Step 9: Since NG-RAN-2 cannot support S-NSSAI-1, it may reject the setup request for the PDU session for S-NSSAI-1. However, since NG-RAN-2 supports S-NSSAI-2, the setup request for the PDU session for S-NSSAI-2 can be accepted. Therefore, in the case of a PDU session for S-NSSAI-2, the NG-RAN configuration (e.g., SDAP configuration, DRB configuration, etc.) can be updated according to the situation (e.g., radio resource, network configuration, etc.) of NG-RAN-2. NG-RAN-2 transmits a Handover Request Acknowledge message, such that NG-RAN-2 may notify the NG-RAN-1 of that the setup request for the PDU session for S-NSSAI-1 was rejected (i.e., the list of rejected PDU sessions for S-NSSAI-1 and the reason), and the setup request for the PDU session for S-NSSAI-2 has been accepted (i.e., the list of accepted PDU sessions for S-NSSAI-2 and updated details). NG-RAN-2 may inform NG-RAN-1 that the DRB related to the PDU session for S-NSSAI-2 is enabled.

Since NG-RAN-2 rejected the setup request for the PDU session for S-NSSAI-1, it can notify the terminal that the radio resources for the corresponding PDU session have been released. In addition, NG-RAN-2 may transmit an RRC message including information for redirecting the terminal to the frequency band used by S-NSSAI-2 in the Handover Request Acknowledge message. When NG-RAN-2 updates the NG-RAN configuration (e.g., SDAP configuration, DRB configuration, etc.) for the PDU session for S-NSSAI-2, NG-RAN-2 may include the corresponding update content in the RRC message and deliver it to the UE. In addition, along with the transmission of the RRC message, NG-RAN-2 may notify the UE that the DRB related to the PDU session for S-NSSAI-2 is enabled.

For reference, even if NG-RAN-2 does not support S-NSSAI-1, after NG-RAN-2 accepts the handover request for the PDU session for S-NSSAI-1, by not allocating resources for actual data transmission, it is possible to prevent a handover procedure from being rejected. For example, as NG-RAN-2 refers to the cause or indication sent by NG-RAN-1, even if you do not support S-NSSAI-1, after accepting the handover request for the PDU session for S-NSSAI-1, it is also possible to avoid rejection of the corresponding handover procedure by not allocating resources for actual data transmission. In this case, NG-RAN-2 may include a separate indication for notifying NG-RAN-1, AMF, and SMF of this situation in the Handover Request Acknowledge message. Since the terminal may know that the radio resources for the PDU session for S-NSSAI-1 are not allocated by NG-RAN-2 through the RRC message, the terminal may not attempt uplink data transmission for the corresponding PDU session.

Steps 10 to 11: Steps 10 to 11 in the example of FIGS. 16*a* to 16*c* may be performed in the same manner as steps 16 to 17 in the example of FIGS. 13*a* to 13*c*.

Step 12: NG-RAN-2 may notify that the UE has successfully moved to NG-RAN-2 by transmitting a Path Switch Request message to the AMF. In addition, NG-RAN-2 may inform the AMF that the setup request for the PDU session for S-NSSAI-1 has been rejected (e.g. list of rejected PDU sessions for S-NSSAI-1 and reasons) through the corresponding message.

In addition, NG-RAN-2 may notify that the setup request for the PDU session for S-NSSAI-2 has been accepted. NG-RAN-2 may include new AN Tunnel Info for N3 tunnel information of the corresponding PDU session in the Path Switch Request message and transmit it to the AMF. In addition, NG-RAN-2 can notify the SMF through the AMF that the DRB related to the PDU session for S-NSSAI-2 is enabled.

Step 13: The AMF may check the PDU session list for S-NSSAI-1 for which the setup request was rejected and the reason included in the Handover Request Acknowledge message of NG-RAN-2. After that, the AMF transmits Nsmf_PDUSession_UpdateSMContext Request message (including UP deactivate information) to each SMF (e.g., SMF-1), such that the AMF may request deactivation instead of release for the corresponding PDU session. The AMF can know this through the Reject cause sent by NG-RAN-2 in Step 12, the AMF may also transmit a separate indication requesting deactivation along with the PDU session list for S-NSSAI-1 rejected by NG-RAN-2 in Step 12.

The AMF can check the PDU session list included in Handover Request Acknowledge message by NG-RAN-2 for S-NSSAI-2 for which the setup request has been accepted. After that, the AMF sends an Nsmf_PDUSession_UpdateSMContext Request message to each SMF (here, SMF-2), The AMF may request an update of AN Tunnel Info for N3 tunnel information for the corresponding PDU session. At this time, the AMF may also inform that DRB for the corresponding PDU session is enabled in NG-RAN.

For reference, in Step 9, NG-RAN-2 may accept the PDU session list for S-NSSAI-1 and may not allocate resources for actual data transmission instead. In this case, NG-RAN-2 may inform the AMF of the situation through a separate indication. The AMF may request deactivation for the PDU session for S-NSSAI-1 from the SMF through the corresponding indication.

Step 14: The SMF (e.g. SMF-1) uses the N4 Session Release procedure or the N4 Session Modification procedure, such that the SMF (e.g., SMF-1) may request the UPF to delete the AN Tunnel Info for N3 tunnel information for the PDU session for S-NSSAI-1 received in Step 13*a*. By making such a request, the SMF can prevent additional data transmission to the NG-RAN.

The SMF-2 may prepare data transmission to the NG-RAN by requesting the UPF to update the AN Tunnel Info for N3 tunnel information for the PDU session for S-NSSAI-2 received in Step 13*b*, by using the N4 Session Release procedure or the N4 Session Modification procedure.

Step 15: By transmitting Nsmf_PDUSession_UpdateSMContext Response message or other message to AMF, the SMF may inform that the PDU session deactivation requested by the AMF has been successfully processed. The message may include information about the deactivated PDU session (e.g., PDU session ID(s) for S-NSSAI-1 and reason for deactivation, etc.) or information on the updated PDU session (e.g., PDU session ID(s) for S-NSSAI-2, etc.).

Step 16: The AMF may respond to NG-RAN-2 through a Path Switch Request Acknowledge message.

3. a Third Example of the Disclosure of the Present Specification

Hereinafter, a third example of the disclosure of this specification will be described with reference to the examples of FIGS. 17*a* and 17*b*.

Basically, in the disclosure of this specification, assumptions such as the following examples may be applied. It is assumed that information on frequency bands available for each network slice is not configured in the terminal. In addition, NG-RAN-1 supports S-NSSAI-1 using Frequency Band 1 (FB-1) frequency band, and NG-RAN-2 supports S-NSSAI-2 using FB-2 frequency band. Assume. In addition, to support when the terminal is trying to move to S-NSSAI, which must use a frequency band different from the frequency band currently in use, additional information (e.g., frequency band used by individual S-NSSAI, priority of individual S-NSSAI, NG-RAN or cell ID list supporting specific S-NSSAI, etc.) may be configured in the NG-RAN.

The following drawings are made to explain a specific example of the present specification. Since the names of specific devices or names of specific signals/messages/fields described in the drawings are provided as examples, the technical features of the present specification are not limited to the specific names used in the drawings below.

Figure 17A:
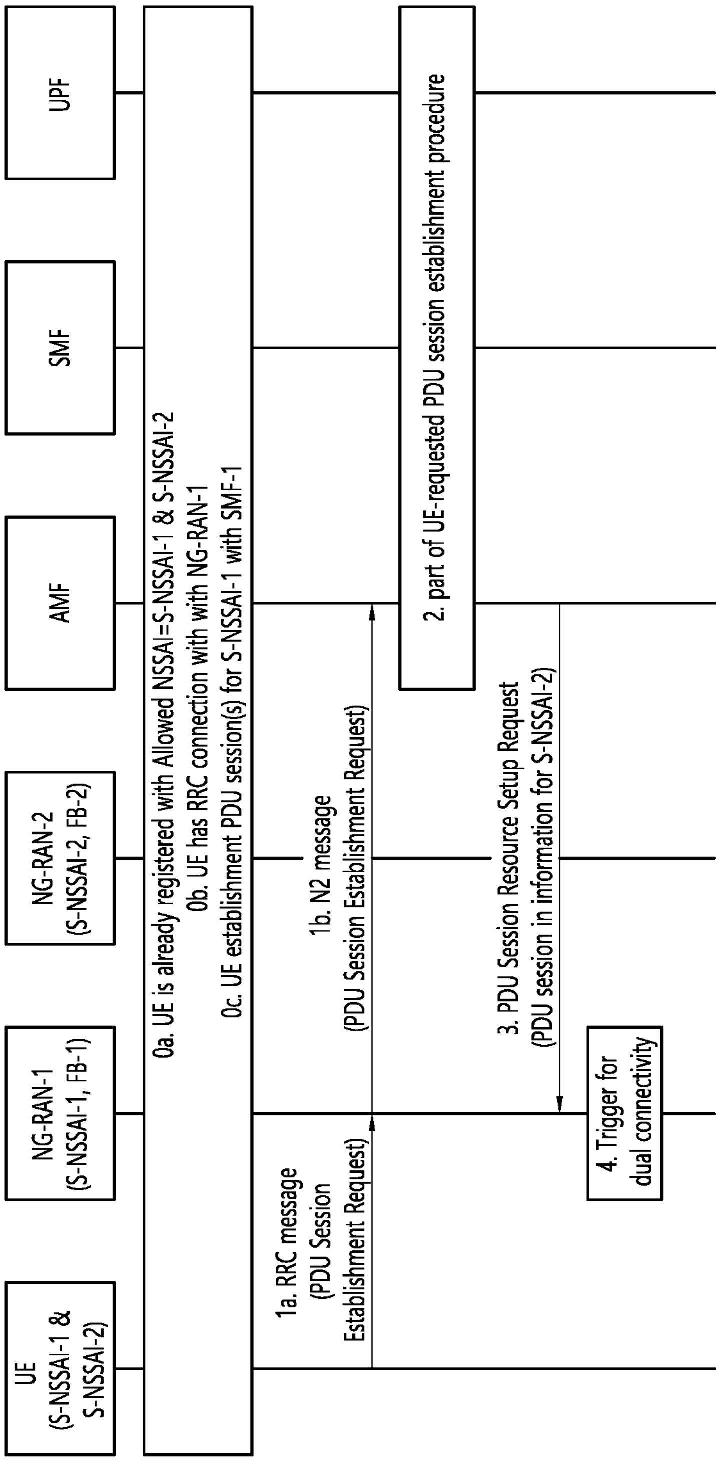
FIGS. 17*a* and 17*b* show signal flow diagrams according to a third example of the disclosure of the present specification.
Figure 17B:
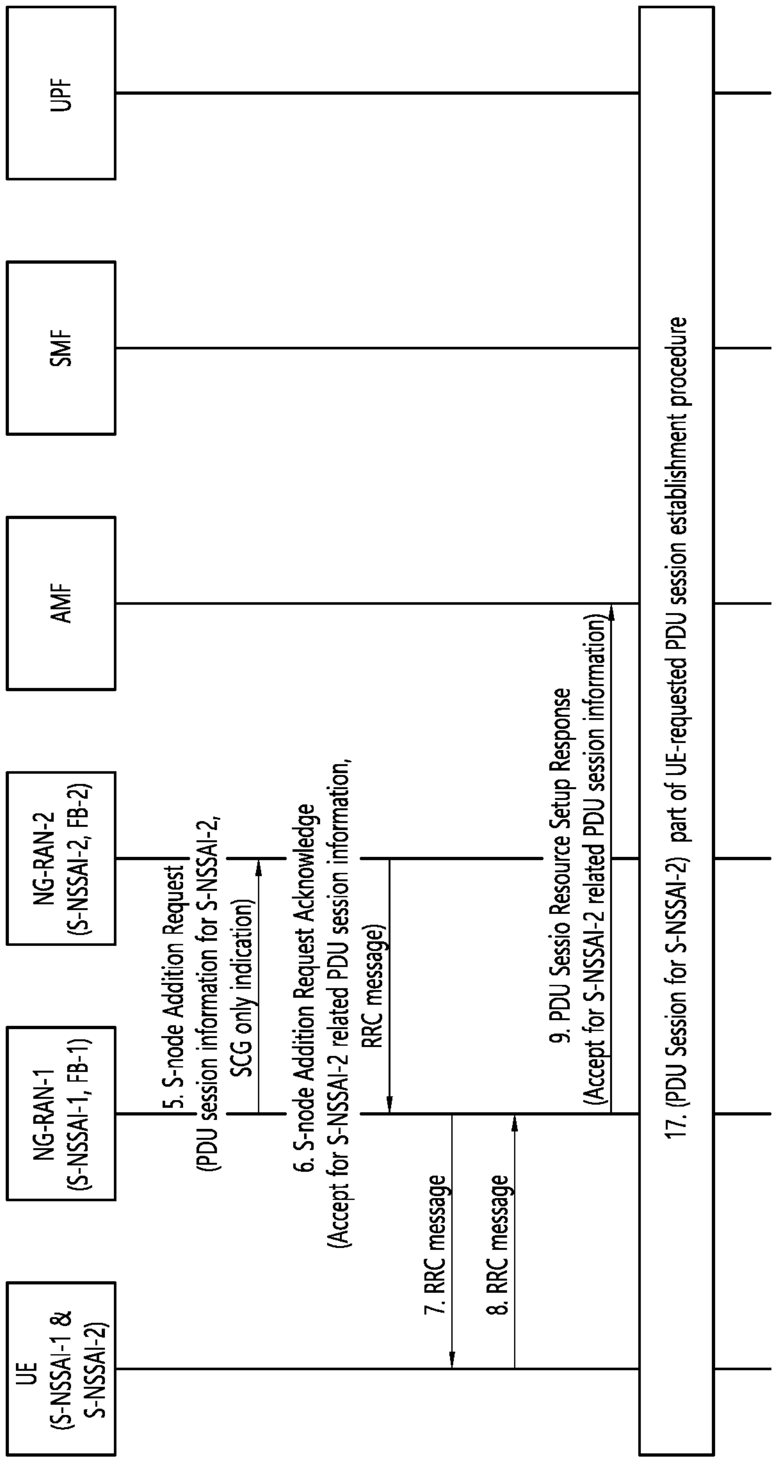

FIGS. 17*a* and 17*b* show signal flow diagrams according to a third example of the disclosure of the present specification.

The examples of FIGS. 17*a* and 17*b* may include an operation for enabling a UE to simultaneously use PDU sessions serviced in two different frequency bands using dual connectivity.

In describing the examples of FIGS. 17*a* and 17*b*, a description of overlapping contents with the examples of FIGS. 11*a* to 11*c* will be omitted. In other words, the examples of FIGS. 17*a* and 17*b* will be described below, focusing on differences between the examples of FIGS. 17*a* and 17*b* and the examples of FIGS. 11*a* to 11*c*.

Step 0: The terminal may be already registered in the network. In addition, it is assumed that the terminal receives allowed NSSAI=S-NSSAI-1 and S-NSSAI-2 from AMF. In addition, the terminal may be in a state of establishing an RRC connection with NG-RAN-1 and having one or more PDU sessions for S-NSSAI-1 through SMF-1.

Steps 1 to 3: Steps 1 to 3 in the example of FIGS. 17*a* and 17*b* may be performed in the same manner as steps 1 to 3 in the example of FIGS. 11*a* to 11*c*.

Step 4: When the terminal tries to receive service through S-NSSAI using a frequency band different from the frequency band the terminal is currently using, NG-RAN-1 may be configured to support such a terminal. In this case, NG-RAN-1 may decide to trigger dual connectivity for the terminal toward the NG-RAN supporting S-NSSAI-2 among neighboring NG-RANs. For example, based on the NG-RAN-1 receiving the resource allocation request message for the PDU session for S-NSSAI-2 in step 3, NG-RAN-1 may determine to trigger dual connectivity for a terminal toward an NG-RAN supporting S-NSSAI-2 among neighboring NG-RANs. At this time, NG-RAN-1 can refer to pre-configured information (e.g., frequency band used by individual S-NSSAI, NG-RAN or cell ID supporting specific S-NSSAI, priority of individual S-NSSAI, etc.) in NG-RAN-1 and radio quality. For example, based on pre-configured information (e.g., frequency band used by individual S-NSSAI, NG-RAN or cell ID supporting specific S-NSSAI, priority of individual S-NSSAI, etc.) and radio quality, NG-RAN-1 may determine to trigger dual connectivity for a terminal toward an NG-RAN supporting S-NSSAI-2 among neighboring NG-RANs. To trigger dual connectivity for the terminal towards the NG-RAN supporting S-NSSAI-2, NG-RAN-1 may request a measurement result report from the terminal and receive the measurement result from the terminal. Based on the measurement result received from the terminal, NG-RAN-1 knows whether dual connectivity for the terminal is possible, and if dual connectivity is executed, NG-RAN-1 can determine its target cell.

Step 5: NG-RAN-1 determines to support dual connectivity through NG-RAN-2 for the PDU session for S-NSSAI-2 and transmits S-node Addition Request message to NG-RAN-2. The S-node Addition Request message may include "secondary cell group (SCG) only indication" along with information on the PDU session for S-NSSAI-2. The indication may be transmitted to request the NG-RAN-2 to configure the configuration for the corresponding PDU session only in the form of an SCG bearer.

Step 6: If NG-RAN-2 can accept the request in step 5 (S-node Addition Request message), NG-RAN-2 may respond to NG-RAN-1 by sending an S-node Addition Request Acknowledge message. The S-node Addition Request Acknowledge message may include an RRC Reconfiguration message to be delivered to the UE along with the NG-RAN configuration (e.g., SDAP configuration, DRB configuration, AN Tunnel Info for N3 tunnel, etc.) for the PDU session for S-NSSAI-2.

Step 7: NG-RAN-1 may deliver the RRC reconfiguration message received from NG-RAN-2 to the UE. Based on the configuration information for the PDU session for S-NSSAI-2 sent by NG-RAN-2, the terminal may update settings.

Step 8: After completing configuration for dual connectivity, the terminal may respond to NG-RAN-1 by transmitting an RRC message.

Step 9: NG-RAN-1 may accept the resource allocation request for the PDU session for S-NSSAI-2 by transmitting the PDU Session Resource Setup Response message. At this time, NG-RAN-1 may transmit the NG-RAN configuration (e.g., AN Tunnel Info for N3 tunnel, etc.) information for the PDU session for S-NSSAI-2 received in step 6 to the AMF along with the PDU Session Resource Setup Response message.

Step 10: AMF resumes processing of the PDU session creation request for S-NSSAI-2. For example, operations of steps 14 to 19 in the examples of FIGS. 8*a* and 8*b* may be performed.

4. The Fourth Example of the Disclosure of the Present Specification

Hereinafter, a fourth example of the disclosure of this specification will be described with reference to the examples of FIGS. 18*a* and 18*b*.

Basically, in the disclosure of this specification, assumptions such as the following examples may be applied. It is assumed that information on frequency bands available for each network slice is not configured in the terminal. In addition, NG-RAN-1 supports S-NSSAI-1 using Frequency Band 1 (FB-1) frequency band, and NG-RAN-2 supports S-NSSAI-2 using FB-2 frequency band. Assume. In addition, to support when the terminal is trying to move to S-NSSAI, which must use a frequency band different from the frequency band currently in use, additional information (e.g., frequency band used by individual S-NSSAI, priority of individual S-NSSAI, NG-RAN or cell ID list supporting specific S-NSSAI, etc.) may be configured in the NG-RAN.

The following drawings are made to explain a specific example of the present specification. Since the names of specific devices or names of specific signals/messages/fields described in the drawings are provided as examples, the technical features of the present specification are not limited to the specific names used in the drawings below.

Figure 18A:
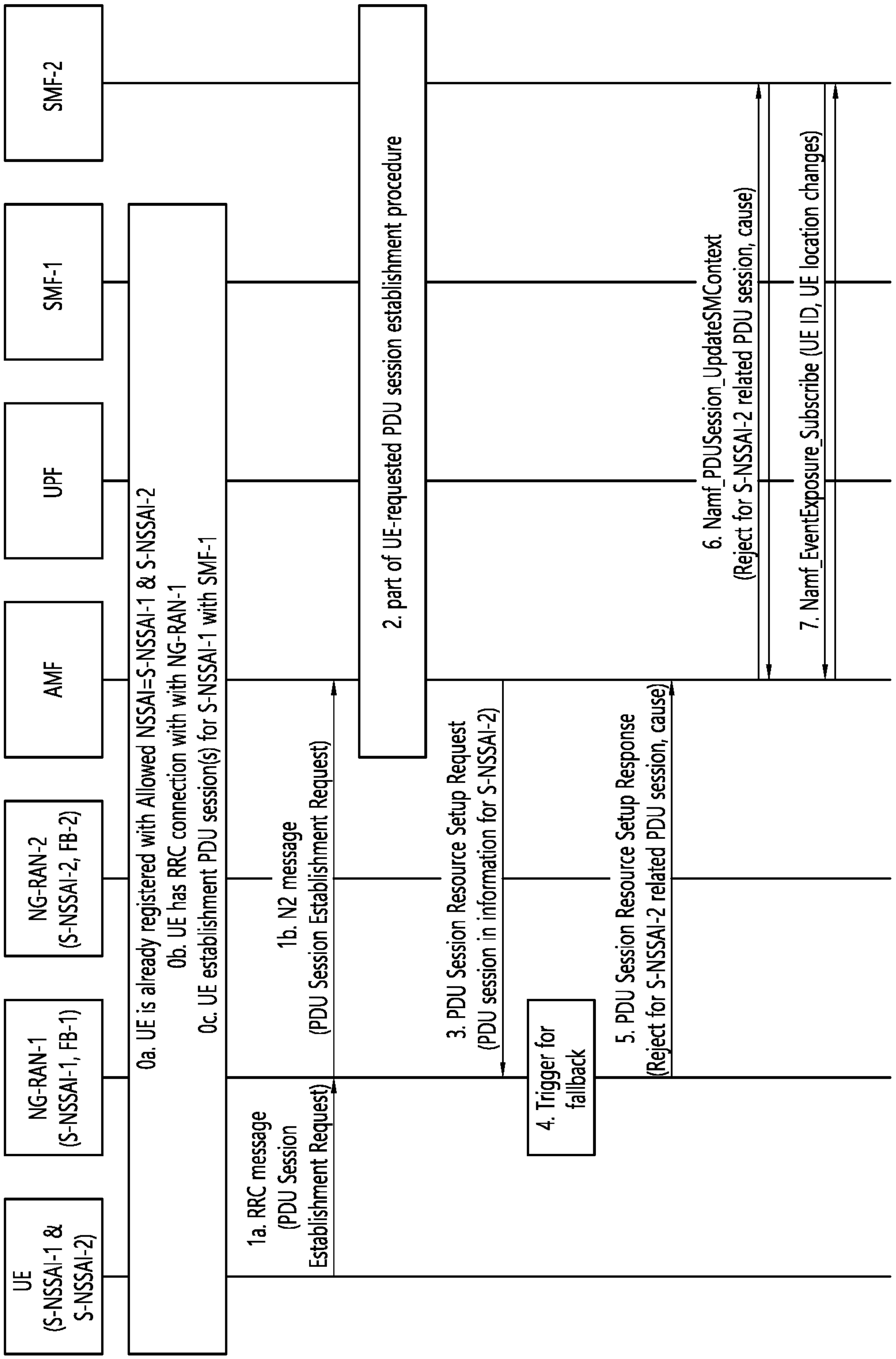
FIGS. 18*a* and 18*b* show signal flow diagrams according to a fourth example of the disclosure of the present specification.
Figure 18B:
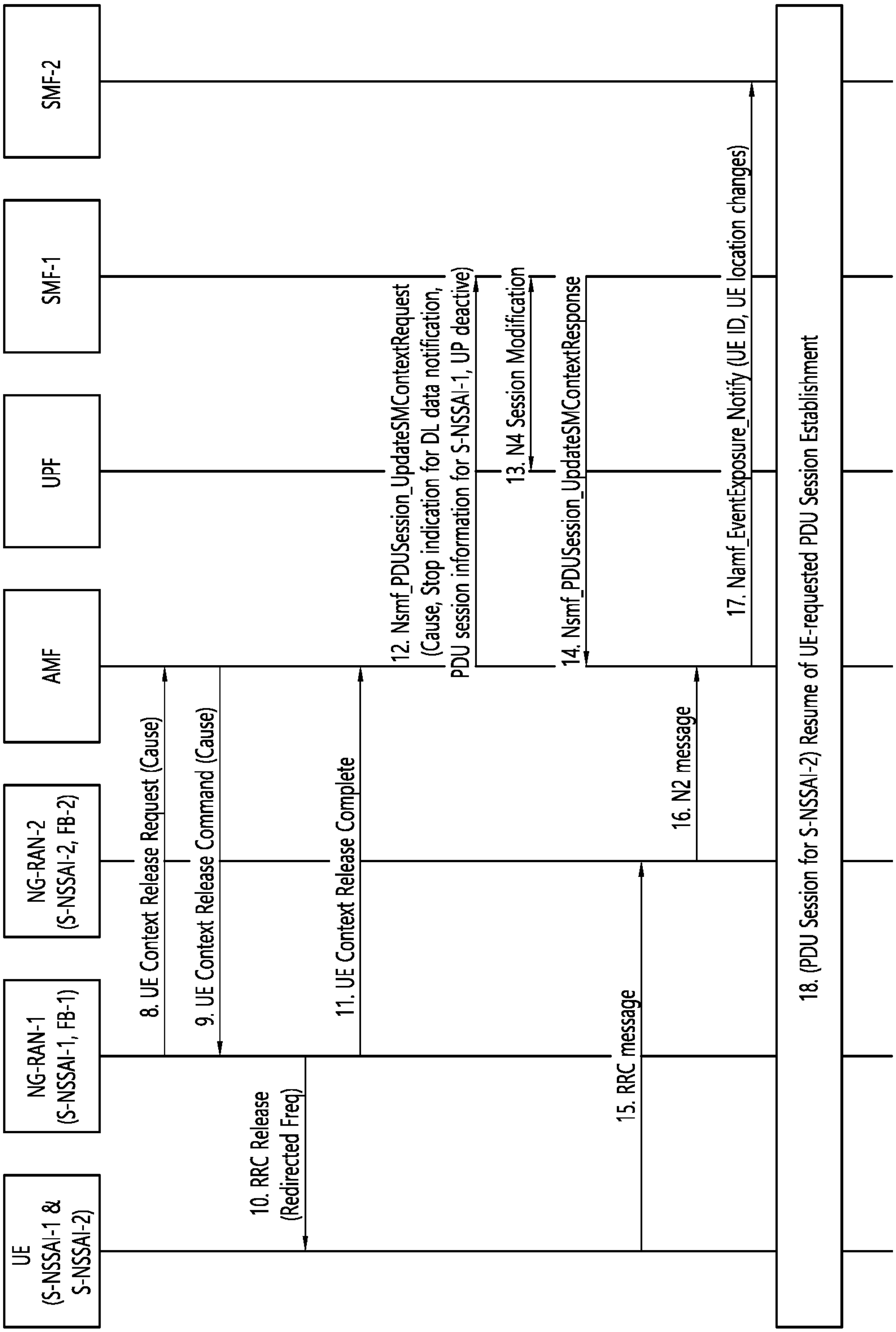

FIGS. 18*a* and 18*b* show signal flow diagrams according to a fourth example of the disclosure of the present specification.

The examples of FIGS. 18*a* and 18*b* may include an operation in which the AMF prohibits notification of DL data from the SMF, based on the priority between the slice currently in use by the terminal and the slice to which the terminal is to receive service, when changing the frequency band of the terminal using RRC release.

In describing the examples of FIGS. 18*a* and 18*b*, a description of overlapping content with the examples of FIGS. 11*a* to 11*c* will be omitted. In other words, the examples of FIGS. 18*a* and 18*b* will be described below, focusing on differences between the examples of FIGS. 18*a* and 18*b* and the examples of FIGS. 11*a* to 11*c*.

Steps 0 to 7: Steps 0 to 7 in the example of FIGS. 18*a* and 18*b* may be performed in the same manner as steps 0 to 7 in the example of FIGS. 11*a* to 11*c*.

Step 8: Due to unavailability of handover or other reasons, NG-RAN-1 may decide to perform RRC release with redirection for the UE. In this case, RRC release with redirection may mean redirection from the frequency band used by S-NSSAI-1 to the frequency band used by S-NSSAI-2. For reference, "other reason" may include, for example, a case where an operator configures NG-RAN-1 to perform RRC release with redirection instead of handover.

NG-RAN-1 can start the AN release procedure by sending a UE Context Release Request message to AMF for redirection to the frequency band used by S-NSSAI-2. The UE Context Release Request message may include a cause value notifying that context release has started to change the frequency band of the UE. In addition, the UE Context Release Request message may include a list of PDU session IDs for S-NSSAI-1 in an active state.

Step 9: The AMF may transmit a UE Context Release Command message including the cause value received in Step 4 to NG-RAN-1.

Step 10: NG-RAN-1 may transmit an RRC Release message including information necessary for redirection to the frequency band used by S-NSSAI-2 to the UE. Therefore, the terminal may release all radio resources allocated for the PDU session for S-NSSAI-1.

Step 11: When the release of radio resources is completed, NG-RAN-1 may respond to the AMF by transmitting a UE Context Release Complete message.

Step 12: The AMF may notify that the AN release procedure has started by sending an Nsmf_PDUSession_UpdateSMContext Request message to SMF-1. To notify that the AN release procedure has started, the AMF may include the cause value received in Step 8 in the Nsmf_PDUSession_UpdateSMContext Request message. At this time, the AMF may request deactivation instead of release for the corresponding PDU session while transmitting the Nsmf_PDUSession_UpdateSMContext Request message with the list of PDU session IDs for S-NSSAI-1 in active state received in Step 8 or Step 11 as well. Through this, the AMF can prevent additional data transmission to the NG-RAN.

The AMF may determine whether the priority of NSSAI-2 is higher than the priority of S-NSSAI-1. If AMF determines that the priority of S-NSSAI-2 is higher than that of S-NSSAI-1 (that is, if the service provided through S-NSSAI-2 is determined to be more important), the AMF may transmit an indication (or information) that not notifying AMF of DL data (e.g. DL data) even if DL data arrives after the deactivation process for the PDU session for S-NSSAI-1 is finished with Nsmf_PDUSession_UpdateSMContext Request message.

For reference, NG-RAN-1 may deliver priority information about S-NSSAI-1 and S-NSSAI-2 to the AMF, by using Step 5, step 8 or step 11, NG Setup procedure and RAN Configuration Update procedure.

Step 13: The SMF (e.g. SMF-1) uses the N4 Session Release procedure or the N4 Session Modification procedure, such that the SMF (e.g., SMF-1) may request the UPF to delete the AN Tunnel Info for N3 tunnel information for the PDU session for S-NSSAI-1 received in Step 12. By making such a request, the SMF can prevent additional data transmission to the NG-RAN.

Step 14: The SMF may notify the AMF that the PDU session deactivation requested by the NG-RAN has been successfully processed by using the Nsmf_PDUSession_UpdateSMContext Response message or other messages.

Step 15: Based on the redirection information received in Step 10, the terminal accesses NG-RAN-2 through a new frequency band and establishes an RRC connection.

Step 16: NG-RAN-2 sends an N2 message to AMF to inform that the corresponding terminal has accessed through NG-RAN-2.

Step 17: The AMF notifies the SMF that a mobility event for the UE has occurred by sending a Namf_EventExposure_Notify message to the SMF-2. For example, the AMF may transmit a Namf_EventExposure_Notify message including information that the location of the UE has changed (e.g., UE location change) to the SMF.

Step 18: After confirming that the redirection procedure for the terminal has ended, the AMF may resume processing of the PDU session establishment request for S-NSSAI-2, which was stopped in Step 7.

5. Fifth Example of the Disclosure of this Specification

A fifth example of the disclosure of the present specification includes an operation of efficiently deactivating a PDU session being serviced through an existing frequency band and generating a PDU session through a new frequency band, when the frequency band used by the terminal needs to be changed as the slice used by the terminal is changed.

For reference, the fifth example of the disclosure of this specification may be an example in which some or all of the operations according to the first to fourth examples of the disclosure of this specification described above are combined.

An example of a method for supporting 5GC assisted cell selection to access a network slice (e.g., "Support of 5GC assisted cell selection to access network slice") is described.

The NG-RAN may receive a resource allocation request for a PDU session related to a specific network slice from the SMF. If a specific network slice is a slice not supported by NG-RAN, the NG-RAN may decide to steer the UE to another NG-RAN supporting network slices with different operating frequency bands based on local configuration. Therefore, rejection (including cause) of UP resource establishment for the PDU session may cause the SMF to stop the PDU session establishment procedure. After the frequency band change of the UE is completed, the PDU session establishment procedure may continue.

One of the problems in the process of performing inter-frequency handover may be a method of indicating completion of frequency band change of the UE to the SMF. This is because a new PDU session has not yet been established, such that the SMF selected for this PDU session does not know about the UE's frequency band change. The fifth example of the disclosure of this specification may include an operation in which the SMF subscribes to the AMF for a UE location change event. Based on the notification of the AMF, the SMF may know the frequency band change completion of the UE.

When receiving a PDU Session Resource Setup Request for an unsupported slice, it may also be possible for the NG-RAN to configure dual connectivity in two NG-RANs. If the NG-RAN ensures that the resources of the data radio bearer for the PDU session are isolated, the NG-RAN may support network slices operating simultaneously in different frequency bands.

A fifth example of the disclosure of this specification may include an example of an operation of steering a UE based on RAN configuration during a PDU session establishment procedure.

For the fifth example of the disclosure of this specification, assumptions such as the following examples may be applied.

It is assumed that some cells in the tracking area may not support all network slices of Allowed NSSAI.

It is assumed that the UE and AMF are not provided with the operating band(s) allowed for each S-NSSAI of the PLMN.

To steer the UE to another NG-RAN that supports another network slice (network slice with different operating frequency band), Local information (e.g., target node ID supporting some S-NSSAIs, operating frequency band information for each S-NSSAI) may be configured for the NG-RAN.

A description related to the high-level is as follows.

During the registration procedure, since the AMF does not know the operating band(s) for each S-NSSAI, the UE may be provided with Allowed NSSAI which can contain S-NSSAIs operating in different frequency bands. When the UE requests the PDU session establishment for a certain S-NSSAI in the Allowed NSSI, there may be the case that the current NG-RAN does not support the S-NSSAI which is requested by the UE. In this case, the NG-RAN can decide to either activate the dual connectivity to support the S-NSSAIs operating in different frequency bands simultaneously or steer the UE to another NG-RAN supporting the requested S-NSSAI.

In the latter case (e.g., When the NG-RAN steers the UE to another NG-RAN that supports the requested S-NSSAI), the NG-RAN may transmit a message for rejecting the PDU session establishment request for the S-NSSAI with a proper cause. Based on the cause, the SMF stops the PDU session establishment procedure, and then subscribes to the AMF for the UE location change event. In order to steer the UE to another NG-RAN supporting a network slice with different operating frequency band, the NG-RAN triggers the inter NG-RAN handover or the redirection procedure towards the target NG-RAN. Based on the local information (e.g. target node ID(s) supporting some S-NSSAIs, operating frequency band information for each S-NSSAI), the NG-RAN may select the target NG-RAN supporting the S-NSSAI which is requested by the UE. After the completion of the UE mobility towards the target NG-RAN, the SMF is notified from the AMF about the UE location change, and then continues the PDU session establishment procedure via the target NG-RAN.

According to deployment, NG-RAN node may not be changed. In this case, intra NG-RAN handover can be triggered.

Hereinafter, a fifth example of the disclosure of this specification will be described with reference to the example of FIG. 19.

The following drawings are made to explain a specific example of the present specification. Since the names of specific devices or names of specific signals/messages/fields described in the drawings are provided as examples, the technical features of the present specification are not limited to the specific names used in the drawings below.

Figure 19:
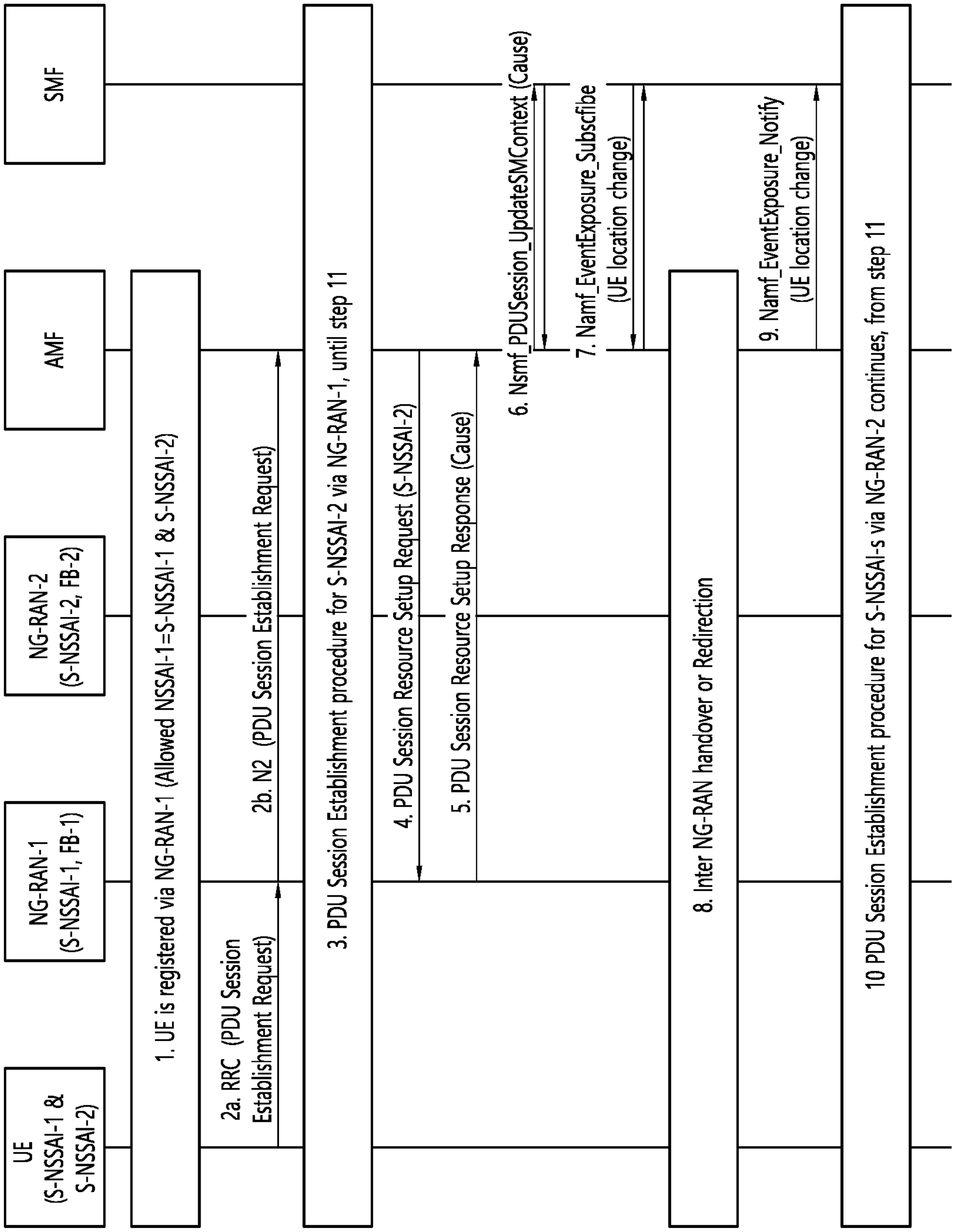
FIG. 19 show signal flow charts according to a fifth example of the disclosure of the present specification.

FIG. 19 show signal flow charts according to a fifth example of the disclosure of the present specification.

The example of FIG. 19 shows an example of a procedure for steer a UE to another NG-RAN supporting network slices having different operating frequency bands.

1) The UE may have performed a registration procedure through NG-RAN-1. And, the UE may be in an RRC_Connected state. It is assumed that the UE receives allowed NSSAI=S-NSSAI-1 and S-NSSAI-2 from AMF.

2) The UE sends a PDU Session Establishment Request for S-NSSAI-2 via NG-RAN-1.

3) AMF may initiate a PDU session establishment procedure for S-NSSAI-2. For example, operations of steps 2 to 10 in the examples of FIGS. *8a* and *8b* may be performed as part of a PDU session establishment procedure.

4) AMF may transmit a PDU Session Resource Setup Request message for S-NSSAI-2 to NG-RAN-1.

5) NG-RAN-1 transmits a PDU session resource setup response message including a cause to indicate the UE mobility due to non-supported slices to AMF, NG-RAN-1 may reject a PDU session resource setup request for S-NSSAI-2.

6) The AMF may transmit an Nsmf_PDUSession_UpdateSMContext request message including cause to SMF. Based on the cause, the SMF may stop the progress of the PDU session establishment procedure for S-NSSAI-2 and wait until UE mobility is completed.

7) The SMF may subscribe to the AMF for a UE location change event (e.g., UE's Cell ID change, etc.).

8) Based on the local information (e.g. target node ID supporting some S-NSSAIs, operating frequency band information for each S-NSSAI), NG-RAN-1 may select NG-RAN-2 supporting S-NSSAI-2. NG-RAN-1 may then trigger an inert NG-RAN handover procedure or a redirection procedure to NG-RAN-2.

For reference, for the existing PDU session for the S-NSSAI-1, the AMF may already have an association with the SMF for the PDU Session ID for S-NSSAI-1. During the handover, the NG-RAN-2 rejects the establishment of UP resources for the PDU session for the S-NSSAI-1. So, the AMF may request the SMF to deactivate the PDU Session for S-NSSAI-1. In the redirection procedure, the cause for the release from the NG-RAN-1 enables the SMF to trigger to deactivate user plane resources for the PDU session for the S-NSSAI-1.

9) After completion of UE mobility, the AMF may inform the SMF that the UE location has changed.

10) The SMF may perform a PDU session establishment procedure toward NG-RAN-2. For example, the SMF may continue an operation of communicating with the AMF (e.g., step 10 and operations after steps 10 of FIG. *8a*) in the PDU session establishment procedure as illustrated in FIGS. *8a* and *8b*.

According to the fifth example of the disclosure of the present specification, local information (e.g. target node ID supporting some S-NSSAIs, operating frequency band information for each S-NSSAI) may be configured for the NG-RAN. In order to indicate to SMF UE mobility due to unsupported slices, the NG-RAN may add a new cause for the PDU session establishment rejection message. In order to steer the UE to another NG-RAN that supports network slices with different operating frequency bands, the NG-RAN may trigger an inter NG-RAN handover procedure or redirection procedure.

According to the fifth example of the disclosure of the present specification, when the SMF receives a new cause from the NG-RAN, the SMF may stop the PDU session establishment procedure. The SMF may subscribe to the AMF for UE location change events. When the SMF receives the event notification of the UE location change from the AMF, the SMF may continue the PDU session establishment procedure.

For reference, in step 1 or step 2 of the example of FIGS. 11*a* to 11*c* to the example of FIG. 19, in order for the UE to receive a service using S-NSSAI-2, it has been described that an operation of transmitting a PDU session establishment request message for S-NSSAI-2 is performed first, and subsequent operations are performed. However, this is only an example, and the scope of the disclosure of this specification may include a case where the UE has already established a PDU session for S-NSSAI-2 before performing step 1 or step 2 of the examples of FIGS. 11*a* and 11*b* to the examples of FIGS. 17*a* and 17*b*. In this case, in step 1 or step 2 of the example of FIGS. 11*a* to 11*c* to the example of FIG. 19, the UE may perform an operation of transmitting a NAS message requesting to receive service, by using S-NSSAI-2 (i.e., through a PDU session for S-NSSAI-2). After the UE transmits the NAS message, subsequent operations (e.g., moving the UE to a frequency band capable of serving S-NSSAI-2) after step 1 or step 2 of the example of FIGS. 11*a* to 11*c* to the example of FIG. 19 may be performed. Here, the NAS message may be a Service Request, Registration Request, or a newly defined NAS message. This NAS message may include the ID of the PDU session for the S-NSSAI-2, which may be in the form of List Of PDU Sessions To Be Activated or in the form of other parameters.

According to the disclosure of this specification with reference to various examples, in a mobile communication system, an operation to support movement of a frequency band according to a specific slice request of a terminal may be performed. The core network (e.g., AMF, SMF, UPF) may request resource allocation for the PDU session for the slice requested by the terminal to the wireless network. A radio network (e.g., NG-RAN) may confirm that it is necessary to move the terminal to an NG-RAN supporting the slice requested by the terminal. While the radio network (e.g., NG-RAN) notifies the core network (e.g., AMF, SMF, UPF) that it is necessary to move the terminal, the radio network (e.g., NG-RAN) may request resource allocation rejection for the PDU session and deactivation for a specific PDU session. In addition, the radio network (e.g., NG-RAN) may cause the UE to move to another frequency band through a handover or RRC release message. After the core network (e.g., AMF, SMF, UPF) performs deactivation for a specific PDU session based on the result of the request, the core network (e.g., AMF, SMF, UPF) may request resource allocation of the PDU session again after the frequency band movement of the UE is finished.

According to the disclosure of this specification with reference to various examples, during the PDU Session Establishment process, by handover/redirection of the UE to the NG-RAN capable of supporting the slice and frequency band related to the PDU Session requested by the UE, a service through the corresponding slice can be efficiently provided to the terminal. In addition, when the handover/redirection of the UE is completed, the AMF notifies the SMF of the occurrence of the mobility event, so that the SMF can quickly resume the PDU Session Establishment process after the handover/redirection of the UE is terminated.

According to the description in the disclosure of this specification with reference to various examples, before a terminal moves to another frequency band, it is possible to efficiently deactivate a PDU session being serviced through an existing frequency band. By efficiently deactivating a PDU session in service through an existing frequency band, it is possible to prevent a situation in which DL data is unnecessarily transmitted to the RAN. In addition, since the establishment procedure for a new PDU session that can be serviced in a new frequency band can also be processed in the process, unnecessary signaling can be reduced.

For reference, the operation of the terminal (e.g., UE) described in this specification may be implemented by the apparatus of FIGS. 1 to 3 described above. For example, the terminal (e.g., UE) may be the first device 100 or the second device 200 of FIG. 2. For example, an operation of a terminal (e.g., UE) described herein may be processed by one or more processors 102 or 202. The operation of the terminal described herein may be stored in one or more memories 104 or 204 in the form of an instruction/program (e.g. instruction, executable code) executable by one or more processors 102 or 202. One or more processors 102 or 202 control one or more memories 104 or 204 and one or more transceivers 105 or 206, and may perform the operation of the terminal (e.g., UE) described herein by executing instructions/programs stored in one or more memories 104 or 204.

In addition, instructions for performing an operation of a terminal (e.g., UE) described in the disclosure of the present specification may be stored in a non-volatile computer-readable storage medium in which it is recorded. The storage medium may be included in one or more memories 104 or 204. And, the instructions recorded in the storage medium may be executed by one or more processors 102 or 202 to perform the operation of the terminal (e.g., UE) described in the disclosure of the present specification.

For reference, the operation of a network node (e.g., AMF, SMF, UPF, PCF, UDM, DN etc.) or base station (e.g., NG-RAN, gNB, eNB, RAN, E-UTRAN etc.) described herein may be implemented by the apparatus of FIGS. 1 to 3 to be described below. For example, a network node or a base station may be the first device 100 of FIG. 2 or the second device 200 of FIG. 2. For example, the operation of a network node or base station described herein may be processed by one or more processors 102 or 202. The operation of the terminal described herein may be stored in one or more memories 104 or 204 in the form of an instruction/program (e.g. instruction, executable code) executable by one or more processors 102 or 202. One or more processors 102 or 202 may perform the operation of a network node or a base station described herein, by controlling one or more memories 104 or 204 and one or more transceivers 106 or 206 and executing instructions/programs stored in one or more memories 104 or 204.

In addition, instructions for performing the operation of the network node or base station described in the disclosure of this specification may be stored in a non-volatile (or non-transitory) computer-readable storage medium. The storage medium may be included in one or more memories 104 or 204. And, the instructions recorded in the storage medium are executed by one or more processors 102 or 202, so that the operations of a network node or base station are performed.

In the above, preferred embodiments have been exemplarily described, but the disclosure of the present specification is not limited to such specific embodiments, and thus, modifications, changes, or can be improved.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method comprising:

receiving, by a first base station, allowed network slice selection assistance information from an access mobility management node, wherein the allowed network slice selection assistance information includes information related to a first network slice and information related to a second network slice, wherein the allowed network slice selection assistance information is stored in a user equipment (UE), wherein the first network slice is related to a first frequency band and supported by the first base station, wherein the second network slice is related to a second frequency band and supported by a second base station, and wherein a first session related to the first network slice is established;

receiving, by the first base station, a session resource setup request message for establishing a second session related to a second session from the access mobility management node, wherein the second session is related to the second network slice;

determining, by the first base station, to move the UE to the second base station based on i) the UE attempting to receive services though the second network slice related to the second frequency band which is different from the first frequency band the UE is currently using, but ii) the first base station not supporting the second network slice;

transmitting, by the first base station, a session resource setup response message to the access mobility management node, wherein the session resource setup response message includes i) reject information related to the second session and ii) rejection cause information which is related to moving the UE to the second base station supporting the second network slice related to the second frequency band; and transmitting, by the first base station, a handover required message to the access mobility management node, wherein the handover required message includes i) information related to the first session, and ii) handover initiation cause information which is related to moving the UE to the second base station supporting the second network slice related to the second frequency band, and wherein a handover request for the UE is accepted by the second base station based on the handover initiation cause information for moving the UE to the second base station supporting the second network slice related to the second frequency band, regardless of whether the second base station supports the first network slice or not.

2. The method of claim 1, further comprising:

receiving a session establishment request message including information on the second network slice from the UE; and transmitting the session establishment request message to the access mobility management node.

3. The method of claim 1, further comprising:

receiving a handover command message from the access mobility management node, wherein the handover command message includes a Radio Resource Control (RRC) message generated by the second base station.

4. The method of claim 3, wherein the handover command message further includes information that a first session related to a first network slice supported by the first base station is deactivated.

5. The method of claim 3, further comprising:

transmitting the RRC message to the UE, wherein the RRC message includes information for the UE to redirect to a frequency band used by the second network slice.

6. A first base station comprising:

at least one processor; and at least one memory that stores instructions and is operably electrically connectable with the at least one processor, wherein operations performed based on the instructions being executed by the at least one processor comprise:

receiving allowed network slice selection assistance information from an access mobility management node, wherein the allowed network slice selection assistance information includes information related to a first network slice and information related to a second network slice, wherein the allowed network slice selection assistance information is stored in a User Equipment (UE), wherein the first network slice is related to a first frequency band and supported by the first base station, wherein the second network slice is related to a second frequency band and supported by a second base station, and wherein a first session related to the first network slice is established;

receiving a session resource setup request message for establishing a second session from the access mobility management node, wherein the second session is related to the second network slice;

determining to move the UE to the second base station based on i) the UE attempting to receive services though the second network slice related to the second frequency band which is different from the first frequency band the UE is currently using, but ii) the first base station not supporting the second network slice;

transmitting a session resource setup response message to the access mobility management node, wherein the session resource setup response message includes i) reject information related to the second session and ii) a rejection cause information which is related to moving the UE to the second base station supporting the second network slice related to the second frequency band; and transmitting a handover required message to the access mobility management node, wherein the handover required message includes i) information related to the first session, ii) a handover initiation cause information which is related to moving the UE to the second base station supporting the second network slice related to the second frequency band, and wherein a handover request for the UE is accepted by the second base station based on the handover initiation cause information for moving the UE to the second base station supporting the second network slice related to the second frequency band, regardless of whether the second base station supports the first network slice or not.

7. A method for performing communication related to a network slice, the method performed by an access mobility management node and comprising:

transmitting a session resource setup request message for establishing a second session related to a second session to a first base station, wherein a first network slice is related to a first frequency band and supported by the first base station, wherein a second network slice is related to a second frequency band and supported by a second base station, wherein a first session related to the first network slice is established, and wherein the second session is related to the second network slice;

receiving a session resource setup response message from the first base station, wherein the session resource setup response message includes i) reject information related to the second session and ii) rejection cause information which is related to moving a user equipment (UE) to the second base station supporting the second network slice related to the second frequency band, transmitting the reject information and the rejection cause information to a second session management node that manages the second session;

wherein the reject information and the rejection cause information are used to cause the second session management node to stop a session establishment procedure for the second session and wait until the location of the UE is changed;

receiving a handover required message from the first base station, wherein the handover required message includes i) information related to the first session, and ii) a handover initiation cause information which is related to moving the UE to the second base station supporting the second network slice related to the second frequency band; and wherein a handover request for the UE is accepted by the second base station based on the handover initiation cause information for moving the UE to the second base station supporting the second network slice related to the second frequency band, regardless of whether the second base station supports the first network slice or not.

8. The method of claim 7, further comprising:

receiving an event subscribe request message requesting notification of a change in location of the UE from the second session management node.

9. The method of claim 8, further comprising:

receiving a handover notify message from the second base station; and transmitting an event notification message notifying the location change of the UE to the second session management node, based on that the handover notification message is received.

10. The method of claim 7, further comprising:

receiving a session establishment request message including information on the second network slice from the first base station; and initiating a session establishment procedure for establishing the second session.

11. The method of claim 10, further comprising:

transmitting a handover request message including the handover initiation cause information and information about the first session to the second base station, and receiving a Handover Request Acknowledge message from the second base station;

wherein the Handover Request Acknowledge message includes information that the first PDU session is rejected and cause related to rejection of the first session because the second base station does not support the first network slice.

12. The method of claim 11, further comprising:

transmitting a message requesting deactivation of the first session to a first session management node managing the first session, based on that the Handover Request Acknowledge message is received.

* * * * *